(12) United States Patent
Nakamura et al.

(10) Patent No.: US 11,368,868 B2
(45) Date of Patent: Jun. 21, 2022

(54) MEASUREMENT DEVICE, COMMUNICATION TERMINAL MEASUREMENT SYSTEM, AND MEASUREMENT-RELATED INFORMATION DISPLAY METHOD

(71) Applicant: ANRITSU CORPORATION, Kanagawa (JP)

(72) Inventors: Shoichi Nakamura, Kanagawa (JP); Shinji Ogawa, Kanagawa (JP); Atsushi Motoyama, Kanagawa (JP); Anri Muto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/944,346

(22) Filed: Jul. 31, 2020

(65) Prior Publication Data

US 2021/0044994 A1  Feb. 11, 2021

(30) Foreign Application Priority Data

Aug. 6, 2019  (JP) .............................. JP2019-144492

(51) Int. Cl.
*H04W 24/10* (2009.01)
*H04W 24/06* (2009.01)
(Continued)

(52) U.S. Cl.
CPC .......... *H04W 24/10* (2013.01); *H04W 16/24* (2013.01); *H04W 24/06* (2013.01); *H04W 64/003* (2013.01); *H04W 88/085* (2013.01)

(58) Field of Classification Search
USPC ........ 370/329, 252, 241, 404, 465, 497, 473
See application file for complete search history.

(56) References Cited

U.S. PATENT DOCUMENTS 7,761,119 B2 * 7/2010 Patel .................... H04B 17/318
  455/566
7,920,531 B2 * 4/2011 Gupta ..................... H04L 41/00
  370/338

(Continued)

FOREIGN PATENT DOCUMENTS

JP  2013-009254 A  1/2013

OTHER PUBLICATIONS

Uchino, et al., "Advanced carrier aggregation and Dual Connectivity technology to achieve higher speed and larger capacity" NTT Docomo Technical Journal, vol. 23, No. 2, pp. 35-45, Jul. 2015, Japan (includes partial English translation).

(Continued)

*Primary Examiner* — Joseph Arevalo
(74) *Attorney, Agent, or Firm* — Pearne & Gordon LLP

(57) ABSTRACT

A control device 22 performs the simulative communication operation on a measurement device 20 for transmitting and receiving signals between the base transceiver station compliant with the first communication standard and the terminal 11a and a measurement device 21 for transmitting and receiving signals between the base transceiver station compliant with the second communication standard and the terminal 11a. In the control device 22, the display control unit 30d performs display in a form in which the same number of graphic forms as the number of base transceiver stations compliant with the first and second communication standards are arranged in association with one first cell icon indicating that the base transceiver station is compliant with the first communication standard and one second cell icon indicating that the base transceiver station is compliant with the second communication standard.

17 Claims, 25 Drawing Sheets

(51) Int. Cl.
      *H04W 16/24*     (2009.01)
      *H04W 64/00*     (2009.01)
      *H04W 88/08*     (2009.01)

(56) References Cited

U.S. PATENT DOCUMENTS

| | | | |
|---|---|---|---|
| 2010/0120371 A1* | 5/2010 | Sato | H04W 24/06 455/67.14 |
| 2012/0327782 A1 | 12/2012 | Tanaka et al. | |
| 2014/0082439 A1* | 3/2014 | Kitagawa | H04M 1/24 714/712 |
| 2014/0128003 A1* | 5/2014 | Takahashi | H04B 17/10 455/67.7 |
| 2014/0323059 A1* | 10/2014 | Wakasa | H04B 17/23 455/67.14 |
| 2015/0281984 A1* | 10/2015 | Takizawa | H04B 17/3912 455/67.14 |
| 2016/0219449 A1* | 7/2016 | Tanaka | H04W 24/08 |
| 2016/0277949 A1* | 9/2016 | Wakasa | H04W 36/0016 |
| 2016/0286422 A1* | 9/2016 | Samejima | H04W 52/243 |
| 2021/0044994 A1* | 2/2021 | Nakamura | H04W 88/085 |

OTHER PUBLICATIONS

Minoguchi, et al., NTT Docomo Technical Journal, vol. 25, No. 3, pp. 6-12, Oct. 2017, Japan (includes partial English translation).

\* cited by examiner

MEASUREMENT DEVICE, COMMUNICATION TERMINAL MEASUREMENT SYSTEM, AND MEASUREMENT-RELATED INFORMATION DISPLAY METHOD

TECHNICAL FIELD

The present invention relates to a measurement device having a measurement function of a communication terminal and a display control function of information relating to measurement, a communication terminal measurement system, and a measurement-related information display method, for performing a test of a communication terminal by simulating a base transceiver station in an operation mode in which new and old communication standards are mixed.

BACKGROUND ART

For example, in a mobile phone system, a speed of wireless communication with a wireless base transceiver station (hereinafter, a base transceiver station) is increased in accordance with the increase in the number of functions of a mobile terminal. In recent years, for example, a technology development for shifting from fourth generation (4G) services employing the LTE-Advanced system to fifth generation (5G) services is in progress.

In realizing a new wireless communication system (NR) for 5G, a non-standalone NR operated by a combination of LTE and NR disclosed in Non-Patent Document 1 is studied. Further, as disclosed in Non-Patent Document 2, non-standalone NR operation is based on use combination of the carrier aggregation (hereinafter referred to as CA) technology and the dual connectivity (hereinafter referred to as DC) technology. In the CA technology, communication is performed by bundling component carriers (hereinafter, referred to as CCs) used before the LTE-Advanced standard in the same base transceiver station. In the DC technology, communication between an NR base transceiver station and an LTE base transceiver station is performed simultaneously.

First, the non-standalone NR operation will be described.

The non-standalone NR operation is being considered to be employed in the transition stage to a standalone system that can be operated only with NR, and is an operation mode for providing the 5G wireless service using the existing LTE/LTE-Advanced area and the NR area in combination.

In the non-standalone NR operation, for example, as shown in FIG. 20, an evolved packet core (EPC) is employed as a core network, and an LTE area and an NR area are mixed in the core network. In the LTE area and the NR area, a plurality of base transceiver stations LTE1 (1st base transceiver station supporting LTE) to LTEn (nth base transceiver station supporting LTE) and NR1 (1st base transceiver station supporting NR) to NRn (nth base transceiver station supporting NR) may exist, respectively.

In the existing LTE/LTE-Advanced, there is a technology that employs a CA technology that bundles CCs of the same base transceiver station (BTS). However, in non-standalone NR operation, in addition to the CA technology, NR and LTE are combined with a DC technique that bundles carriers between different BTSs in each area.

In the network configuration of the non-standalone NR, the above-described DC performs data communication using radio resources of two BTSs called a master node and a secondary node. In this case, for example, as shown in FIG. 21, the following technology is employed. A master node MNB (Master Node BTS) serves as a branch point for user data transmission, and downlink data transmitted from an S-GW (Serving Gate Way) through an S1 interface is transferred to the carrier of the secondary node SNB through the carrier of the master node MNB or the X2 interface, thereby performing transmission to the carrier of the secondary node SNB.

In the DC in non-standalone NR operation, radio resource control (RRC) for connecting to a network is established only with the master node MNB, and controls the secondary node SNB through the master node MNB. This type of control includes control of addition of a secondary node for setting a carrier provided by the secondary node SNB to a user equipment (UE), which is a terminal, and control of deletion of a secondary node for deleting the carrier.

As an example, FIG. 22 shows a procedure for deleting a secondary node. In this deletion procedure, first, the user equipment UE transmits a measurement report to the MNB which is a base transceiver station operating as a master node to connect to the MNB, and then the DC setting procedure is executed in a case where it is notified through the user equipment UE that the quality of the cell subordinate to the SNB serving as the base transceiver station, in which the MNB is set as a secondary node, is favorable.

In the DC setting procedure, the base transceiver station MNB transmits a DC setting request (SN Addition Request) to the SNB (Step S01). The SNB stores the radio parameter information of the subordinate cell in a response signal (SN Addition Request Acknowledgement) to the DC setting request, and transmits the signal to the SNB (step S02). Subsequently, in a case of receiving the response signal from the SNB, the MNB transmits a radio resource setting signal (RRC connection reconfiguration) to the user equipment UE (step S03). The user equipment UE transmits a completion notification (RRC connection reconfiguration complete) corresponding to the setting signal to the MNB (step S04), starts a synchronization establishment procedure for the SNB, and reaches a state where connection with the SNB is established upon completion of the procedure.

Upon receiving the completion notification from the user equipment UE, the MNB transfers a completion notification (SN reconfiguration complete) to the SNB (Step S05), and completes the DC setting procedure. Thereafter, the base transceiver station MNB executes processing of distributing downlink user data sent from the S-GW to the base transceiver station SNB.

Further, a protocol stack as shown in FIG. 23 is employed in the DC in the non-standalone NR operation. In a configuration of the existing LTE, between the base transceiver station and UE, a packet data convergence protocol (PDCP) layer, a radio link control (RLC) layer, a medium access control (MAC) layer, and a physical (physical) layer from the top are set. On the other hand, as shown in FIG. 23, in the DC, a plurality of base transceiver stations communicate with the user equipment UE. Thus, the protocol stack is separated on the base transceiver station side under the PDCP layer in the MNB, and the protocol stack similar to the conventional one is prepared for each of the MNB and the SNB on the RLC layer and the following layers. On the other hand, on the user equipment UE side, a protocol layer corresponding to each is prepared.

In the DC, a primary cell (PCell) and a secondary cell (SCell) used for transmission of control signals also have different functions from CA. In the CA, only a part of the functions of PCell is supported in the SCell. Specifically, the SCell does not support the physical uplink control channel (PUCCH), the contention based random access (CBRA), and the like, and the PCell basically performs transmission of hybrid automatic retransmission (HARQ) response signal and the uplink control information (UCI) as quality information of downlink (DL), an uplink scheduling request to the base transceiver station, and the like.

On the other hand, in the DC, the delay between the base transceiver stations MNB/SNB that bundle the carriers is large. Thus, the UCI and the scheduling request received by the PCell of the MNB are notified to the SNB in real time through the backhaul, and it is difficult to reflect the UCI and the scheduling request on the scheduling of the subordinate SCell.

Therefore, in DC, for example, as shown in FIG. 24, one carrier subordinate to the SNB is used as a primary SCell (PSCell) to support PUCCH transmission and CBRA in addition to the PCell, and the UCI and the scheduling request for each carrier subordinate to the SNB are transmitted directly from the user equipment UE to the SNB. Thereby, communication with a plurality of base transceiver stations can be realized without being affected by the delay between the MNB and the SNB. It should be noted that the PSCell also has a function that was previously supported only by the PCell, such as a downlink radio quality monitoring function. Therefore, the user equipment UE is able to perform stable transmission and reception with the SNB.

In the non-standalone NR operation equipped with the DC technology described with reference to FIGS. 20 to 24, in addition to "high speed and large capacity" in LTE/LTE-Advanced, advantages of "low delay and high reliability" can also be achieved.

For this reason, it is desired for a measurement device, which measures a terminal that performs communication according to the NR standard through the non-standalone NR operation, to have a display control function of drawing a cell (base transceiver station) image for detecting base transceiver stations in both NR and LTE areas which are set to perform simulative communication with the terminal and a carrier image for detecting the status of use of a carrier.

For an device for testing a communication operation of a mobile communication terminal by simulating a base transceiver station that transmits and receives signals based on various communication standards including LTE, for example, Patent Document 1 proposes a technology of performing display for detecting the contents of setting of multiplex communication and the status of the multiplex communication under test including information indicating a subordinate relationship of multiplex communication.

For example, the display control unit 5 described in Patent Document 1 controls the display unit 6 to perform, for example, a desired display in the display form shown in FIG. 25 in accordance with a control signal from the pseudo base transceiver station control unit 4 based on the setting information.

The display unit 6 is configured as a display such as a liquid crystal panel, and has a multiplex-communication-related display unit 6d in addition to the sequence display unit 6a, the connection status display unit 6b, and the connection destination display unit 6c.

For packet data communication for each service between the terminal 11 (for example, a mobile communication terminal such as a 4G terminal) and a virtual connection destination through the measurement device 1, the sequence display unit 6a displays a plurality of sequences indicating a communication procedure and a transition status of communication between the terminal 11 and the virtual connection destination 12.

Specifically, as shown in FIG. 25, the sequence display unit 6a displays, as a plurality of sequences, a "Power Off" sequence indicating the power-off status of the terminal 11, a "Detach (position registration release)" sequence indicating a position registration release status of the terminal 11, a "Registration (position registration)" sequence indicating a position registration status of the terminal 11, an "Idle (standby status)" sequence indicating a standby status of the terminal 11, an "Origination (outgoing)" sequence indicating an outgoing status of the terminal 11, a "Termination (incoming)" sequence indicating an incoming status of the terminal 11, a "Communication (communication status)" sequence indicating a communication status of the terminal 11, a "UE (user equipment) Release (terminal disconnection)" sequence indicating a disconnection status from the terminal 11, and a "NW (network) Release (connection destination disconnection)" sequence indicating a disconnection status from the virtual connection destination 12.

Under the control of the display control unit 5, these series of sequences are displayed in a flowchart form with arrows indicating each communication procedure and the transition direction of the communication status between the sequences. At that time, the display status changes in accordance with the transition status. That is, when the corresponding sequence is in the transition status, the corresponding sequence is displayed in a display status different from the previous display status, for example, by changing the display color or the display luminance.

In FIG. 25, the arrows between the sequences in the sequence display unit 6a indicate the communication procedures and the transition directions of the communication status.

The connection status display unit 6b displays the connection status between the terminal 11 and the virtual connection destination 12 (a virtual call destination 12a, a virtual server 12b, or a virtual videophone 12c) through the measurement device 1.

More specifically, the connection status display unit 6b displays, as graphic icons, the terminal 11, the pseudo base transceiver station control unit 4, and the virtual connection destination 12 (the virtual call destination 12a, the virtual server 12b, or the virtual videophone 12c) under the control of the display control unit 5, changes the display status in accordance with the presence or absence of connection, and graphically displays a plurality of connection lines between the terminal 11 for the pseudo base transceiver station control unit 4 and each of the virtual connection destination 12 (the virtual call destination 12a, the virtual server 12b, or the virtual videophone 12c). That is, the display color of the corresponding connection line is changed or the display luminance is changed in accordance with the presence or absence of the connection.

The connection destination display unit 6c graphically displays one virtual connection destination 12 (any of the virtual call destination 12a, the virtual server 12b, or the virtual videophone 12c) to which the terminal 11 is connected through the pseudo base transceiver station control unit 4.

When the terminal 11 performs the multiplex communication, under the control of the display control unit 5 through the pseudo base transceiver station control unit 4, the multiplex-communication-related display unit 6d displays the above-mentioned Priority, Status, PDN/PDP-Type, IP-version, QCI, EBI/NSAPI, Linked-EBI/Linked-NSAPI, UE Address, DNS-Address, and Access-Point-Name as the multiplex-communication-related information, for example in a list format as shown in FIG. 25. The multiplex-communication-related information is determined by the display information determination unit 13 in order to detect the setting contents of the multiplex communication and the status of the multiplex communication under test.

Conventionally, the simulation model setting screen 33b is displayed with a screen configuration as shown in FIG. 26. The conventional simulation model parameter setting screen 331 shown in FIG. 26 has a simulation model area 331a and a simulation model display area 331b.

In the simulation model area 331a, tools for selecting a communication system (MIMO, and the like), DL and UL conditions (Modulation Support), and various wireless communication standards are arranged side by side, the selection fields of the BTSs are arranged vertically, and the above-mentioned items are set by radio buttons or the like for each BTS. In the case of such a table form, the display area has to be expanded in the horizontal and vertical directions as the number of BTSs increases.

However, the conventional device described in Patent Document 1 has a function of displaying, for example, the operation status of a base transceiver station in an LTE area relating to measurement of a 4G terminal, and is not configured to display various kinds of information on the operation of the base transceiver station in both areas of HR and LTE using the non-standalone NR operation.

In particular, in the conventional device, the base transceiver stations in the LTE area set for performing the simulative communication with the 4G terminal are generally displayed by arranging the number of cell icons corresponding to the respective base transceiver stations as shown in FIG. 26. In addition, in consideration of displaying the number of cell icons corresponding to the respective base transceiver stations on the connection status display unit 6b in FIG. 25, in order to display all base transceiver stations in the non-standalone NR operation in which the number of base transceiver stations is expected to increase in both the NR area and the LTE area in the future, the display space becomes insufficient, and it becomes difficult to view the screen. Thus, there is a concern that the usability is reduced.

RELATED ART DOCUMENT

Patent Document

[Non-Patent Document 1] Uchino, Teshima, Takeda {NTT DOCOMO Technical Journal} Vol. 23 No. 2 pp. 35-45 (July 2015)

[Non-patent Document 2] Minoguchi, Isobe, Takahashi, Nagata {NTT DOCOMO Technical journal} Vol. 25 No. 3 pp. 6-12 (October 2017)

[Patent Document 1] U.S. Pat. No. 5,290,359 (Japanese Patent Application Laid-Open No. 2013-9254)

DISCLOSURE OF THE INVENTION

Problem that the Invention is to Solve

The present invention has an object to provide a measurement device, a communication terminal measurement system, and a measurement-related information display method capable of displaying images of all base transceiver stations in a designated display area by saving an area of a screen even in a case where the number of base transceiver stations compliant with the old communication standard or the number of base transceiver stations compliant with the new communication standard increases, when performing communication in an operation mode in which old and new communication standards are mixed.

Means for Solving the Problem

In order to solve the above problem, a measurement device according to first aspect of the present invention is a measurement device that simulates a plurality of base transceiver stations so as to test a communication terminal. The plurality of base transceiver stations include two base transceiver stations compliant with a first communication standard and at least one base transceiver station compliant with a second communication standard. The measurement device comprises: a transmitting/receiving unit (3, 20, 21) that transmits and receives a signal of the first communication standard between the base transceiver station compliant with the first communication standard and the communication terminal and that transmits and receives a signal of the second communication standard between the base transceiver station compliant with the second communication standard and the communication terminal; a pseudo base transceiver station control unit (4, 22) that controls the transmitting/receiving unit such that the transmitting/receiving unit performs a simulative communication operation for simulating communication between the communication terminal and the plurality of base transceiver stations; a display unit (33) that displays measurement-related information relating to measurement of the communication terminal; and display control means (30d) for causing the display unit (33) to display the measurement-related information relating to the measurement of the communication terminal based on a signal transmitted to and received from the communication terminal during the simulative communication operation. The display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations compliant with the second communication standard in association with the second cell icon.

The measurement device according to a second aspect of the present invention may be configured such that a number of the plurality of the base transceiver stations are three or more, the first form is a set of the same number of graphic forms as the number of base transceiver stations compliant with the first communication standard arranged in association with the first cell icon, and the second form is a set of the same number of graphic forms as the number of base transceiver stations compliant with the second communication standard arranged in association with the second cell icon.

With this configuration, the measurement device according to the second aspect of the present invention may constantly display one first cell icon and one second cell icon. In addition, even in a case where the number of base transceiver stations compliant with the first communication standard and the number of base transceiver stations compliant with the second communication standard increase, the display area can be saved. In addition, all base transceiver stations can be displayed in a graphic form in association with the first cell icon and the second cell icon, respectively.

The measurement device according to a third aspect of the present invention may be configured such that the display control means displays a number for identifying the base transceiver station compliant with the first communication standard and a number for identifying the base transceiver station compliant with the second communication standard for each of the graphic forms. The display control means displays rectangular frames as the graphic forms, and displays a number for identifying the base transceiver station compliant with the first communication standard and a number for identifying the base transceiver station compliant with the second communication standard for each of the rectangular frames.

The measurement device according to a fourth aspect of the present invention may be configured such that each graphic form shows a box shape and the graphic forms are displayed in a form in which the graphic forms are vertically stacked. With this configuration, the measurement device according to the fourth aspect of the present invention is able to prevent the entire display area from being expanded as the number of stacking steps of the rectangular frames associated with the first cell icon and the second cell icon changes even in a case where the number of base transceiver stations compliant with the first communication standard and the number of base transceiver stations compliant with the second communication standard increase.

In order to solve the above problem, a measurement device according to a fifth aspect of the present invention is a measurement device simulates four or more base transceiver stations. The four or more base transceiver stations include two or more base transceiver stations compliant with the first communication standard and two or more base transceiver stations compliant with the second communication standard, and each of the base transceiver station is identified by a number, the first form is a form in which an additional first cell icon is arranged next to the first cell icon, and the second form is a form in which an additional second cell icon is arranged next to the second cell icon.

With this configuration, the measurement device according to the fifth aspect of the present invention is able to display two first cell icons and two second cell icons. In addition, the display area can be prevented from being extended in accordance with the number of base transceiver stations compliant with the first communication standard and the number of base transceiver stations compliant with the second communication standard.

The measurement device according to a sixth aspect of the present invention may be configured as follows. The first cell icon is the first cell icon corresponding to the first numbered base transceiver station of the base transceiver station compliant with the first communication standard and the additional first cell icon is the first cell icon corresponding to the last numbered base transceiver station of the base transceiver station compliant with the first communication standard. The second cell icon is the second cell icon corresponding to the first numbered base transceiver station of the base transceiver station compliant with the second communication standard and the additional second cell icon is the second cell icon corresponding to the last numbered base transceiver station of the base transceiver station compliant with the second communication standard. The first form further includes information for identifying the first communication standard and first and last numbers of the base transceiver stations compliant with the first communication standard are separated and transcribed in association with each of the first cell icons, and the second form further includes information for identifying the second communication standard and first and last numbers of the base transceiver stations compliant with the second communication standard are separated and transcribed in association with each of the second cell icons.

With this configuration, the measurement device according to the sixth aspect of the present invention is able to display all base transceiver stations in a limited display area by displaying combination of information for identifying the first or second communication standard respectively associated with the two first cell icons and the two second cell icons and notation of the first and last numbers of the base transceiver stations compliant with the first or second communication standard. The first and last numbers are separated from each other.

The measurement device according to a seventh aspect may be configured such that the first form further includes a form between the first and last numbers of the base transceiver stations, indicating that numbers, which are continuous between the first and the last numbers of the base transceiver stations, are omitted, and the second form further includes a form between the first and last numbers of the base transceiver stations, indicating that numbers, which are continuous between the first and the last numbers of the base transceiver stations, are omitted.

With this configuration, the measurement device according to the seventh aspect of the present invention is able to display all base transceiver stations in a limited display area through notation of the first and last numbers of the base transceiver stations compliant with the first or second communication standard respectively associated with the two first cell icons and the two second cell icons. The first and last numbers are connected to each other by the lines.

The measurement device according to an eighth aspect may be configured such that the measurement device simulates three or more base transceiver stations. The display control means (30d) causes the display unit (33) to further display a simulation model display area having display areas respectively corresponding to a base transceiver station compliant with the first communication standard and a base transceiver station compliant with the second communication standard, and to display, on the display area for displaying the base transceiver station compliant with the first communication standard, the first form in which a numerical value corresponding to the number of base transceiver stations compliant with the first communication standard is attached to the first cell icon, and to display, on the display area for displaying the base transceiver station compliant with the second communication standard, the second form in which a numerical value corresponding to the number of base transceiver stations compliant with the second communication standard is attached to the second cell icon.

With this configuration, in the measurement device according to the eighth aspect of the present invention, by performing display such that numerical values are respectively attached to the one first cell icon and the one second cell icon in both the display area for displaying the base transceiver stations compliant with the first communication standard and the display area for displaying the base transceiver stations compliant with the second communication standard in the simulation model display area, the display area can be saved. Further, each number of base transceiver stations can be easily detected from each of the numerical values attached to the first cell icon and the second cell icon.

According to a ninth aspect of the present invention, the measurement device according to any one of the first to seventh aspects characterized in that the first communication standard is any one of NR or LTE, and the second communication standard is the other one of NR or LTE.

With this configuration, the measurement device according to the ninth aspect of the present invention can be applied to the measurement of the communication terminal in the non-standalone NR operation. Thus, even in a case where the number of NR and LTE base transceiver stations increases, it is possible to display an image of all base transceiver stations within a limited display area by saving the display area.

In order to solve the above problem, a communication terminal measurement system according to a tenth aspect of the present invention is a communication terminal measurement system that simulates a plurality of base transceiver stations so as to test a communication terminal. The plurality of base transceiver stations include a base transceiver station compliant with a first communication standard and a base transceiver station compliant with a second communication standard. The communication terminal measurement system comprises: a measurement device (20) that is compliant with the first communication standard and includes a first transmitting/receiving unit which transmits and receives a signal of the first communication standard between the base transceiver station compliant with the first communication standard and the communication terminal; a measurement device (21) that is compliant with the second communication standard and includes a second transmitting/receiving unit which transmits and receives a signal of the second communication standard between the base transceiver station compliant with the second communication standard and the communication terminal; a control device (22) that has a pseudo base transceiver station control unit (4, 22) that controls the first and second transmitting/receiving units such that the transmitting/receiving units each perform a simulative communication operation for simulating communication between the communication terminal and plurality of base transceiver stations, a display unit (33) that displays measurement-related information relating to measurement of the communication terminal, and display control means (30d) for causing the display unit (33) to display the measurement-related information relating to the measurement of the communication terminal based on a signal transmitted to and received from the communication terminal during the simulative communication operation. The display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations corresponding to the second communication standard in association with the second cell icon.

The communication terminal measurement system according to an eleventh aspect of the present invention may be configured such that a number of the plurality of the base transceiver stations are three or more, the first form is a set of the same number of graphic forms as the number of base transceiver stations compliant with the first communication standard arranged in association with the first cell icon, and the second form is a set of the same number of graphic forms as the number of base transceiver stations compliant with the second communication standard arranged in association with the second cell icon, in which the display control means displays a number for identifying the base transceiver station compliant with the first communication standard and a number for identifying the base transceiver station compliant with the second communication standard for each of the graphic forms.

With this configuration, the communication terminal measurement system according to the eleventh aspect of the present invention is able to constantly display one first cell icon and one second cell icon. In addition, even in a case where the number of base transceiver stations compliant with the first communication standard and the number of base transceiver stations compliant with the second communication standard increases, the display area can be saved. In addition, all base transceiver stations can be displayed in a graphic form in association with the first cell icon and the second cell icon, respectively.

In order to solve the above problem, a communication terminal measurement system according to a twelfth aspect of the present invention is configured such that the measurement system simulates four or more base transceiver stations. The four or more base transceiver stations include two or more base transceiver stations compliant with the first communication standard and two or more base transceiver stations compliant with the second communication standard, the first form is a form in which an additional first cell icon is arranged next to the first cell icon, and the second form is a form in which an additional second cell icon is arranged next to the second cell icon.

With this configuration, the communication terminal measurement system according to the twelfth aspect of the present invention is able to display two first cell icons and two second cell icons. In addition, the display area can be prevented from being extended in accordance with the number of base transceiver stations compliant with the first communication standard and the number of base transceiver stations compliant with the second communication standard.

The communication terminal measurement system according to a thirteenth aspect of the present invention may be configured as follows. The first cell icon is the first cell icon corresponding to the first numbered base transceiver station of the base transceiver station compliant with the first communication standard and the additional first cell icon is the first cell icon corresponding to the last numbered base transceiver station of the base transceiver station compliant with the first communication standard. The two second cell icons is the second cell icon corresponding to the first numbered base transceiver station of the base transceiver station compliant with the second communication standard and the additional second cell icon is the second cell icon corresponding to the last numbered base transceiver station of the base transceiver station compliant with the second communication standard. The first form further includes information for identifying the first communication standard and first and last numbers of the base transceiver stations compliant with the first communication standard are separated and transcribed in association with each of the first cell icons, and the second form further includes information for identifying the second communication standard and first and last numbers of the base transceiver stations compliant with the second communication standard are separated and transcribed in association with each of second cell icons.

With this configuration, the communication terminal measurement system according to the thirteenth aspect of the present invention is able to display all base transceiver stations in a limited display area by displaying combination of information for identifying the first or second communication standard respectively associated with the two first cell icons and the two second cell icons and notation of the first and last numbers of the base transceiver stations compliant with the first or second communication standard. The first and last numbers are separated from each other.

The communication terminal measurement system according to a fourteenth aspect of the present invention may be configured such that the first form further includes a form between the first and last numbers of the base transceiver stations, indicating that numbers, which are continuous between the first and the last numbers of the base transceiver stations, are omitted and the first form further includes a form between the first and last numbers of the base transceiver stations, indicating that numbers, which are continuous between the first and the last numbers of the base transceiver stations, are omitted.

With this configuration, the communication terminal measurement system according to the fourteenth aspect of the present invention is able to display all base transceiver stations in a limited display area through notation of the first and last numbers of the base transceiver stations compliant with the first or second communication standard respectively associated with the two first cell icons and the two second cell icons. The first and last numbers are connected to each other by the lines.

In order to solve the above problem, a communication terminal measurement system according to a fifteenth aspect of the present invention is configured such that the measurement system that simulates three or more base transceiver stations. The display control means (30d) causes the display unit (33) to further display simulation model display area having display areas respectively corresponding to the base transceiver station compliant with the first communication standard and the base transceiver station compliant with the second communication standard, and to display on the display area for displaying the base transceiver station compliant with the first communication standard the first form in which a numerical value corresponding to the number of base transceiver stations compliant with the first communication standard is attached to the one first cell icon, and to display on the display area for displaying the base transceiver station compliant with the second communication standard, the second form in which a numerical value corresponding to the number of base transceiver stations compliant with the second communication standard is attached to the one second cell icon.

With this configuration, in the communication terminal measurement system according to the fifteenth aspect of the present invention, by performing display such that numerical values are respectively attached to the one first cell icon and the one second cell icon in both the display area for displaying the base transceiver stations compliant with the first communication standard and the display area for displaying the base transceiver stations compliant with the second communication standard in the simulation model display area, the display area can be saved. Further, each number of base transceiver stations can be easily detected from each of the numerical values attached to the first cell icon and the second cell icon.

The communication terminal measurement system according to a sixteenth aspect of the present invention may be configured such that the first communication standard is any one of NR or LTE, and the second communication standard is the other one of NR or LTE.

With this configuration, the communication terminal measurement system according to the sixteenth aspect of the present invention can be applied to the measurement of the communication terminal in the non-standalone NR operation. Thus, even in a case where the number of NR and LTE base transceiver stations increases, it is possible to display an image of all base transceiver stations within a limited display area by saving the display area.

A measurement device used in the communication terminal measurement system according to a seventeenth aspect of the present invention is configured such that the communication terminal measurement system that simulates a plurality of base transceiver stations so as to test a communication terminal. The plurality of base transceiver stations include a base transceiver station compliant with a first communication standard and a base transceiver station compliant with a second communication standard. The communication terminal measurement system comprises: a measurement device that is compliant with the first communication standard and includes a first transmitting/receiving unit (3, 20, 21) which transmits and receives a signal of the first communication standard between the base transceiver station compliant with the first communication standard and the communication terminal; a measurement device that is compliant with the second communication standard and includes a second transmitting/receiving unit (3, 20, 21) which transmits and receives a signal of the second communication standard between the base transceiver station compliant with the second communication standard and the communication terminal; a control device that has a pseudo base transceiver station control unit (4, 22) that controls the first and second transmitting/receiving units (3, 20, 21) such that the transmitting/receiving units each perform a simulative communication operation for simulating communication between the communication terminal and the a plurality of base transceiver stations, a display unit (33) that displays measurement-related information relating to measurement of the communication terminal, and display control means (30d) for causing the display unit (33) to display the measurement-related information relating to the measurement of the communication terminal based on a signal transmitted to and received from the communication terminal during the simulative communication operation; and wherein the display control means (30d) displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations corresponding to the second communication standard in association with the second cell icon, in which the measurement device is compliant with the first communication standard or the second communication standard.

In order to solve the above problem, a communication terminal measurement system according to an eighteenth aspect of the present invention is a measurement device that simulates a plurality of base transceiver stations so as to test a communication terminal. The plurality of base transceiver stations include a base transceiver station compliant with a first communication standard and a base transceiver station compliant with a second communication standard. The measurement device includes a transmitting/receiving unit (3, 20, 21) that transmits and receives a signal of the first communication standard between the base transceiver station compliant with the first communication standard and the communication terminal and that transmits and receives a signal of the second communication standard between the base transceiver station compliant with the second communication standard and the communication terminal. The measurement device is controlled by a control device including a pseudo base transceiver station control unit (4, 22), a display unit (33), and a display control means (30d). The pseudo base transceiver station control unit (4, 22) controls the transmitting/receiving unit (3, 20, 21) such that the transmitting/receiving unit (3, 20, 21) performs a simulative communication operation for simulating communication between the communication terminal and the plurality of base transceiver stations. The display unit (33) displays measurement-related information relating to measurement of the communication terminal. The display control means (30d) causes a display unit (33) to display measurement-related information on measurement of the communication terminal based on a signal transmitted to and received from the communication terminals during the simulative communication operation and to further display a first cell icon indicating being compliant with the first communication standard and a second cell icon indicating being compliant with the second communication standard, a first form indicating an information of base transceiver stations compliant with the first communication standard in association with the first cell icon, and a second form indicating an information of base transceiver stations compliant with the second communication standard are arranged in association with the second cell icon.

In order to solve the above-mentioned problem, a measurement-related information display method according to a nineteenth aspect of the present invention is a measurement-related information display method of simulating a plurality of base transceiver stations each including base transceiver stations compliant with a first communication standard and a second communication standard and displaying measurement-related information relating to measurement of a communication terminal. The method comprises: a receiving step (S34) of receiving a setting of a combination of the base transceiver station compliant with the first communication standard and the base transceiver station compliant with the second communication standard; and a display control step (S44) of displaying, on the basis of the combination of the base transceiver station compliant with the first communication standard and the base transceiver station compliant with the second communication standard received in the receiving step, a form which includes a first cell icon indicating being compliant with the first communication standard and a second cell icon indicating being compliant with the second communication standard within a connection status display area with a predetermined size, a first form indicating an information of base transceiver stations compliant with each of the first communication standard in association with the first cell icon and a second form indicating an information of base transceiver stations compliant with the second communication standard in association with the second cell icon.

With this configuration, in the measurement-related information display method according to the nineteenth aspect of the present invention, in the display control step, one first cell icon and one second cell icon may be constantly displayed. In addition, even in a case where the number of base transceiver stations compliant with the first communication standard and the number of base transceiver stations compliant with the second communication standard increases, the display area can be saved. In addition, all base transceiver stations can be displayed in a graphic form in association with the first cell icon and the second cell icon, respectively.

Advantage of the Invention

According to the present invention, it is possible to provide a measurement device that tests the communication terminal by simulating the base transceiver stations, a communication terminal measurement system, and a measurement-related information display method capable of displaying images of base transceiver stations in a designated display area by saving an area of a screen even in a case where the number of base transceiver stations compliant with the old communication standard or the number of base transceiver stations compliant with the new communication standard increases, when performing communication in an operation mode in which old and new communication standards are mixed.

BEST MODE FOR CARRYING OUT THE INVENTION

Hereinafter, an embodiment of a measurement device, a communication terminal measurement system, and a measurement-related information display method according to the present invention will be described with reference to the drawings.

A measurement device and a communication terminal measurement system according to the present invention transmit and receive signal (RF signal) based on a predetermined communication standard (for example, LTE or NR) with a newly developed mobile communication terminal such as a mobile phone. Thereby, the communication operation of the mobile communication terminal is tested by simulating a base transceiver station.

In particular, the measurement device and the communication terminal measurement system according to the present invention can also support the measurement of a terminal performing communication according to the above-mentioned NR communication standard, and has a function of simulating NR base transceiver stations and LTE base transceiver stations arranged in each area of NR and LTE in a non-standalone NR network. The NR communication standard and the LTE communication standard correspond to the first communication standard and the second communication standard of the present invention, respectively.

The measurement device and the communication terminal measurement system according to the present invention include: a display function for detecting the setting contents of the multiplex communication and the status of the multiplex communication under test, including information indicating the subordinate relationship of the multiplex communication; a measurement function of the user equipment UE (terminal) provided for the non-standalone NR operation; and a display function for displaying measurement-related information relating to the measurement.

Figure 1:
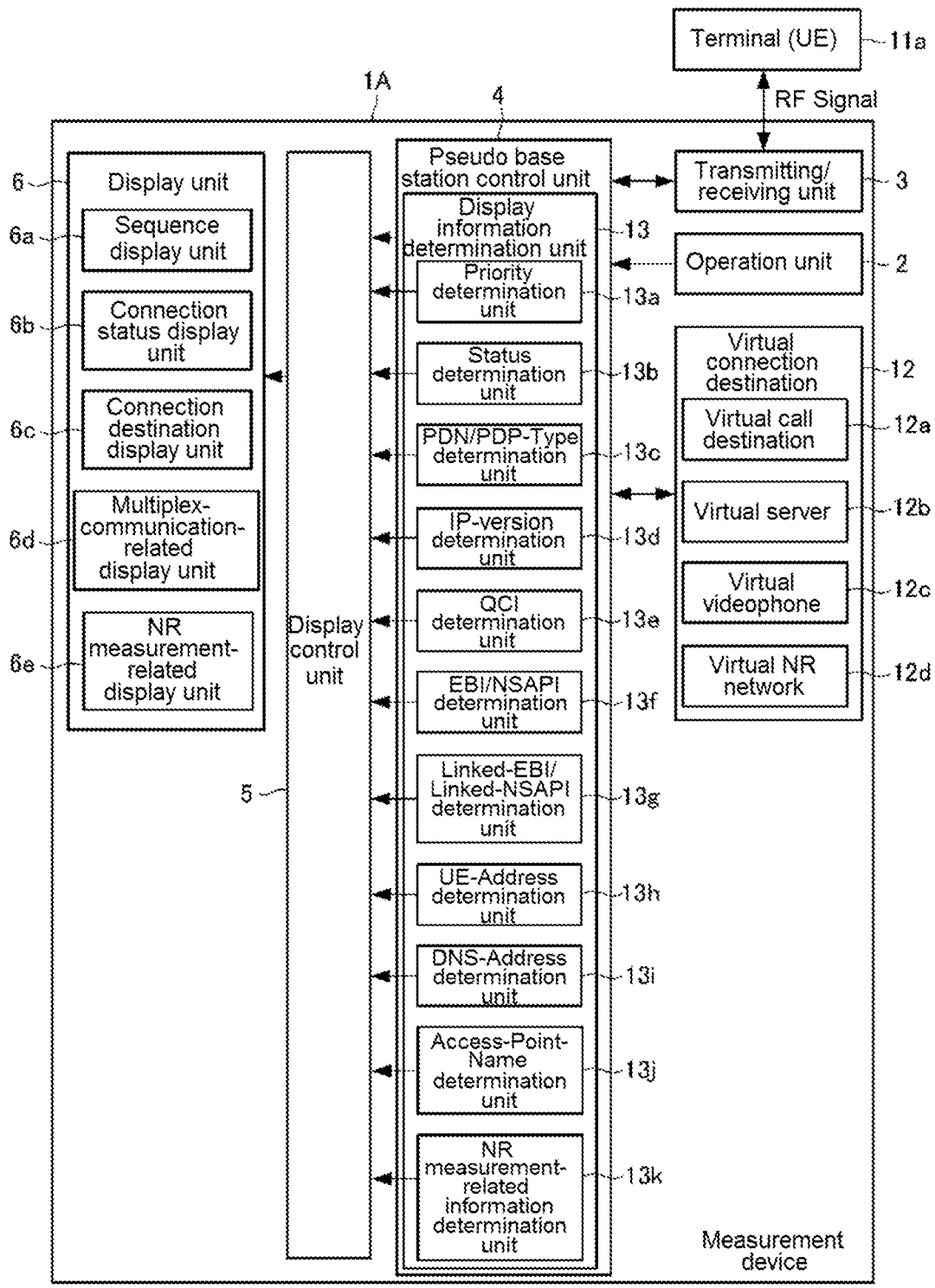
FIG. 1 is a block diagram showing a configuration of a measurement device according to an embodiment of the present invention.

As shown in FIG. 1, the measurement device 1A according to one embodiment of the present invention is schematically configured to include, as components for realizing the measurement function and the display function, an operation unit 2, a transmitting/receiving unit 3, a pseudo base transceiver station control unit 4, a display control unit 5, and a display unit 6. Hereinafter, each component will be described.

The operation unit 2 includes an operation panel such as switches and buttons provided on the front surface of the housing of the measurement device 1A, for example. The operation unit 2 selectively performs an instruction to start or stop a communication operation test of a mobile communication terminal (hereinafter, abbreviated as a terminal) 11a to be tested, and various settings necessary for a communication operation test of the terminal 11a including various kinds of information settings necessary for performing a desired display on a display unit 6 (a sequence display unit 6a, a connection status display unit 6b, a connection destination display unit 6c, and a multiplex-communication-related display unit 6d to be described later). The terminal 11a described in the present embodiment is a 5G terminal, and is compliant with 5GNR, LTE, and pre-LTE communication standards.

Under the control of the pseudo base transceiver station control unit 4, the transmitting/receiving unit 3 transmits a signal (RF signal) of the NR communication standard, the LTE communication standard, or the pre-LTE communication standard from a virtual connection destination 12 to the terminal 11a as a test target, and inputs the signal (RF signal) of the NR communication standard, the LTE communication standard, or the pre-LTE communication standard received from the terminal 11a to the virtual connection destination 12. The transmitting/receiving unit 3 has function of appropriately transmitting and receiving signals conforming to the NR communication standard, the LTE communication standard, and the pre-LTE communication standard between the pseudo base transceiver station and the terminal 11a.

The virtual connection destination 12 is a destination that is incorporated in the measurement device 1A and can be connected to the terminal 11a under the control of the pseudo base transceiver station control unit 4, and corresponds to a virtual call destination 12a, a virtual server 12b, a virtual videophone 12c, a virtual NR network 12d, and the like as shown in FIG. 1.

The pseudo base transceiver station control unit 4 collectively controls each unit of the transmitting/receiving unit 3, the display control unit 5, and the display unit 6 based on the operation information of the operation unit 2 so as to execute a predetermined scenario and perform a communication operation test of the terminal 11a.

It should be noted that the scenario describes a test procedure of series of operations for simulating a communication sequence based on a predetermined communication standard (for example, LTE standard, NR standard, or the like) in the measurement device 1A that simulates a base transceiver station. In the measurement device 1A according to the present embodiment, a description is also given of, as the above-described scenario, a test procedure of a series of operations for simulating a communication sequence based on the NR communication standard between each base transceiver station in the LTE and NR areas in the network relating to the non-standalone NR operation and the terminal 11a that is the measurement target terminal. That is, the virtual NR network 12d, which is one of the virtual connection destinations 12, has a functional configuration for simulating communication with the terminal 11a based on the NR communication standard.

In addition, when the terminal 11a performs multiplex communication, the pseudo base transceiver station control unit 4 has a display information determination unit 13 that determines various types of display information to be displayed on the multiplex-communication-related display unit 6d to be described later on the basis of operation information (including setting information) from the operation unit 2 and notification information from the terminal 11a.

More specifically, as shown in FIG. 1, the display information determination unit 13 includes a Priority determination unit 13a, a Status determination unit 13b, a PDN/PDP-Type determination unit 13c, an internet protocol (IP)-version determination unit 13d, a QCI determination unit 13e, an EPS bearer identifier (EBI)/network service access point identifier (NSAPI) determination unit 13f, a Linked-EBI/Linked-NSAPI determination unit 13g, a UE-Address determination unit 13h, a domain name system (DNS)-Address determination unit 13i, an Access-Point-Name determination unit 13j, and an NR measurement-related information determination unit 13k.

The pre-LTE, LTE, and NR systems share the Priority determination unit 13a, the Status determination unit 13b, the PDN/PDP-Type determination unit 13c, the internet protocol (IP)-version determination unit 13d, the QCI determination unit 13e, the EPS bearer identifier (EBI)/network service access point identifier (NSAPI) determination unit 13f, the Linked-EBI/Linked-NSAPI determination unit 13g, the UE-Address determination unit 13h, the domain name system (DNS)-Address determination unit 13i, and the Access-Point-Name determination unit 13j. The NR measurement-related information determination unit 13k processes only NR information.

The Priority determination unit 13a determines Priority, which is a number for distinguishing a packet data network (PDN) or a packet data protocol (PDP), inside the measurement device 1A. When the terminal 11a performs transmission, the measurement device 1A automatically adds the priority in response to the call from the terminal 11a. In addition, in a case where the measurement device 1A performs transmission, a tester operates the operation unit 2 to perform the setting in advance.

The PDN or PDP is a logical connection through packet data communication for each service between the terminal (hereinafter, also referred to as UE) 11 and the virtual connection destination 12 through a packet data communication network, and the logical connection is referred to as PDN in LTE and referred to as PDP in GSM (registered trademark)/W-CDMA.

The multi-PDP (multi-PDN) means a plurality of PDPs (PDNs), that is, multiple connections, and is roughly classified into two types of (A) and (B) shown below, and the two types may be mixed.

(A) PDPs based on completely different services are multiplexed. In this case, each communication destination has a different IP address, and the UE has multiple connections with communication destinations having different IP addresses. Each PDP-Type is Primary (default in LTE). In addition, one UE may perform a plurality of communications using a plurality of IP addresses in addition to a communication destination. Also in this case, the UE becomes multi-PDPs.

(B) PDPs based on mutually related services are multiplexed. For example, in a case where voice data is communicated using voice over internet protocol (VoIP), the UE exchanges control information (login, incoming call notification, and the like) with a session initiation protocol (SIP) server, and also exchanges voice data. In this case, the control information and the voice data are different PDPs, and are multi-PDPs. Here, in each PDP-Type, the control information is Primary (Default in LTE), and the voice data is Secondary (Dedicated in LTE).

It should be noted that the VoIP is a technology for compressing voice by various encoding methods, converting the voice into packets, and transmitting the packets in real time through an IP network. Since LTE is a packet-switched communication system, a telephone call is performed by the VoIP.

The SIP is a session control protocol for performing operations such as starting, changing, and ending a session in two-way real-time communication such as a telephone or a videophone. The SIP server used for VoIP performs relay of communication between UEs.

Figure 25:
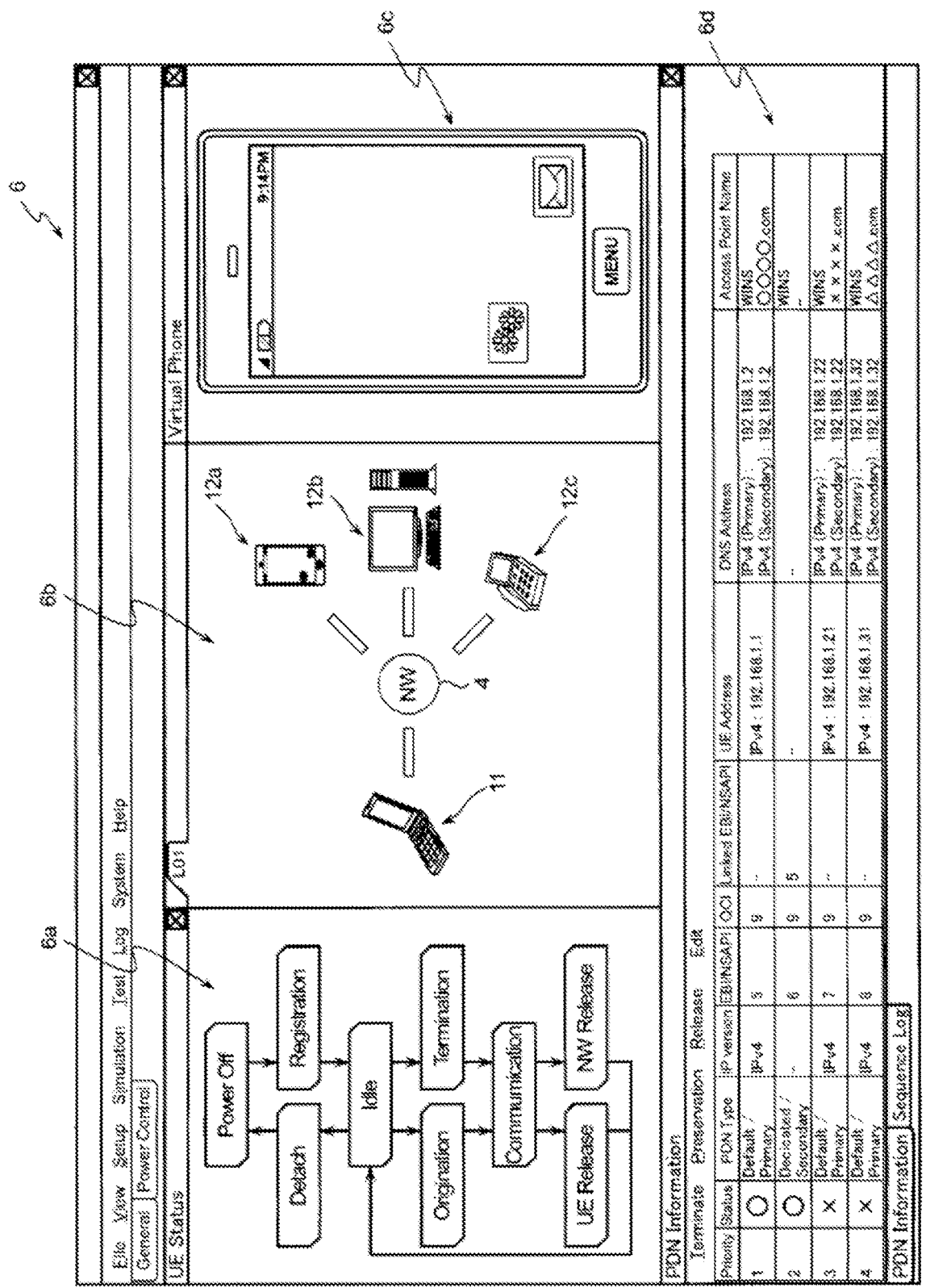
FIG. 25 is a prior art diagram showing a display example of measurement-related information of the measurement device according to an embodiment of the present invention.
Figure 26:
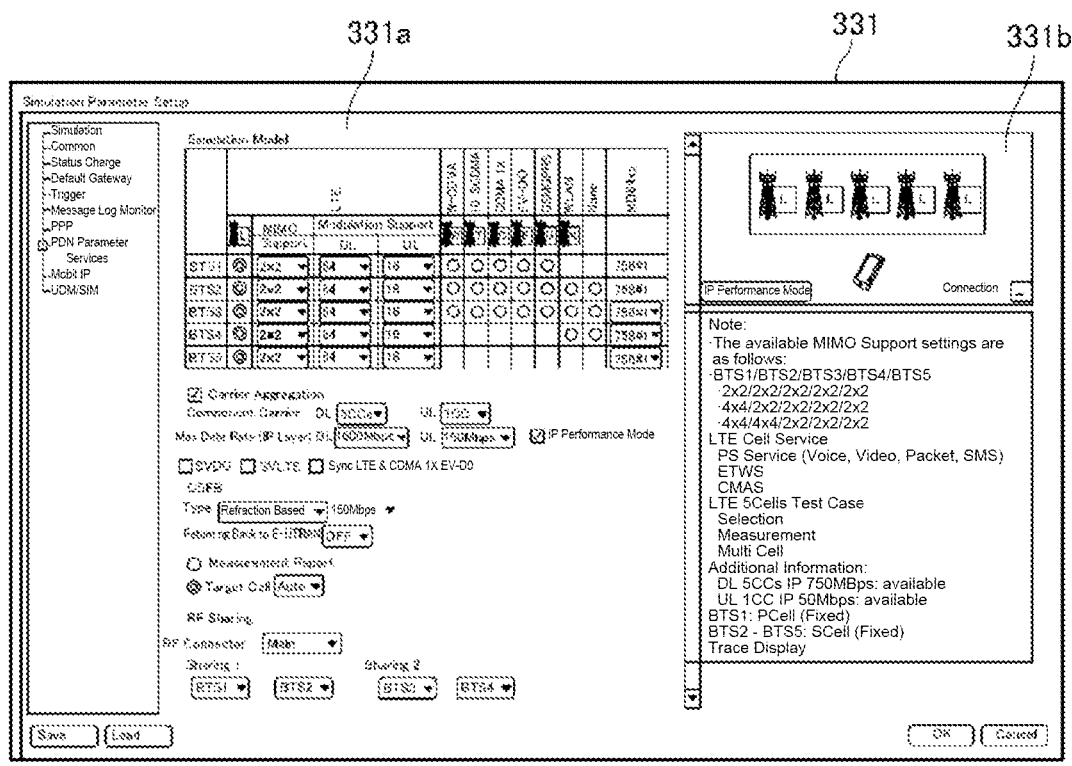
FIG. 26 is a diagram showing a display example of a simulation model setting screen having a RAT cell number setting area and a simulation model display area in a conventional measurement device.

The Status determination unit 13b determines Status indicating a connection status. In the connection destination display unit 6c to be described later, the connection status (the status where PDN or PDP is registered) and the disconnection status (the status of PDN or PDP) are controlled by the display control unit 5 based on the Status determined by the Status determination unit 13b. As shown in FIG. 25, the two statuses (unregistered status) are distinguished and displayed by corresponding icons. The display is automatically switched by the measurement device 1A determining the status.

Here, the connection status is a status where an IP address is assigned, and the disconnection status is a status where an IP address is not assigned. Simply not communicating is not defined as a disconnection status. In the actual operation, even in a case where the wireless communication is cut off momentarily after entering the tunnel during the communication, the PDP registration is maintained, and the communication resumed in a case where the wireless communication is restored. The disconnection status may occur due to spontaneous disconnection processing or a long timeout.

The PDN/PDP-Type determination unit 13c determines a PDN-Type indicating the type of PDN and a PDP-Type indicating the type of PDP.

There are two types of PDN-Type: Default and Dedicated, and two types of PDP-Type: Primary and Secondary.

Further, taking PDP-Type as an example, Primary is a PDP having an IP address, that is, a parent PDP. A plurality of Primary PDPs can exist.

The Secondary is a PDP having no IP address, that is, a child PDP. The Primary PDP can exist alone, whereas the Secondary PDP is subordinate to the Primary PDP. A plurality of Secondary PDPs can be subordinate to one Primary PDP. In PDN-Type, Default corresponds to Primary and Dedicated corresponds to Secondary.

The PDN/PDP-Type determination unit 13c differs in the method of determining the value of PDN-Type or PDP-Type depending on whether the communication standard is LTE or GSM/W-CDMA.

That is, in a case where the communication standard is LTE and the terminal 11a performs transmission, the terminal 11a determines and notifies the PDN-Type, and the PDN/PDP-Type determination unit 13c outputs the information to the display control unit 5. In a case where the communication standard is LTE and the measurement device 1A performs transmission, the tester operates the operation unit 2 to set the PDN/Type in advance through the PDN/PDP-Type determination unit 13c. It should be noted that the PDN-Type can also be automatically set by the measurement device 1A.

In a case where the communication standard is GSM/W-CDMA and the terminal 11a performs transmission, the terminal 11a determines and notifies the PDP-Type, and the PDN/PDP-Type determination unit 13c outputs the information to the display control unit 5. Further, in a case where the communication standard is GSM/W-CDMA and the measurement device 1A performs transmission, the PDN/PDP-Type determination unit 13c responds to the notification of the Access-Point-Name from the measurement device 1A, the terminal 11a notifies the PDP-Type and the NSAPI, and makes the determination on the basis of the information.

Then, in the multiplex-communication-related display unit 6d, which will be described later, under the control of the display control unit 5 based on the PDN-Type or PDP-Type determined by the PDN/PDP-Type determination unit 13c, for displayed in a display form shown in FIG. 25, for example.

The IP-version determination unit 13d determines an IP-version indicating the type of the IP. More specifically, in a case where the terminal 11a performs transmission, the terminal 11a determines and notifies the IP-version, and the IP-version determination unit 13d outputs the information to the display control unit 5. On the other hand, in a case where the measurement device 1A performs transmission, the tester operates the operation unit 2 to set the IP-version in advance. It should be noted that the measurement device 1A can automatically set the IP-version.

Figure 13:
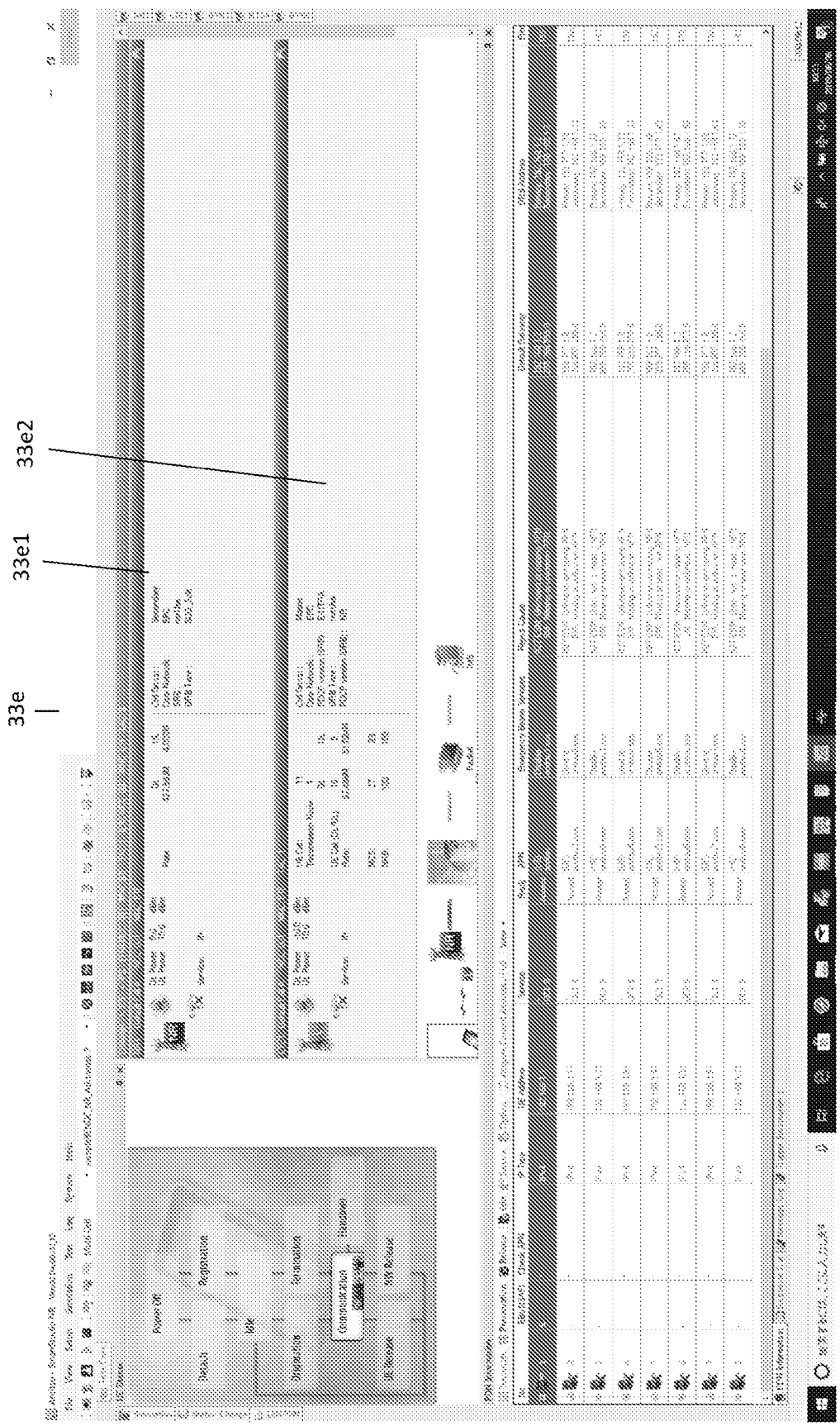
FIG. 13 is a diagram showing a display example of a DC operation confirmation screen used for measurement of a terminal of the measurement device according to an embodiment of the present invention.

Then, in the multiplex-communication-related display unit 6d, which will be described later, under the control of the display control unit 5 based on the IP-version determined by the IP-version determination unit 13d, for example, any one of IPv4, IPv6, and IPv4v6 in the display form shown in FIG. 13 is displayed.

It should be noted that IPv4v6 means dual stack. The dual stack is a technology that uses IPv4 and IPv6 coexistently, and one measurement device 1A can have both IPv4 and IPv6 addresses and mix both protocols.

The QCI determination unit 13e determines a QCI that is an identification code indicating a class of a service associated with the service contents. This QCI is determined by the pseudo base transceiver station control unit 4 of the measurement device 1A. Therefore, the tester operates the operation unit 2 to perform the setting in advance in both a case where the terminal 11a performs transmission and a case where the measurement device 1A performs transmission. It should be noted that the measurement device 1A can automatically set the QCI.

The EBI/NSAPI determination unit 13f determines NSAPI, which is basic information for identifying the PDN and EBI, which is basic information for identifying the PDP, on the basis of the ID allocated to the PDN or PDP. EBI/NSAPI is referred to as EBI in LTE and NSAPI in GSM/W-CDMA.

The EBI/NSAPI determination unit 13f differs in the method of determining the value depending on whether the communication standard is LTE or GSM/W-CDMA.

That is, in a case where the communication standard is LTE and the terminal 11a performs transmission, the terminal 11a determines and notifies the EBI, the EBI/NSAPI determination unit 13f outputs the information to the display control unit 5. As an example, in the communication standard LTE, in a case where the terminal 11a notifies EBI "5" of PDN1 (Default) and EBI "6" of PDN2 (Dedicated), the terminal 11a outputs the information to the display control unit 5. In addition, in a case where the communication standard is LTE and the measurement device 1A performs transmission, the tester operates the operation unit 2 to set the EBI in advance through the EBI/NSAPI determination unit 13f. It should be noted that the measurement device 1A can automatically set the EBI.

On the other hand, in a case where the communication standard is GSM/W-CDMA and the terminal 11a performs transmission, the terminal 11a determines and notifies the NSAPI, and the EBI/NSAPI determination unit 13f outputs the information to the display control unit 5. As an example, in the communication standard GSM/W-CDMA, in a case where the terminal 11a notifies the NSAPI "5" of PDN1 (Primary) and the NSAPI "6" of PDN2 (Secondary), the information is output to the display control unit 5. In addition, in a case where the communication standard is GSM/W-CDMA and the measurement device 1A performs transmission, the tester operates the operation unit 2 to set the NSAPI in advance through the EBI/NSAPI determination unit 13f. It should be noted that the measurement device 1A can automatically set NSAPI.

The Linked-EBI/Linked-NSAPI determination unit 13g determines Linked-EBI/Linked-NSAPI on the basis of setting information obtained by operating the operation unit 2 or information (notification information) included in a packet for each service from the terminal 11a. The Linked-EBI/Linked-NSAPI is subordinate relationship identification information that is allocated only to the Secondary PDP (Dedicated PDN) and indicates the subordinate relationship to which Primary PDP (Default PDN).

The method of determining the value of Linked-EBI/Linked-NSAPI by the Linked-EBI/Linked-NSAPI determination unit 13g differs depending on whether the communication standard is LTE or GSM/W-CDMA.

More specifically, in a case where the communication standard is LTE and the terminal 11a performs transmission, the terminal 11a determines and notifies Linked-EBI, and the Linked-EBI/Linked-NSAPI determination unit 13g outputs the information to the display control unit 5. As an example, in the communication standard LTE, in a case where the terminal 11a notifies of Linked-EBI "5" of PDN2 (Dedicated), the Linked-EBI "5" is output to the display control unit 5. In a case where the communication standard is LTE and the measurement device 1A performs transmission, the tester operates the operation unit 2 to set Linked-EBI in advance. It should be noted that the measurement device 1A can automatically set Linked-EBI.

On the other hand, in a case where the communication standard is GSM/W-CDMA and the terminal 11a performs transmission, first, there is a notification for setting the Primary PDP, which includes values of NSAPI and a transaction identifier (TI: an identifier for identifying the processing (processing group)). Next, there is a notification for setting the Secondary PDP, which includes the value of Linked-TI. Here, in a case where the value of the TI of the Primary PDP 1 and the value of the Linked-TI of the Secondary PDP 2 are the same, the Primary PDP 1 and the Secondary PDP 2 are in a parent-child relationship. Utilizing this, the Linked-EBI/Linked-NSAPI determination unit 13g determines which Primary PDP the Secondary PDP notified from the terminal 11a is subordinate to, and determines the NSAPI value of the master Primary PDP is determined as the value of the Linked-TI of the slave Secondary PDP. As an example, in the communication standard GSM/W-CDMA, since the value of the TI of the Primary PDP1 and the value of the Linked-TI of the Secondary PDP2 are both "0" and the same value, it is determined that the Primary PDP1 and the Secondary PDP2 have a parent-child relationship. Thus, the NSAPI value "5" of the master Primary PDP1 is determined as the Linked-NSAPI value "5" of the slave Secondary PDP2.

In a case where the communication standard is GSM/W-CDMA and the measurement device 1A performs transmission, the tester operates the operation unit 2 to set Linked-NSAPI in advance. It should be noted that the measurement device 1A can automatically set Linked-NSAPI.

In this example, in the communication standard GSM/W-CDMA, the one corresponding to the Linked-EBI of the communication standard LTE is called Linked-NSAPI.

Then, in the multiplex-communication-related display unit 6d to be described later, under the control of the display control unit 5 based on the Linked-EBI or the Linked-NSAPI determined by the Linked-EBI/Linked-NSAPI determination unit 13g, the values of the master EBI and NSAPI are displayed in, for example, a display form shown in FIG. 13.

The UE-Address determination unit 13h determines the UE-Address that is the IP address of the terminal 11a as a test target. The pseudo base transceiver station control unit 4 of the measurement device 1A determines the IP address of the terminal 11a. Therefore, the tester operates the operation unit 2 to perform the setting in advance in both a case where the terminal 11a performs transmission and a case where the measurement device 1A performs transmission. It should be noted that the measurement device 1A can automatically set the IP address of the terminal 11a.

The DNS-Address determination unit 13i determines a DNS-Address, which is the address of a DNS server. The DNS-Address is set in advance by the tester operating the operation unit 2. It should be noted that the DNS-Address can be automatically set by the measurement device 1A.

The DNS server is a server that manages the association between a domain name and an IP address. The measurement device 1A has a pseudo network function inside, and also simulates the DNS server. the "Primary/Secondary" of DNS-Address means a main system and a sub system (two or more DNS servers are usually provided).

Then, in the multiplex-communication-related display unit 6d to be described later, under the control of the display control unit 5 based on the DNS-Address determined by the DNS-Address determination unit 13i, the DNS server address is displayed in, for example, a display form shown in FIG. 25.

The Access-Point-Name determination unit 13j determines Access-Point-Name, which is the domain name of the communication carrier. The terminal 11a such as a mobile phone, which performs communication under contract with a specific communication carrier, performs communication through the Access-Point of the communication carrier. The measurement device 1A has a pseudo network function inside, and also simulates the domain of the communication carrier.

In a case where the terminal 11a performs transmission, the terminal 11a determines and notifies the Access-Point-Name, and the Access-Point-Name determination unit 13j outputs the information to the display control unit 5. In a case where the measurement device 1A performs transmission, the tester operates the operation unit 2 to set the Access-Point-Name in advance through the Access-Point-Name determination unit 13j.

It should be noted that the measurement device 1A is able to automatically set Access-Point-Name. Actually, the tester who is a terminal developer knows what Access-Point-Name the terminal 11a notifies, and sets the Access-Point-Name in the measurement device 1A.

In a case of measuring the terminal 11a, the NR measurement-related information determination unit 13k monitors a simulative communication operation in which the virtual NR network 12d simulates base transceiver stations in the NR area and the LTE area with the terminal 11a under the control of the pseudo base transceiver station control unit 4, and outputs various kinds of information, which are transmitted to and received from the terminal 11a in the simulative communication operation, as NR measurement-related information to the display control unit 5.

In this example, the pseudo base transceiver station control unit 4 is described as an example in which a pre-LTE communication standard such as GSM/W-CDMA, LTE, and NR are multiplexed. It is also possible to adopt a configuration in which functions compliant with only LTE and NR are selected.

Further, in the present embodiment, the display unit 6 has an NR measurement-related display unit 6e having a screen configuration different from the screen configuration shown in FIG. 25. The NR measurement-related display unit 6e is a functional unit that displays NR measurement-related information which is input from the NR measurement-related information determination unit 13k, and displays a main screen 33a (refer to FIG. 8) relating to measurement of the terminal 11a, which will be described later, and various screens of the lower hierarchy thereof, that is, a simulation model setting screen 33b (refer to FIGS. 9, 10, and 11), a connection confirmation/support request screen (refer to FIG. 12), a DC operation confirmation screen (refer to FIGS. 13 and 14), and a test case view screen (refer to FIG. 15), a component confirmation screen (refer to FIGS. 16 and 17), a power characteristic confirmation screen 33j (refer to FIG. 18), and a throughput confirmation screen 33k (refer to FIG. 19). In the present embodiment, the display control unit 5 also controls the display of the NR measurement-related information to the NR measurement-related information determination unit 13k. It should be noted that the pseudo base transceiver station control unit 4, the display control unit 5, and the display unit 6 may be provided in a control personal computer connected to the outside of the measurement device 1A.

Figure 2:
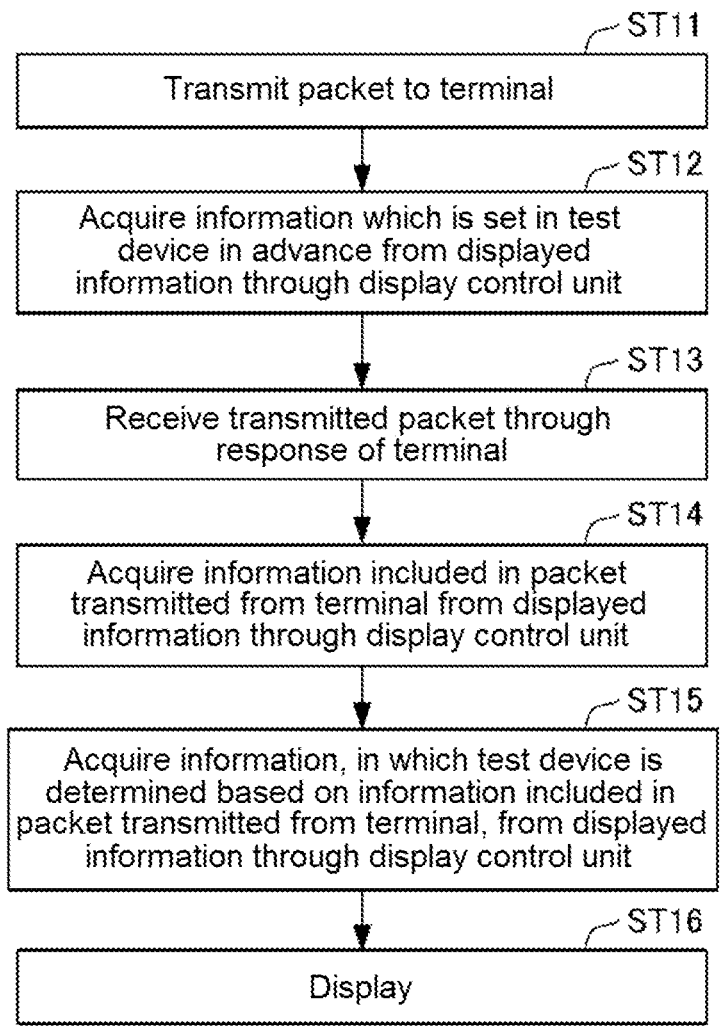
FIG. 2 is a flowchart showing an example of a display processing procedure in a case where a measurement device according to an embodiment of the present invention performs transmission.
Figure 3:
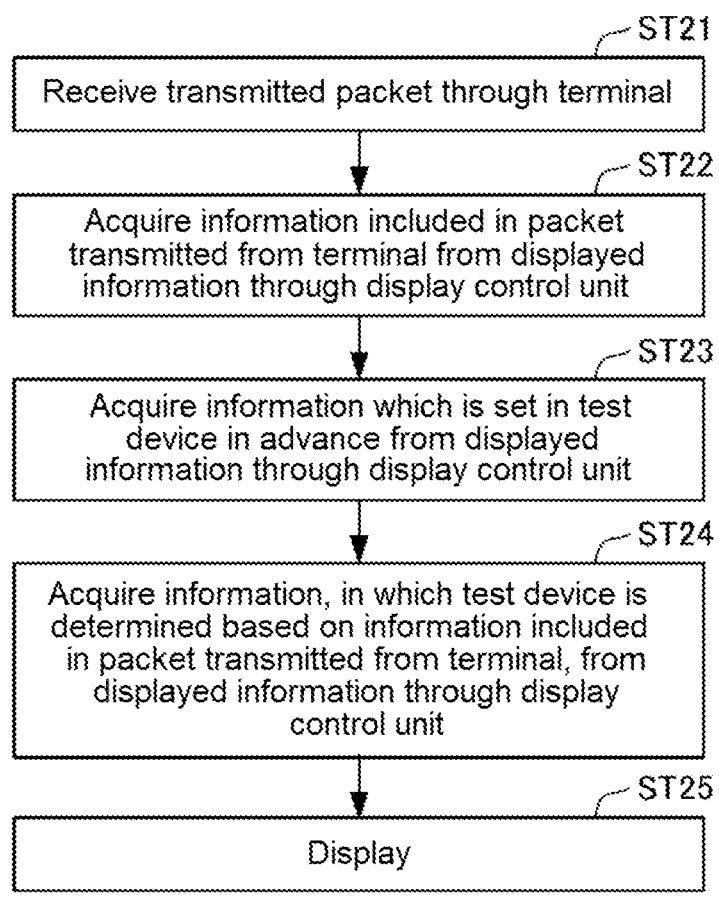
FIG. 3 is a flowchart showing an example of a display processing procedure in a case where a mobile communication terminal as a measurement target by the measurement device according to an embodiment of the present invention performs transmission.

Next, the display processing operation of the multiplex-communication-related information in the measurement device 1A configured as described above will be described with reference to the flowcharts of FIGS. 2 and 3. First, a display processing procedure in a case where the measurement device 1A performs transmission will be described with reference to a flowchart of FIG. 2.

Under the control of the pseudo base transceiver station control unit 4, the measurement device 1A transmits a packet from the transmitting/receiving unit 3 to the terminal 11a (ST11). Then, the display control unit 5 acquires information, which is set in advance in the measurement device 1A through the operation input of the operation unit 2, from the information displayed on the display unit 6 through the pseudo base transceiver station control unit 4 (ST12). Subsequently, the measurement device 1A receives the packet transmitted by the terminal 11a in response to the transmitting/receiving unit 3 (ST13). After that, in the measurement device 1A, the display control unit 5 acquires information, which is included in the packet from the terminal 11a, from the information displayed on the display unit 6 through the pseudo base transceiver station control unit 4 (ST14). Next, in the measurement device 1A, the display control unit 5 acquires the information, which is determined by the display information determination unit 13 on the basis of the information included in the packet from the terminal 11a, from the information displayed on the display unit 6 through the pseudo base transceiver station control unit 4. (ST15). Then, the display unit 6 displays the information acquired by the display control unit 5 in, for example, a display form shown in FIG. 25 (ST16).

Next, a display processing procedure in a case where the terminal 11a performs transmission will be described with reference to a flowchart of FIG. 3.

In the measurement device 1A, in a case where the transmitting/receiving unit 3 receives the packet transmitted by the terminal 11a under the control of the pseudo base transceiver station control unit 4 (ST21), the display control unit 5 acquires the information, which is included in the packet from the terminal 11a, from the information displayed on the display unit 6 through the pseudo base transceiver station control unit 4 (ST22). Subsequently, the display control unit 5 of the measurement device 1A acquires information preset in the measurement device 1A from the information displayed on the display unit 6 through the pseudo base transceiver station control unit 4 (ST23). Next, in the measurement device 1A, the display control unit 5 acquires the information, which is determined by the display information determination unit 13 on the basis of the information included in the packet from the terminal 11a, from the information displayed on the display unit 6 through the pseudo base transceiver station control unit 4. (ST24). Then, the display unit 6 displays the information acquired by the display control unit 5 in, for example, a display form shown in FIG. 25 (ST25).

Next, a measurement operation of the terminal 11a in the measurement device 1A according to the present embodiment and a display processing procedure for displaying the NR measurement-related information relating to the measurement will be described. First, the measurement operation of the terminal 11a will be described.

Figure 4:
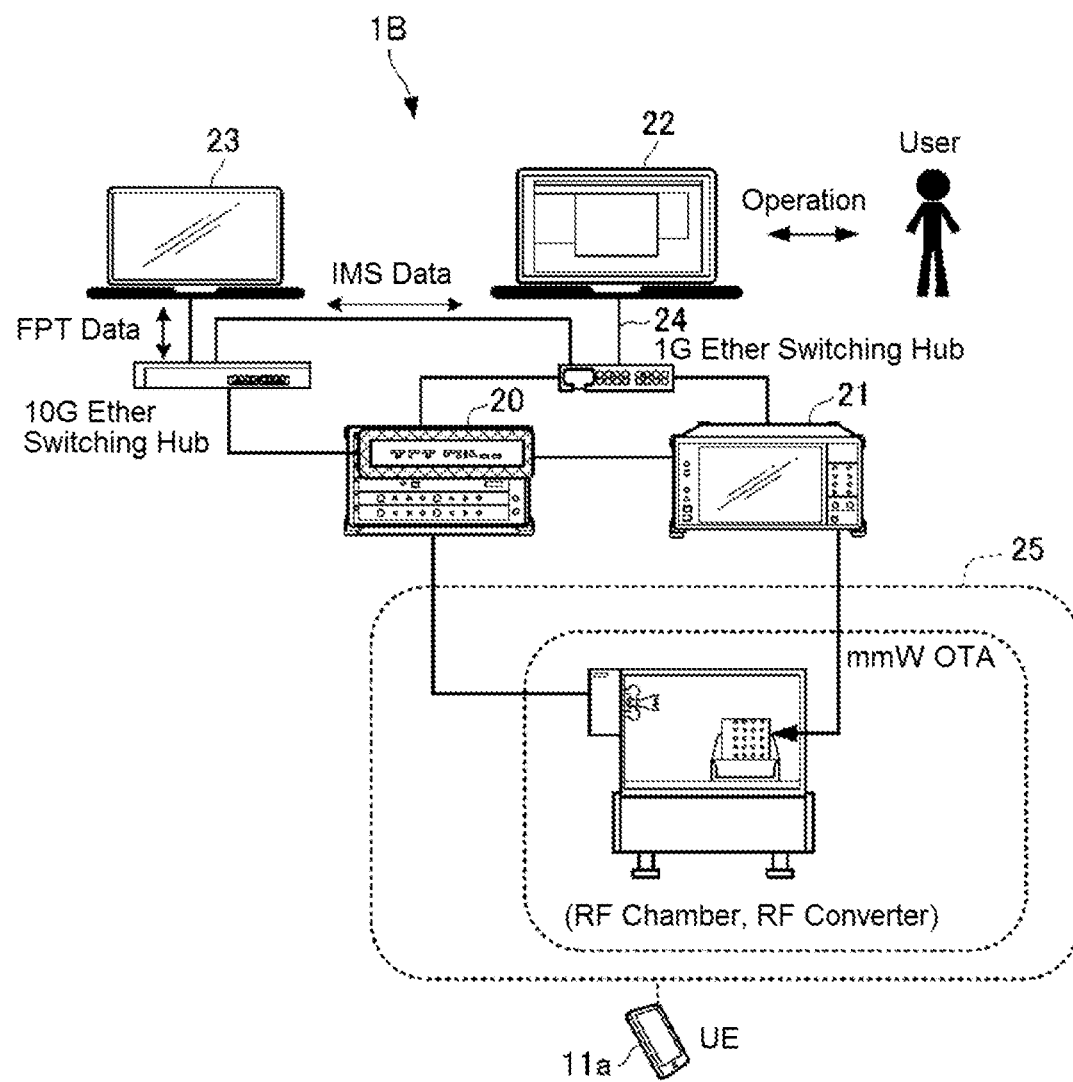
FIG. 4 is a block diagram showing a connection configuration of a measurement device according to an embodiment of the present invention as a communication terminal measurement system.

FIG. 4 is a diagram showing a connection configuration as a communication terminal measurement system 1B having the same functions as the measurement device 1A according to the present embodiment. In particular, the diagram shows an example the following configuration. An NR measurement device 20 that simulates the communication function of the base transceiver station in the NR area of the non-standalone NR network, an LTE measurement device 21 that are configured separately from the NR measurement device 20 and that simulates a communication function of the base transceiver station in the LTE area of the non-standalone NR network, and a control device 22 that collectively controls the NR measurement device 20 and the LTE measurement device 21 are connected through the network 24. The NR measurement device 20 includes a first transmitting/receiving unit (for example, corresponding to the transmitting/receiving unit 3 that transmits and receives a signal of the NR communication standard in FIG. 1) that transmits and receives a signal between the NR base transceiver station and the terminal 11a. The LTE measurement device 21 includes a second transmitting/receiving unit (for example, corresponding to the transmitting/receiving unit 3 that transmits and receives signals of the LTE communication standard in FIG. 1) that transmits and receives signals between the LTE base transceiver station and the terminal 11a. In the communication terminal measurement system 1B of the present embodiment having such a connection mode, the control device 22 is also connected to an application server 23 as an external server through a network 24.

The NR measurement device 20 and the LTE measurement device 21 are connected to a measurement mechanism unit 25 including a holding mechanism that holds the terminal 11a as a measurement target (refer "UE" in FIG. 4). The measurement mechanism unit 25 is configured as follows. For example, the terminal 11a as a measurement target and a measurement antenna (a transmission antenna and a reception antenna), which is capable of communicating with a not-shown antenna built in the terminal 11a by a predetermined radio frequency signal, are accommodated in, for example, an over-the-air (OTA) chamber 25a. In the frequency range of mmW, the NR measurement device 20 is connected to an antenna in the OTA chamber 25a, and the LTE measurement device 21 is connected by wire to the terminal 11a provided in the OTA chamber 25a. Although not shown, in the frequency range of Sub6 GHz, the NR measurement device 20 and the LTE measurement device 21 are connected to the terminal 11a through an RF Switching Box or the like in a wired manner.

Figure 5:
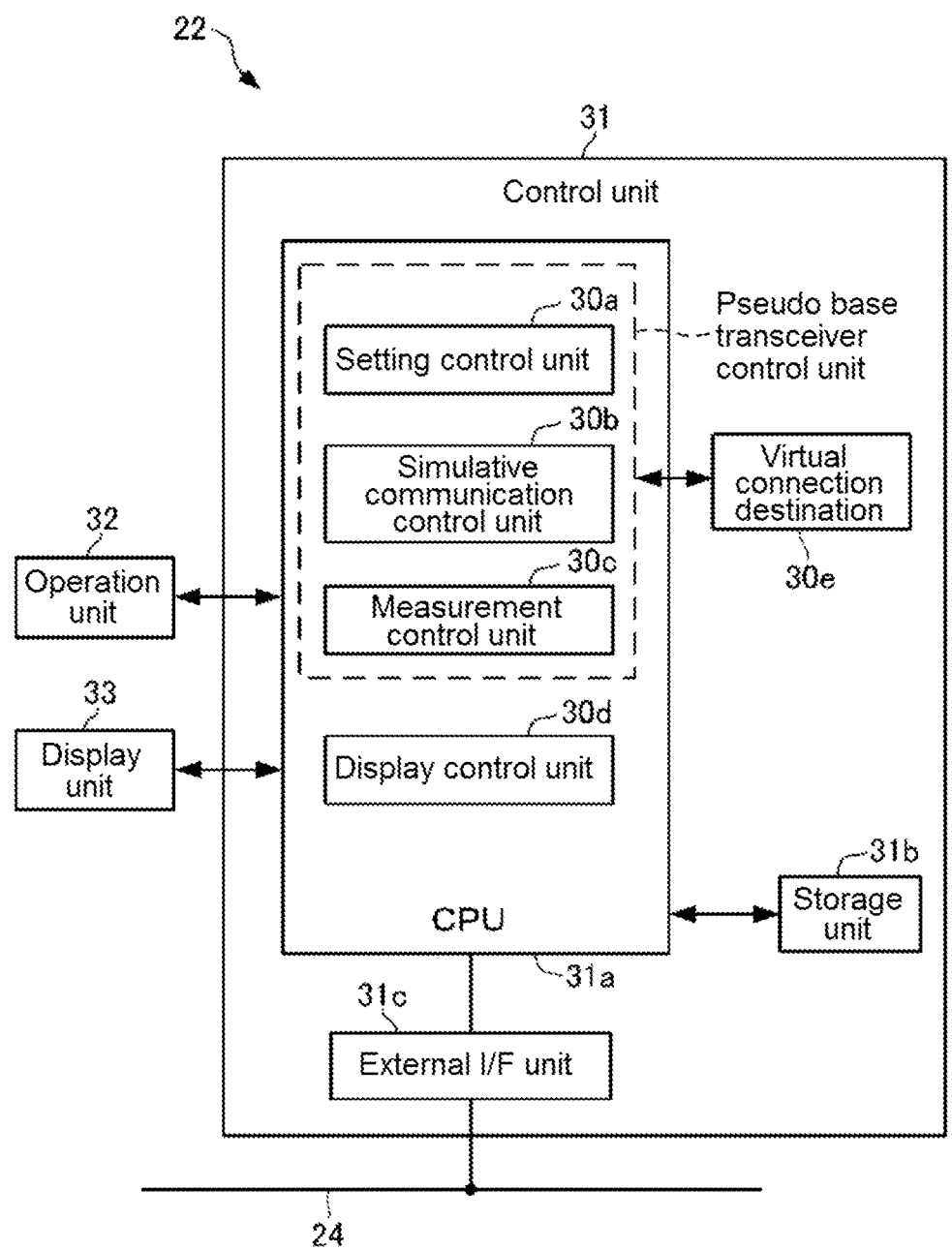
FIG. 5 is a block diagram showing a functional configuration of a control device in FIG. 4.

The control device 22 functions as a control PC that controls the NR measurement device 20 and the LTE measurement device 21 with a computer device such as a personal computer (PC). The control device 22 has, for example, a control unit 31, an operation unit 32, and a display unit 33, as shown in FIG. 5. The control unit 31 has a CPU 31a, a storage unit 31b, and an external interface (I/F) unit 35. The CPU 31a realizes, for example, a setting control unit 30a, a simulative communication control unit 30b, a measurement control unit 30c, and a display control unit 30d to be described later by executing a program stored in the storage unit 31b. The operation unit 32 and the display unit 33 have the same configuration as the operation unit 2 and the display unit 6 described above. The external interface (I/F) unit 31c performs an interface function for connecting the control device 22 to the NR measurement device 20 and the LTE measurement device 21 through the network 24.

In the control device 22, the CPU 31a has a setting control unit 30a, a simulative communication control unit 30b, a measurement control unit 30c, a display control unit 30d, and a virtual connection destination 30e.

The setting control unit 30a performs setting of a scenario (including a base transceiver station as a simulative communication target) for measurement of the terminal 11a and various kinds of setting processing of simulation parameters and the like. The simulative communication control unit 30b performs a simulative communication operation. In the simulative communication operation, communication between the NR base transceiver station and the LTE base transceiver station and the terminal 11a as a measurement target, for which a combination for performing simulative communication is set in advance, is simulated using the simulation parameters in accordance with the above-described scenario.

The measurement control unit 30c acquires signals transmitted and received between the NR base transceiver station and the LTE base transceiver station and the terminal 11a during the simulative communication operation, and performs control such that the measurement unit measures whether or not the terminal 11a operates normally.

The display control unit 30d performs display control for causing the display unit 33 to display measurement-related information (information for detecting a combination of base transceiver stations performing the simulative communication, the used carrier, and the like) relating to the measurement of the terminal 11a based on signals transmitted and received between the terminal 11a, the NR base transceiver station, and the LTE base transceiver station during the simulative communication operation, in association with the type of the radio access system (RAT).

The setting control unit 30a, the simulative communication control unit 30b, and the measurement control unit 30c of the control device 22 correspond to the pseudo base transceiver station control unit 4 in FIG. 1. The display control unit 30d of the control device 22 corresponds to the display control unit 5 and the NR measurement-related display unit 6e shown in FIG. 1. The virtual connection destination 30e of the control device 22 corresponds to the virtual connection destination 12 in FIG. 1.

In the connection configuration shown in FIG. 4, the control device 22, the NR measurement device 20, and the LTE measurement device 21 respectively constitute as a pseudo base transceiver station control unit, a first measurement device, and a second measurement device of the present invention. In the block diagram shown in FIG. 5, the display control unit 30d constitutes a display control means of the present invention.

Next, a display processing procedure for displaying the NR measurement-related information relating to the measurement of the terminal 11a of the measurement device 1A according to the present embodiment will be described with reference to the flowcharts shown in FIGS. 6 and 7. First, the display processing procedure of the terminal 11a before the start of measurement will be described with reference to the flowchart shown in FIG. 6.

In the measurement device 1A according to the present embodiment, it is necessary to set the number of RAT cells and the simulation parameters before the measurement of the terminal 11a. In the measurement device 1A having the connection configuration shown in FIG. 4, in the control device 22, in a case where the measurement request of the terminal 11a is input from the operation unit 32, the display control unit 30d causes the display unit 33 to display, for example, the main screen 33a relating to the NR and LTE measurement shown in FIG. 8 (step S31).

In a state where the main screen 33a is being displayed, the display control unit 30d determines whether or not a RAT cell number setting request is input (step S32). Here, if it is determined that the RAT cell number setting request is not input (NO in step S32), the processing proceeds to step S37.

Figure 9:
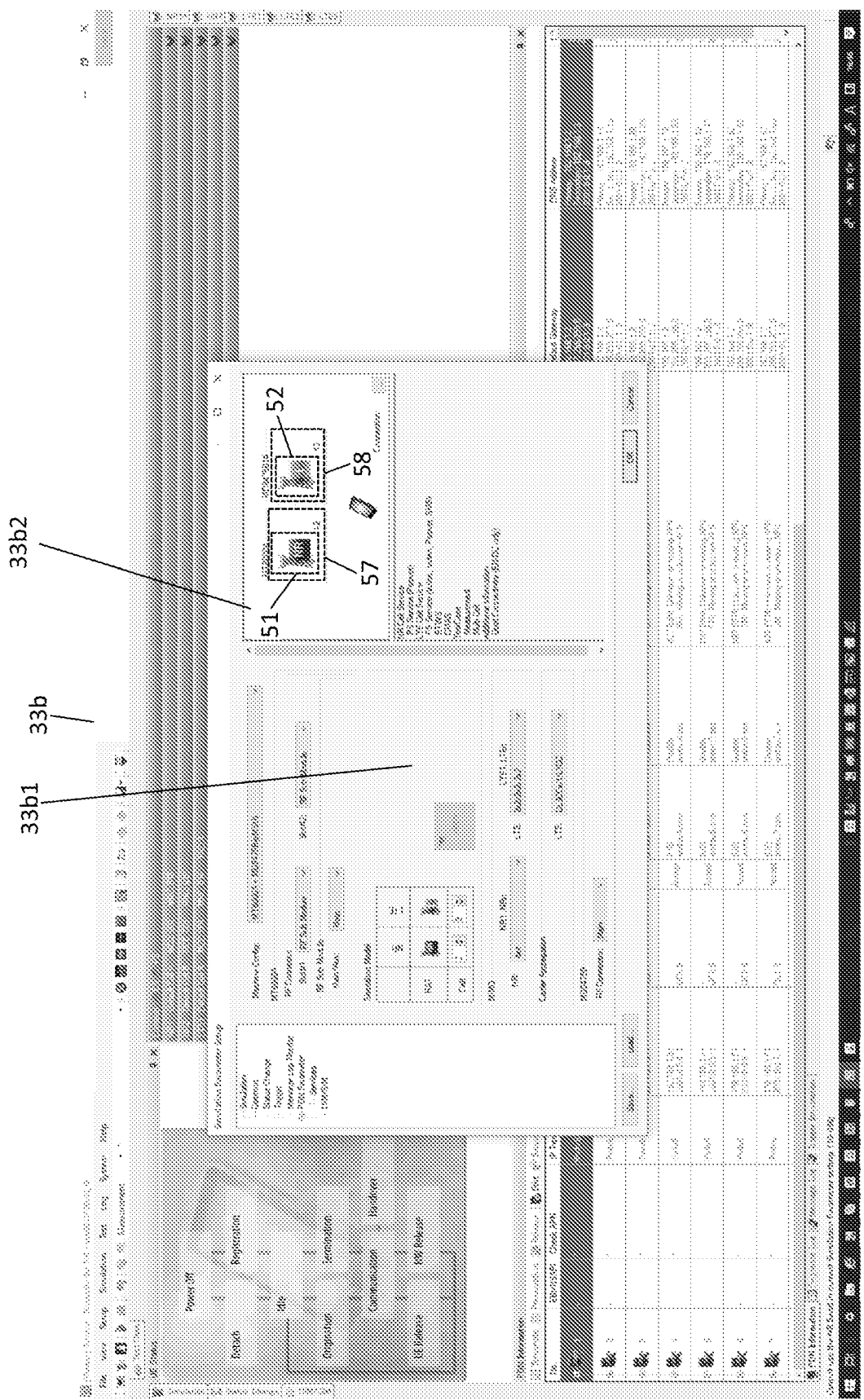
FIG. 9 is a diagram showing a display example of a simulation model setting screen used for measurement of a terminal of the measurement device according to an embodiment of the present invention.

In contrast, if it is determined that the RAT cell number setting request is input (YES in step S32), then display control unit 30d causes the display unit 33 to display a simulation model setting screen 33b in the lower hierarchy of the main screen 33a (Step S33). The simulation model setting screen 33b has, for example, a simulation model setting area (RAT cell number setting screen) 33b1 (refer to FIG. 10) and a simulation model display area 33b2 (refer to FIG. 11), as shown in FIG. 9.

In a state where the simulation model setting screen 33b is being displayed, the setting control unit 30a executes a setting processing of the number of RAT cells and a simulation model setting confirmation processing on the basis of the input from the operation unit 32 (step S34).

Further, while executing the setting processing in step S34, the display control unit 30d determines whether or not a simulation parameter setting request is input (step S35). If it is determined that the simulation parameter setting request is not input (NO in step S35), the processing proceeds to step S37.

In contrast, if it is determined that the simulation parameter setting request is input (YES in step S35), the display control unit 30d, for example, displays the simulation parameter setting area 33a4 (simulation parameter setting screen 33c) on the main screen 33a (refer to FIG. 8), and the setting control unit 30a executes simulation parameter setting processing while receiving an operation input from the operation unit 32 on the simulation parameter setting screen 33c (step S36).

During the display processing of the simulation parameter setting screen 33c in step S36 or after the display processing is completed, for example, in a state where the display is returned to the display of the main screen 33a, the display control unit 30d determines whether or not a setting confirmation request for issuing an instruction to confirm the setting contents is input (step S37). Here, if it is determined that the setting confirmation request is not input (NO in step S37), the processing proceeds to step S39.

In contrast, if it is determined that the setting confirmation request is input (YES in step S37), the display control unit 30d causes the display unit 33 to display a setting confirmation screen corresponding to the request contents (step S38).

Figure 11:
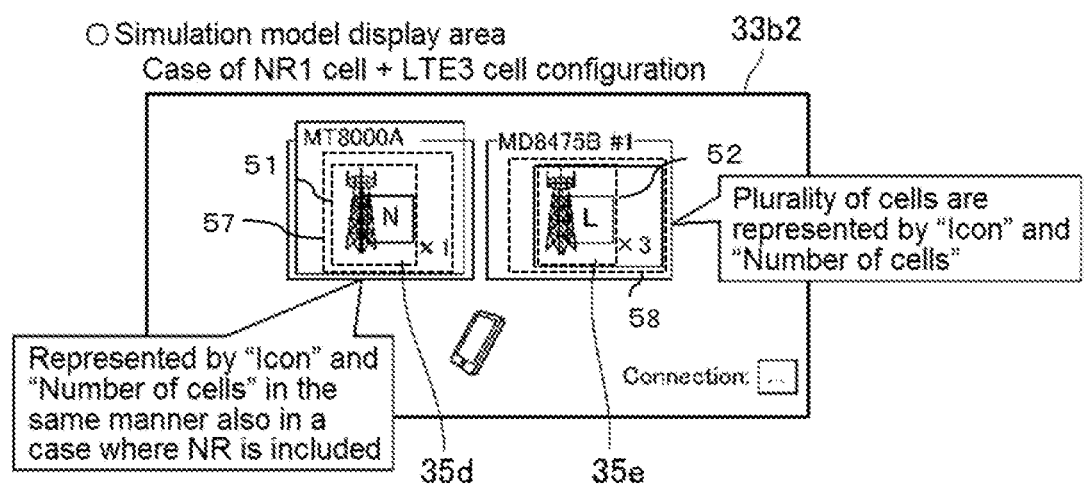
FIG. 11 is an enlarged view showing a simulation model display area of the simulation model setting screen in FIG. 9.
Figure 12:
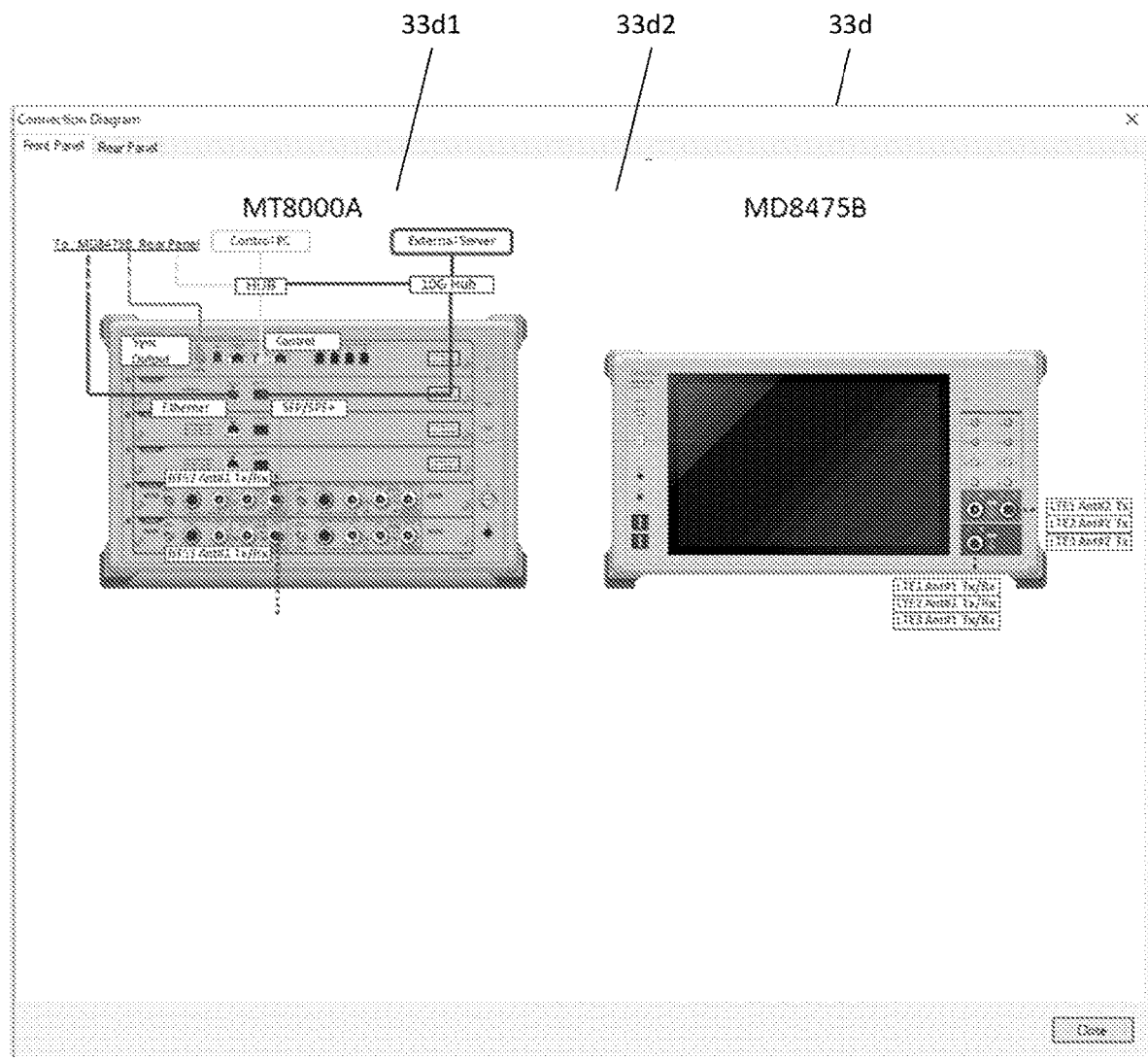
FIG. 12 is a diagram showing a display example of a connection confirmation/support request screen used for measurement of a terminal of the measurement device according to an embodiment of the present invention.

Regarding the processing in steps S37 and S38 described above, in a case where the simulation setting confirmation request is input in step S37, the display control unit 30d displays, for example, a simulation model setting screen 33b (refer to FIG. 9) having a simulation model display area 33b2 as shown in FIG. 11 in step S38. In a case where a connection confirmation/support request is input in step S37, the display control unit 30d displays a connection confirmation/support request screen 33d as shown in FIG. 12, for example, in step S38.

In a state where the various setting confirmation screens are being displayed in step S38, the display control unit 30d determines whether or not an end request for issuing an instruction to end the processing is input (step S39). If it is determined that the end request is not input (NO in step S39), the display control unit 30d returns to step S31 in accordance with the instruction to return the processing, and continues the processing after step S31 on the display of the main screen 33a.

In contrast, if it is determined that the end request is input (YES in step S39), the display control unit 30d ends the above-described series of display control in the setting stage.

Next, the display forms of the main screen 33a (refer to FIG. 8) displayed in each step relating to the series of display control shown in FIG. 6, the simulation model setting screen 33b (refer to FIGS. 9, 10, and 11), simulation parameter setting screen 33c (refer to FIG. 8), and the connection confirmation/support request screen 33d (refer to FIG. 12) will be described in more detail.

Figure 6:
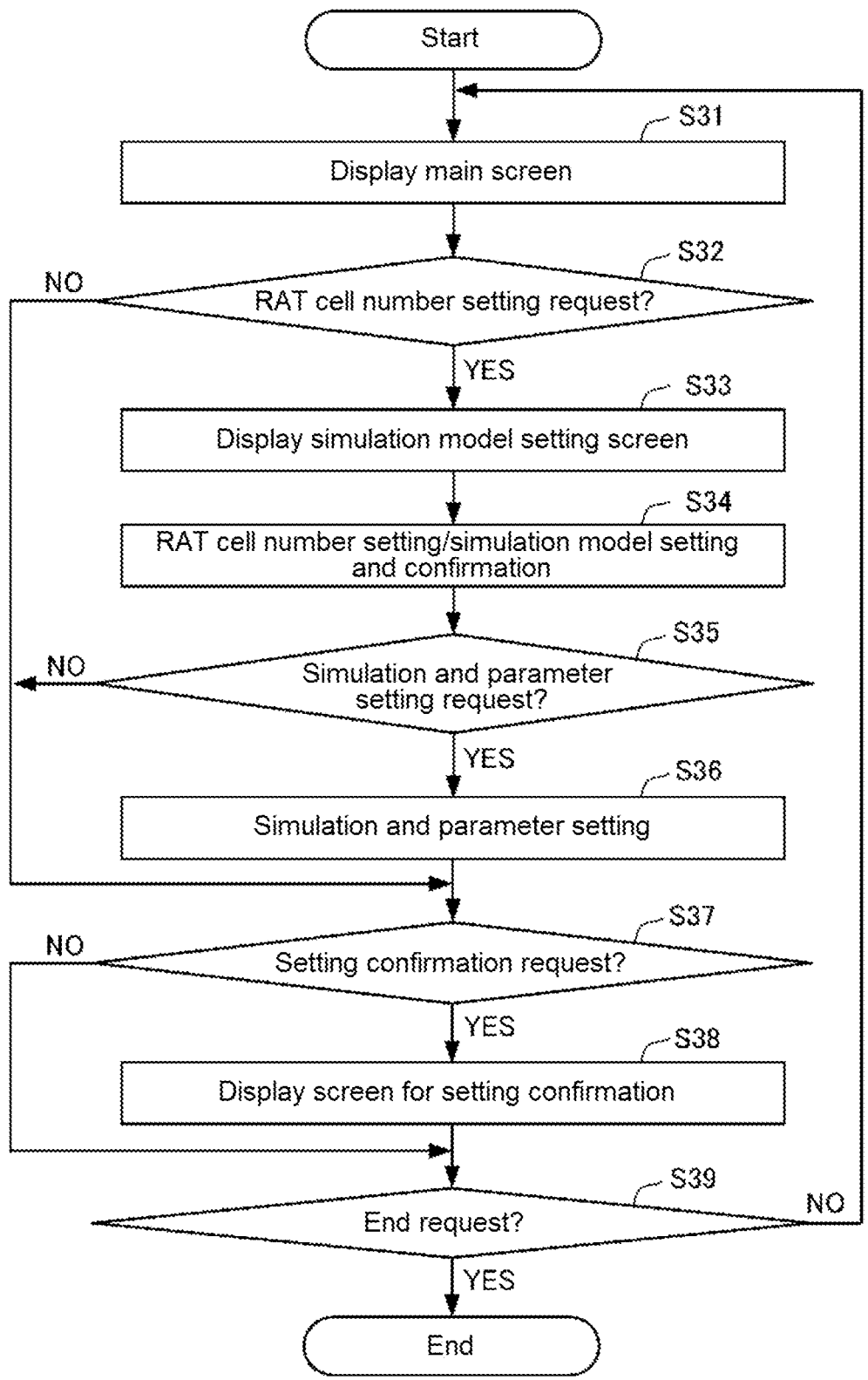
FIG. 6 is a flowchart showing an example of a display processing procedure in a terminal measurement parameter setting stage of the measurement device according to an embodiment of the present invention.
Figure 8:
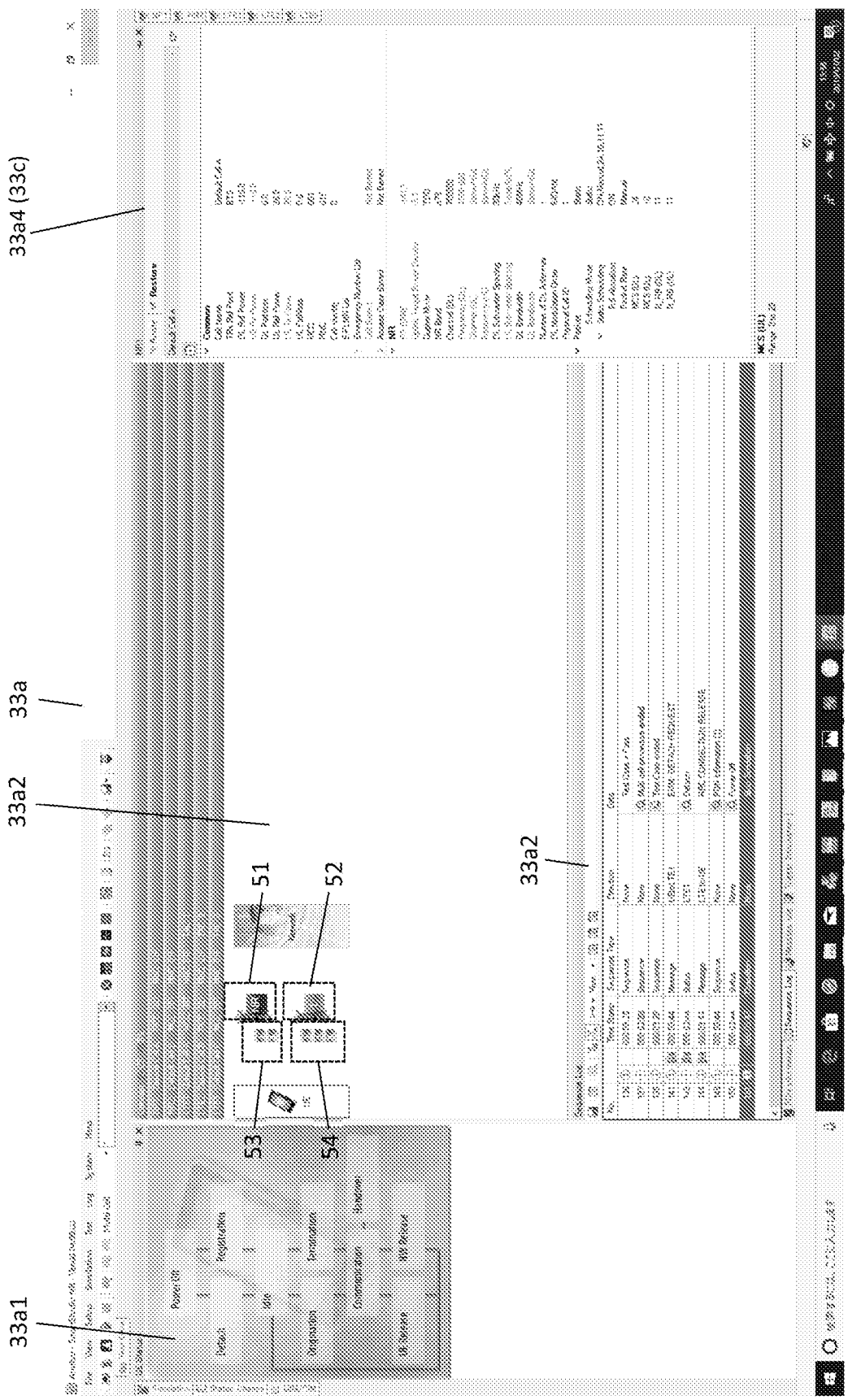
FIG. 8 is a diagram showing a display example of a main screen used for measurement of a terminal of the measurement device according to an embodiment of the present invention.

As shown in FIG. 8, the main screen 33a displayed in step S31 in FIG. 6 has a sequence display area 33a1, a connection status display area 33a2, a sequence log display area 33a3, and a simulation parameter setting area 33a4.

The sequence display area 33a1 has a function equivalent to that of the sequence display unit 6a in the configuration of the display unit 6 shown in FIG. 25. The sequence display area 33a1 is an area for displaying which sequence status the terminal 11a as a measurement target is in. The sequence status is any of "Power Off", "Detach (position Registration), "Registration (position registration)", "Idle (standby status)", "Origination (outgoing)", "Termination (incoming)", "Communication (communication status)", "UE (user equipment) Release (terminal disconnection)", "NW (network) Release (connection destination disconnection)", "Handover", and the like.

The connection status display area 33a2 is an area in which the connection status between the terminal 11a and the virtual connection destination (non-standalone NR) through the measurement device 1A is displayed. The connection status display area 33a2 does not display the connection status in a case where the number of RAT cells is not set. On the other hand, after the setting of the number of RAT cells is performed, a connection status according to the setting contents is displayed. The connection status is displayed as an image which indicates the connection status of both cells by using an NR cell icon indicating an NR base transceiver station cell (hereinafter, NR cell) corresponding to a set cell in the NR area, and an LTE cell icon indicating an LTE base transceiver station cell (hereinafter, LTE cell) corresponding to a set cell in the LTE area.

The sequence log display area 33a3 is an area for displaying a log relating to the sequence of the terminal 11a as a measurement target in association with the time stamp, sequence type, direction (Direction), and remarks (Date).

The simulation parameter setting area 33a4 is a display area as the simulation parameter setting screen 33c for setting simulation parameters for the set NR cells and LTE cells after setting of the number of RAT cells. The simulation parameter setting screen 33c can be displayed on the main screen 33a, for example, by clicking the connection status display area 33a2.

The simulation parameter setting screen 33c is configured to be able to switch the cell as a setting target. With such a configuration, it is possible to set simulation parameters for all NR cells (for example, NR1 and NR2) and LTE cells (for example, LTE1, LTE2, and LTE3) corresponding to the NR cell icon and the LTE cell icon whose connection status is being displayed.

The simulation parameter setting screen 33c has, as setting items, common items common to NR and LTE, and unique items unique to each NR and LTE. The common items include Cell Name, TRx Ref point, DL Ref Power, UE Rx Power, DL Pathloss, UL Ref Power, UE Tx Power, UL Pathloss, MCC, MNC, Call Identity, and the like. The unique items (for example, in the case of NR cells) include RS EPRE, Uplink Target Power Density, Duplex Mode, NR Band, Channel (DL), Frequency (DL), Channel (UL), Frequency (UL), DL Subcamer Spacing, UL Subcamer Spacing, DL BandWidth, UL BandWidth, and the like.

The main screen 33a having the above configuration is displayed on the display unit 33 through the display control of the display control unit 30d (refer to step S31 in FIG. 6). At this time, if the number of RAT cells is set in advance, the display control unit 30d displays the connection status between the set cells in the connection status display area 33a2 of the main screen 33a in, for example, a form shown in FIG. 8.

Here, the display control unit 30d displays one NR cell icon 51 (first cell icon) indicating that the base transceiver station (NE cell) is compliant with the NR communication standard and one LTE cell icon 52 (second cell icon) indicating that the base transceiver station is compliant with the LTE communication standard. The display control unit 30d performs the display in a form 53 (first form) in which the same number of graphic forms as the number of base transceiver stations compliant with the NR communication standard are arranged in a line in association with the NR cell icon, and performs the display in a form 54 (second form) in which the same number of graphic forms as the number of base transceiver stations compliant with the LTE communication standard are arranged in a line in association with the LTE cell icon.

The display control unit 30d displays rectangular frames as the graphic forms, and displays a number for identifying a number for identifying the base transceiver station compliant with the NR communication standard and the base transceiver station compliant with the LTE communication standard for each of the rectangular frames. The graphic form may show a box shape of which one surface is the rectangular frame, and the graphic form may be displayed in a vertically stacked form.

Specifically, in the example of FIG. 8, the display control unit 30d displays the connection status in the NR area, in the connection status in the NR area and the cell connection status in the LTE area displayed in the connection status display area 33a2, in a form in which the number of box shapes (the box shape of which one surface is the rectangular frame) corresponding to the NR cells in the NR area relating to the measurement of the terminal 11a are vertically stacked to be adjacent to one NR cell icon indicating a base transceiver station (NR cell) in the NR area. In this example, since two NR cells are set, the image is displayed as an image in which two box shapes are vertically stacked. In each box-shaped rectangular frame, a numerical value indicating the base transceiver station number of the NR cell is noted. The NR cell icon is represented by the reference sign of "NR" indicating the area type.

In addition, the display control unit 30d displays the connection status in the LTE area in a form in which the number of box shapes corresponding to the LTE cells in the LTE area relating to the measurement of the terminal 11a are vertically stacked to be adjacent to one LTE cell icon indicating a base transceiver station (LTE cell) in the LTE area. In this example, since three LTE cells are set, three LTE cells are displayed as an image in which the cells are vertically stacked. In each box-shaped rectangular frame, a numerical value indicating the base transceiver station number of the LTE cell is noted. The LTE cell icon is represented by the reference sign of "LTE" indicating the area type.

According to the display form shown in FIG. 8 of the set connection status relating to the NR cell and the LTE cell, even in a case where the number of cells which are set in the NR area and the LTE area increases, the NR cell icon and the LTE cell icon does not increase. In addition, the area for displaying the rectangular frame in each area does not expand. Further, the area for displaying the rectangular frame in each area may be expanded vertically as the number of layers of the rectangular frame increases, but the expansion is suppressed as compared with the case where cell icons indicating the shapes of the base transceiver stations are stacked. Further, a form in which rectangular frames are arranged horizontally or vertically above or below a cell icon may be used. Further, the number of lines is not limited to one, and a plurality of lines may be used.

FIG. 8 shows an example in which the number of rectangular frames corresponding to the number of base transceiver stations in the NR area and the number of rectangular frames corresponding to the number of base transceiver stations in the LTE area are respectively displayed in association with the NR cell icon and the LTE cell icon. However, instead of the rectangular frame, various graphic forms may be displayed in a form in which the graphic forms are vertically stacked or horizontally arranged.

As described above, in the measurement device 1A according to the present embodiment, the display control unit 30d performs control to display all cells (NR cells and LTE cells), which are in the NR area and LTE area involved in the measurement of the terminal 11*a*, in a display area with a predetermined size. The number of cells varies in accordance with the scenario (setting of the combination of cells subjected to simulative communication operation) for simulating the communication of the NR communication standard.

Figure 10:
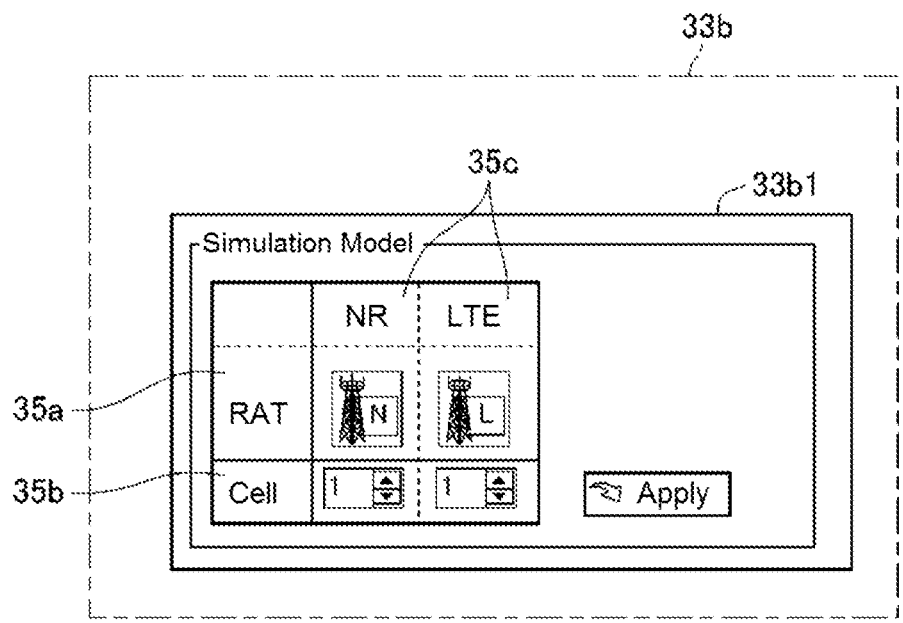
FIG. 10 is an enlarged view showing a RAT cell number setting area of the simulation model setting screen in FIG. 9.

The simulation model setting screen 33*b* (refer to FIG. 9) displayed in step S33 of FIG. 6 includes, for example, a RAT cell number setting screen (RAT cell number setting area) 33*b*1 showing the enlarged screen configuration in FIG. 10. The display control unit 30*d* is able to display the simulation model setting screen 33*b* including the RAT cell number setting screen 33*b*1 on the basis of a simulation model setting request operation using a tab (GUI tool) on the main screen 33*a*.

In the measurement device according to the present embodiment, the display control unit 30*d* displays the RAT cell number setting screen 33*b*1 on the simulation model setting screen 33*b* as an image in which a tool for selecting the number of cells for each RAT type NR or LTE is set as shown in FIGS. 9 and 10. Specifically, the display control unit 30*d* displays the RAT cell number setting screen 33*b*1 with a screen configuration including a RAT field 35*a* and a cell field 35*b*. In the RAT field 35*a*, a single NR cell icon indicating that the radio access technology (RAT; area type) is NR and a single LTE cell icon indicating that the RAT is LTE are arranged side by side. In the cell field 35*b*, a cell number selection tool for selecting the number of cells for each RAT in accordance with the scenario is provided at each of positions respectively corresponding to the NR cell icon and the LTE cell icon.

In the display forms shown in FIGS. 9 and 10, RAT name fields 35*c* are provided at positions vertically opposite to the respective cell number selection tools with the NR cell icon and the LTE cell icon interposed therebetween. In the RAT name fields 35*c*, RAT names "NR" and "LTE" corresponding to the NR cell icon and the LTE cell icon are noted in vertical writing, respectively.

In the present embodiment, the RAT cell number setting screen 33*b*1 of the simulation model setting screen 33*b* has the RAT field 35*a*, the cell field 35*b* and the RAT name fields 35*c* as shown in FIG. 10, and is configured such that the number of cells of the corresponding RAT is selected by operating the cell number selection tool in the cell fields 35*b*. According to this configuration, it is not necessary to extend the display area even in a case where the number of cells increases. In addition, since the screen configuration is simple, it is easy to view the screen, and the number of cells can be easily set.

In the simulation model setting screen 33*b* (refer to FIG. 9), in addition to the above-described RAT cell number setting screen 33*b*1 (refer to FIG. 10), for example, a simulation model display area 33*b*2 showing the enlarged screen configuration in FIG. 11 is also provided.

In the measurement device 1A according to the present embodiment, as shown in FIG. 11, the display control unit 30*d* displays the simulation model display area 33*b*2 with a screen configuration in which display areas 35*d* and 35*e* respectively corresponding to NR and LTE are provided. Then, for the simulation model display area 33*b*2 having the above screen configuration, the display control unit 30*d* performs display of a simulation model such that one NR cell icon 51 is displayed in a form 57 (first form) in which a numerical value corresponding to the number of cells which are set in the NR area is attached thereto in the display area 35*d* corresponding to the NR, and performs the display such that one LTE cell icon 52 is displayed in a form 58 (second form) in which a numerical value corresponding to the number of cells which are set in the LTE is attached thereto in the display area 35*e* corresponding to LTE.

FIG. 11 shows a display form in a case where one NR cell and three LTE cells are selected and set. In this case, for the display area 35*d*, the display control unit 30*d* performs the display in a form in which a symbol "×1" indicating that the number of NR cells is 1 is attached to the NR cell icon having an abbreviation symbol corresponding to NR noted therein. In addition, for the display area 35*e*, the display control unit 30*d* performs the display in a form in which a symbol "×3" indicating that the number of LTE cells is 3 is attached to the LTE cell icon having an abbreviation symbol "L" corresponding to LTE noted therein.

As described above, the display control unit 30*d* displays one NR cell icon (first cell icon) and one LTE cell icon (second cell icon) respectively corresponding to NR and LTE, and further displays a simulation model display area 33*b*2 having display areas 35*d* and 35*e* respectively corresponding to the NR base transceiver station and the LTE base transceiver station. In the display area 35*d*, a form, in which a numerical value corresponding to the number of NR base transceiver stations is attached to one NR cell icon, is displayed. In the display area 35*e*, a form, in which a numerical value corresponding to the number of LTE base transceiver stations is attached to one LTE cell icon, is displayed.

In the present embodiment, as shown in FIG. 11, the simulation model is displayed in the simulation model display area 33*b*2 in a form in which one icon and the number of cells (numerical value) are combined for each of NR and LTE RAT. Therefore, even in a case where the number of NR cells and LTE cells increases, all cells can be detected.

In the present embodiment, the simulation model setting screen 33*b* has the RAT cell number setting area 33*b*1 (RAT cell number setting screen) and the simulation model display area 33*b*2. Therefore, a user is able to set the simulation model while confirming the simulation model on the simulation model setting screen 33*b*.

The simulation parameter setting screen 33*c* used in the simulation parameter setting in step S36 in FIG. 6 can be displayed as a simulation parameter display area 33*a*4 on the main screen 33*a*, for example, by clicking a connection status display area 33*a*2 on the main screen 33*a* as shown in FIG. 8. The user is able to set various parameters described above by using the simulation parameter setting screen 33*c*.

FIG. 12 shows an example of the connection confirmation/support request screen 33*d* displayed in step S38 in a case where the connection confirmation/support request is input in step S37 of FIG. 6. FIG. 12 shows an example of the connection confirmation/support request screen 33*d* displayed on the display unit 33 by the control device 22 particularly in a case where the NR measurement device 20 and the LTE measurement device 21 are connected and operated in the connection mode shown in FIG. 4.

As shown in FIG. 12, the connection confirmation/support request screen 33*d* has a screen configuration in which a first connection diagram image 33*d*1 and a second connection diagram image 33*d*2 are displayed to be adjacent to each other. The first connection diagram image 33*d*1 is an image which indicates the exterior structure of the front panel and the rear panel of the NR measurement device 20 and in which the front panel and rear panel are switchable. The second connection diagram image 33*d*2 is an image which indicates the exterior structure of the front panel and the rear panel of the LTE measurement device 21 and in which the front panel and rear panel are switchable.

The connection confirmation/support request screen 33*d* is configured to display a connection mode for the connection destination of the connection terminal in a form in which the connection destination names of the connection terminals are noted so as to correspond to the images of the respective connection terminals on the front panel and the rear panel of the first connection diagram image 33*d*1 and the second connection diagram image 33*d*2.

The display control unit 30*d* of the control device 22 is configured to display an image that functions as a connection diagram by attaching connection destination names changed in accordance with the setting contents (scenario) of the parameters and the simulation set in step S36 in FIG. 6 to the images of the respective connection terminals on the front panel and the rear panel of the first connection diagram image 33*d*1 and the second connection diagram image 33*d*2.

In the example of FIG. 12, destination names such as BTS1 Ant #1 Tx/Rx and BTS2 Ant #1 Tx/Rx are attached to the images of the respective connection terminals on the back panel (also the front panel) of the first connection diagram image 33*d*1. In addition, destination names such as LTE1 Ant #1 Tx/Rx~LTE3 Ant #1 Tx/Rx and LTE1 Ant #2 Tx~LTE3 Ant #2 Tx are attached to the images of the respective connection terminals on the front panel (also the rear panel) of the second connection diagram image 33*d*2. The display contents of the connection confirmation/support request screen 33*d* function as a connection diagram including the connection mode for connection between the NR measurement device 20 and the LTE measurement device 21 and the measurement antennas (NR and LTE antennas) corresponding to the antennas of the terminal 11*a* as a measurement target.

As described above, the display control unit 30*d* has a function of displaying the connection diagram including at least a connection mode for connection between the NR measurement device 20 and the LTE measurement device 21 and the measurement antennas corresponding to the antennas of the terminal 11*a* as a measurement target.

In the example of FIG. 12, the images of the respective connection terminals (different from the connection terminals described above) on the back panel of the first connection diagram image 33*d*1 are displayed as follows. The connection destination names such as Ethernet and Sync Output are attached thereto so as to indicate a connection mode for connection between the LTE measurement device 21 corresponding to the second connection diagram image. The connection destination name such as Control is attached thereto so as to indicate a connection mode for connection between the NR measurement device 20 and the LTE measurement device 21 and the control device 22. Therefore, the display control unit 30*d* also has the function of displaying the connection diagram further including the connection mode for connection between the NR measurement device 20 and the LTE measurement device 21 and the connection mode for connection between the NR measurement device 20 and the LTE measurement device 21 and the control device 22.

In the present embodiment, since the connection diagram has the display form shown in FIG. 12, the connection mode can be easily detected, and the connection operation can be easily and promptly performed.

Next, a display processing procedure during execution of the measurement of the terminal 11*a* will be described with reference to a flowchart shown in FIG. 7.

In the measurement device 1A having the connection configuration shown in FIG. 4, after the control device 22 completes the processing of setting the number of RAT cells, setting and confirming the simulation model, and setting the simulation parameters (refer to S34 to S36 in FIG. 6). For example, after returning to the display of the main screen 33*a* (step S41), the measurement control unit 30*c* of the control device 22 determines whether or not an instruction to start the measurement of the terminal 11*a* is input from the operation unit 32 (step S42). If it is determined that the instruction to start the measurement is not input (NO in step S42), the processing proceeds to step S47.

In contrast, if it is determined that the instruction to start the measurement is input (YES in step S42), the measurement control unit 30*c* collectively controls the NR measurement device 20 and the LTE measurement device 21, and starts the measurement of the terminal 11*a* (Step S43). When measuring the terminal 11*a*, the measurement control unit 30*c* captures a signal transmitted and received from the terminal 11*a* as a measurement target while controlling the drive of the NR measurement device 20 and the LTE measurement device so as to simulate the operation of each base transceiver station in the non-standalone NR in accordance with a preset scenario (step S44), and measures the terminal 11*a* on the basis of the captured signal. On the other hand, the display control unit 30*d* displays change in the measurement-related information on the main screen 33*a* and the like by reflecting the signal captured in step S43 (step S45).

As an example of the display of change in step S45, the display control unit 30*d* displays the respective connection statuses of the NR area and the LTE area in the non-standalone NR network in the connection status display area of the main screen 33*a*. Specifically, for example, as shown in FIG. 8, the display control unit 30*d* performs display in a form in which rectangular frames corresponding to the number of base transceiver stations corresponding to each area set in the current measurement are vertically stacked to be adjacent to the BTS icons indicating the base transceiver stations in each of the NR area and the LTE area.

While displaying the main screen 33*a* on which display is changed in step S45, the display control unit 30*d* monitors whether or not the connection status area 33*a*1 of the main screen 33*a* is selected (clicked) (step S45). Here, if it is determined that the connection status area 33*a*1 of the main screen 33*a* is not clicked (NO in Step S45), the processing proceeds to Step S47.

In contrast, if it is determined that the connection status area 33*a*1 of the main screen 33*a* is clicked (YES in step S45), for example, a DC operation confirmation screen 33*e* shown in FIG. 13 is displayed on the display unit 33 (step S46). The DC operation confirmation screen 33*e* has a DC operation status display area 33*e*2 for displaying an image of the DC operation status. In the example of FIG. 13, the display control unit 30*d* displays, as images, the operation mode based on the DC system in the NR area and the operation mode based on the CA system in the LTE area, in the DC operation status display area 33*e*2.

In the display processing of step S46, a DC operation confirmation screen 33*f* (refer to FIG. 14) having a screen structure different from that of the DC operation confirmation screen 33*e* can be displayed. Also in the DC operation confirmation screen 33*f*, the DC operation status display area 33*e*2 displays the operation mode based on the DC system in the NR area and the operation mode based on the CA system in the LTE area as images.

During the display processing of the DC operation confirmation screen 33e (or 33f) in step S46, or after the display processing is completed, for example, in a state where the display is returned to the main screen 33a, the display control unit 30d determines whether or not an operation confirmation request for issuing an instruction to confirm the operation status relating to the measurement of the terminal 11a is input (step S47). If it is determined that the operation confirmation request is not input (NO in step S47), the processing proceeds to step S49.

In contrast, if it is determined that the operation confirmation request is input (YES in step S47), the display control unit 30d causes the display unit 33 to display an operation confirmation screen corresponding to the request (step S48).

Figure 7:
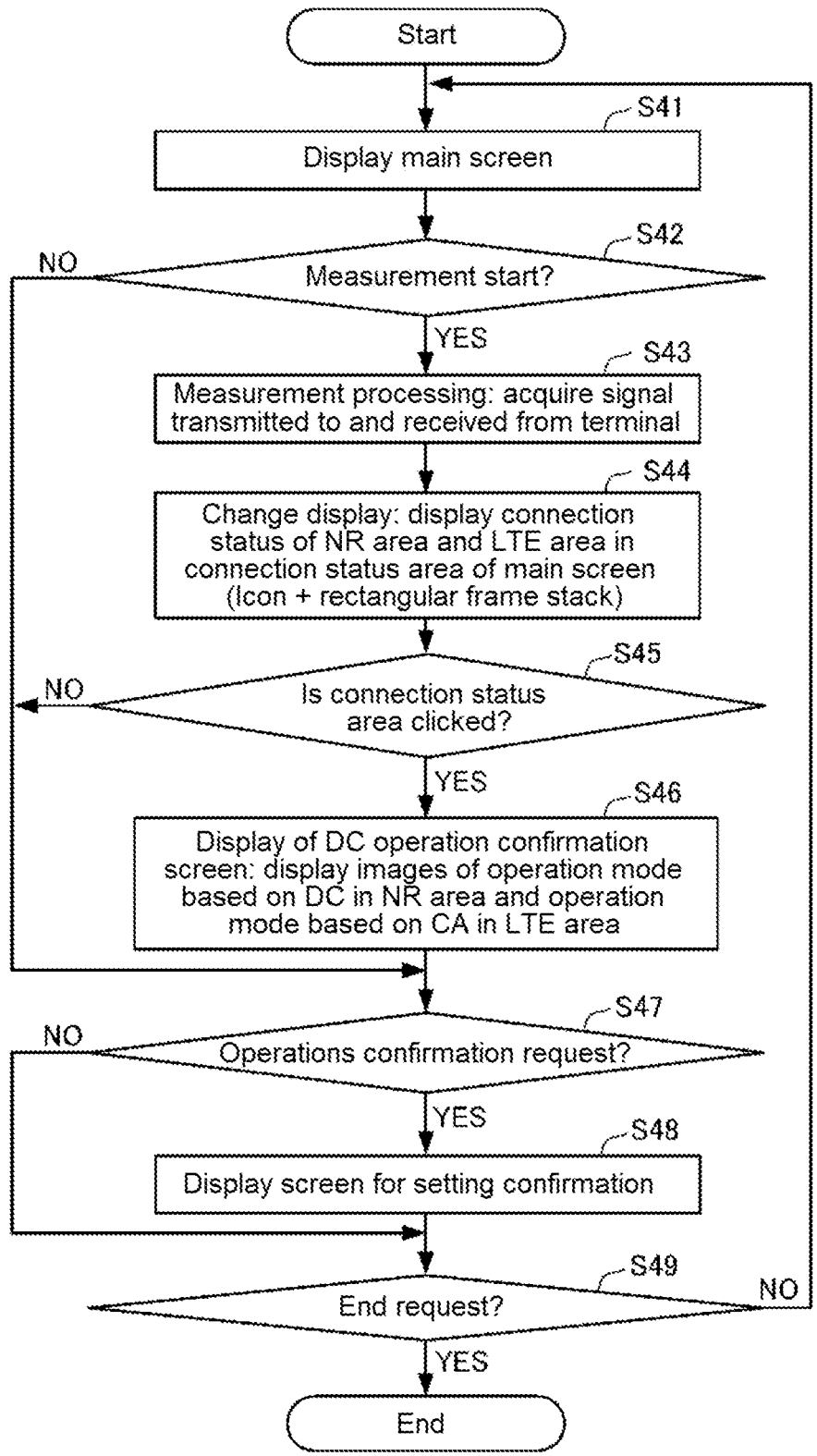
FIG. 7 is a flowchart showing an example of a display processing procedure in a terminal execution of the measurement stage of the measurement device according to an embodiment of the present invention.
Figure 15:
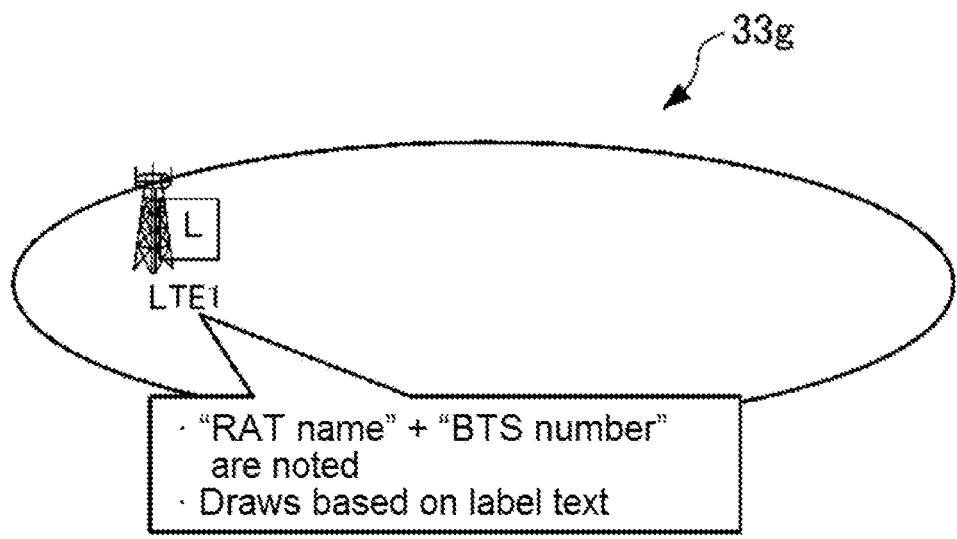
FIG. 15 is a diagram showing a display example of a test case confirmation screen used for measurement of a terminal of the measurement device according to an embodiment of the present invention.
Figure 16:
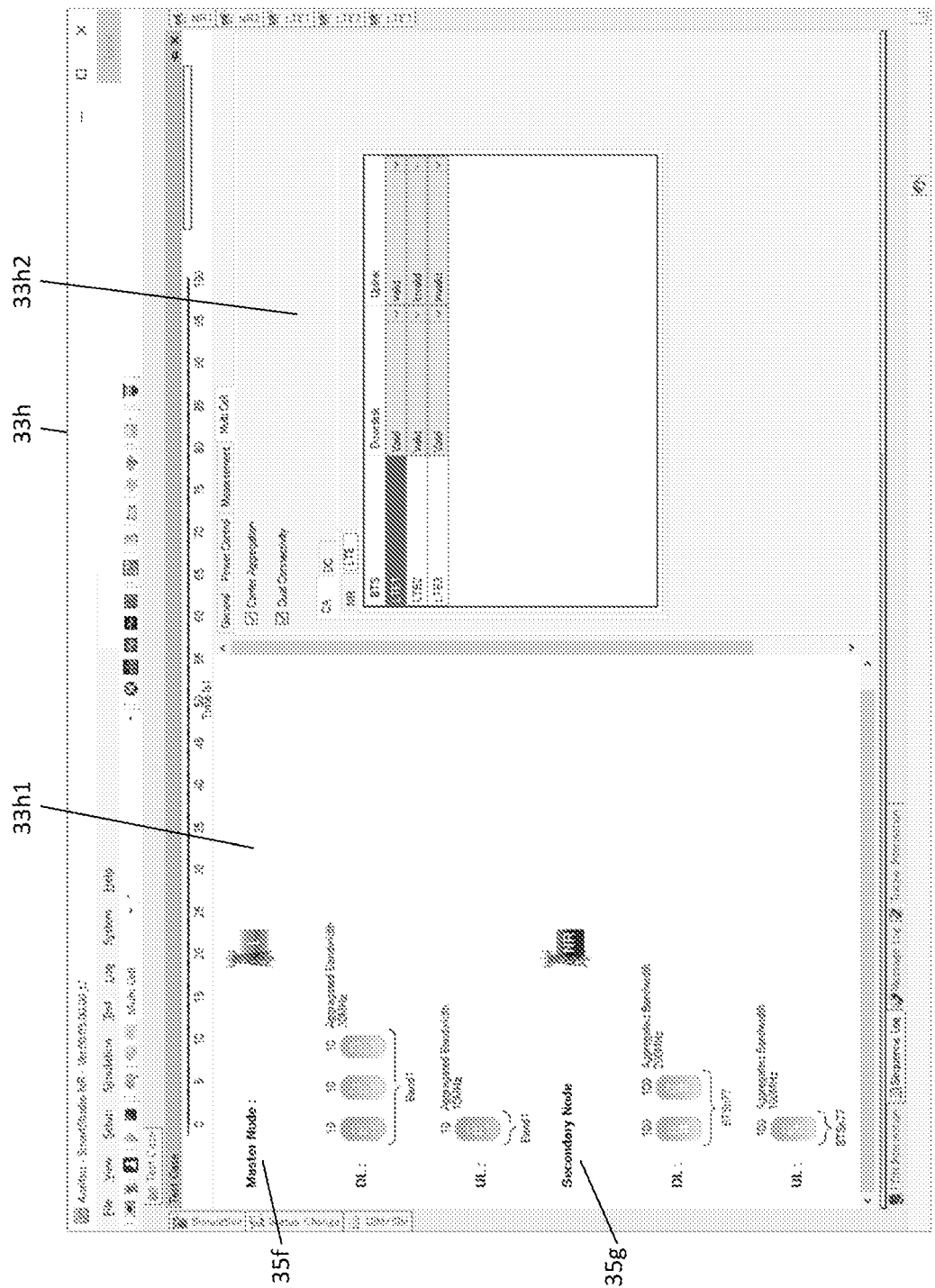
FIG. 16 is a diagram showing a display example of a component confirmation screen used for measurement of a terminal of the measurement device according to an embodiment of the present invention.
Figure 17:
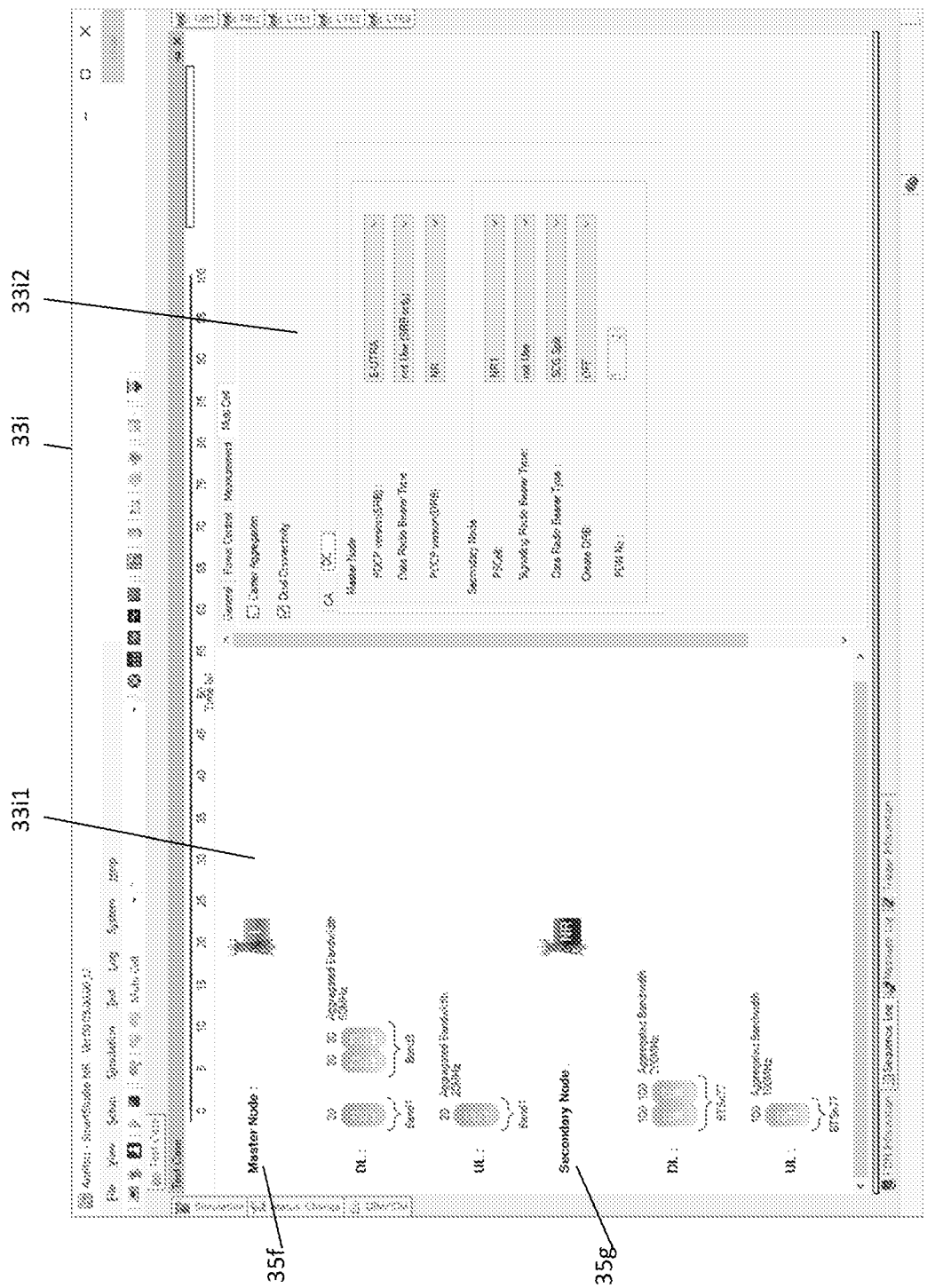
FIG. 17 is a diagram showing a display example of another example of a component confirmation screen used for measurement of a terminal of the measurement device according to an embodiment of the present invention.

Regarding the processing of steps S47 and S48 in FIG. 7, in a case where a test case confirmation request is input in step S47, for example, the display control unit 30d displays, in step S48, a test case confirmation screen 33g as shown in FIG. 15. In addition, for example, in a case where a component confirmation request is input in step S47, the display control unit 30d displays, for example, a component confirmation screen 33h as shown in FIG. 16 in step S48. In addition, in response to the component confirmation request, for example, a component confirmation screen 33i as shown in FIG. 17 may be displayed.

Figure 18:
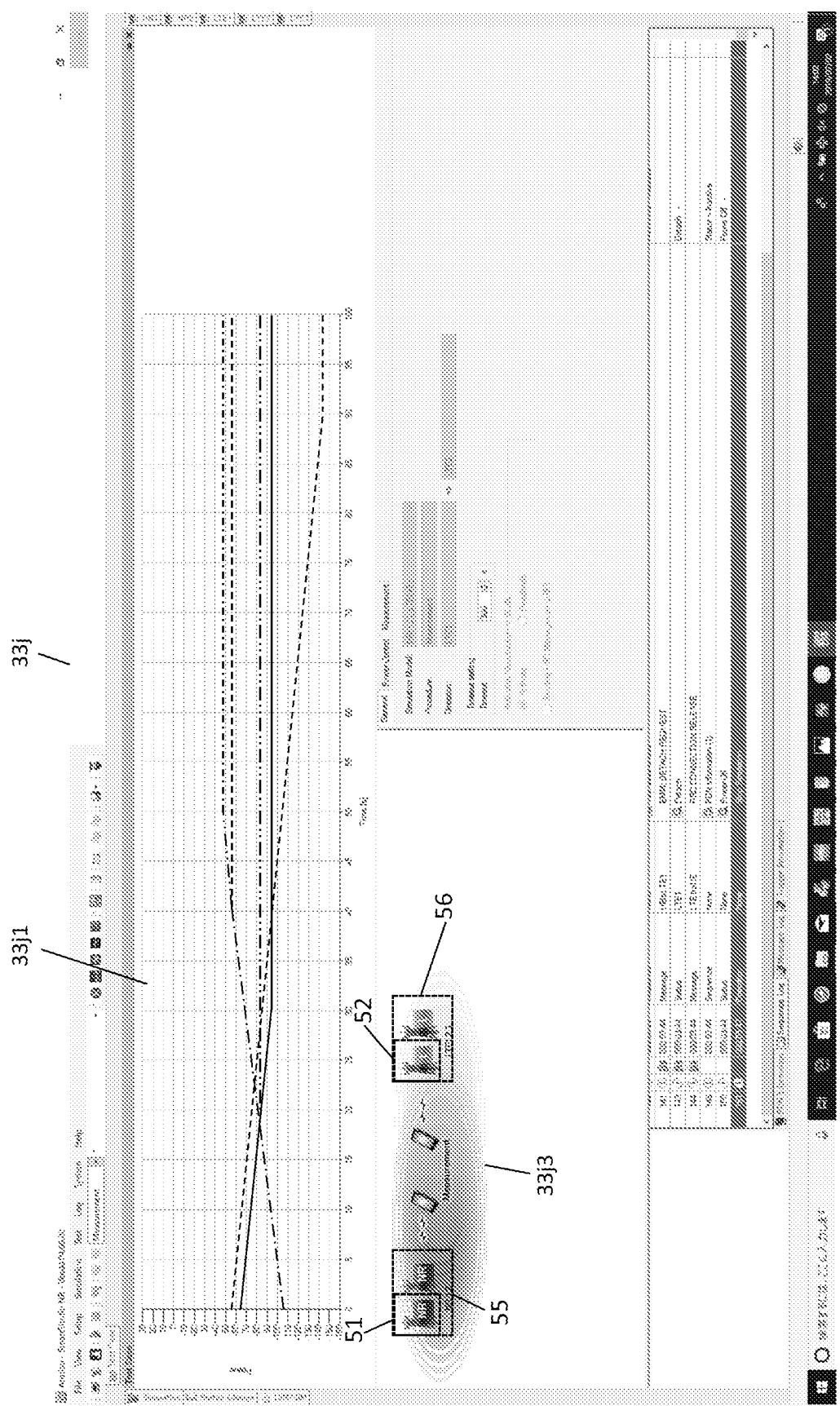
FIG. 18 is a diagram showing a display example of a power characteristic confirmation screen used for measurement of a terminal of the measurement device according to an embodiment of the present invention.
Figure 19:
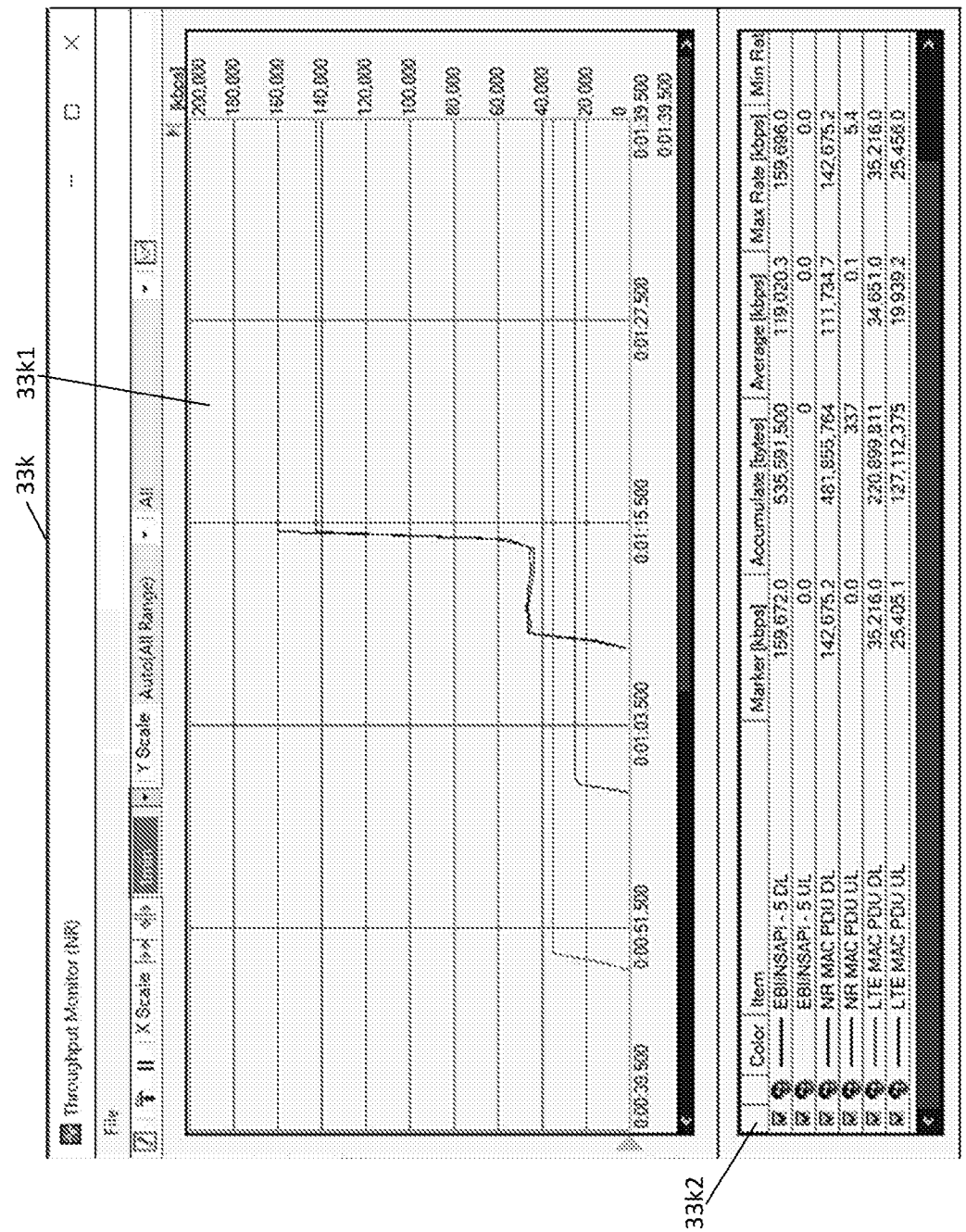
FIG. 19 is a diagram showing a display example of a throughput confirmation screen used for measurement of a terminal of the measurement device according to an embodiment of the present invention.
Figure 20:
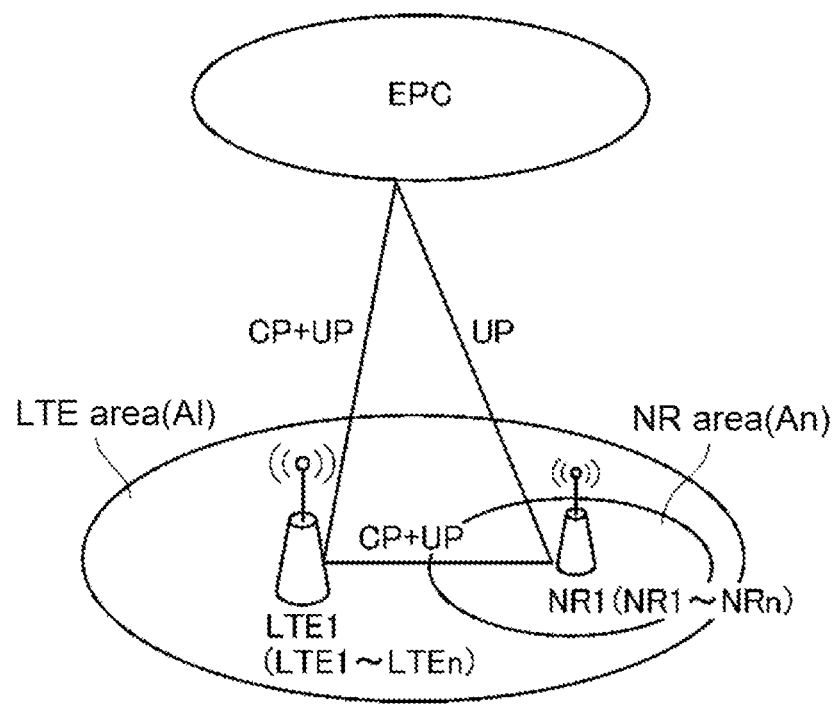
FIG. 20 is a schematic diagram of a conventional technique showing an operation image of a non-standalone 5G wireless in which a communication terminal as a measurement target by the measurement device according to an embodiment of the present invention is disposed.
Figure 21:
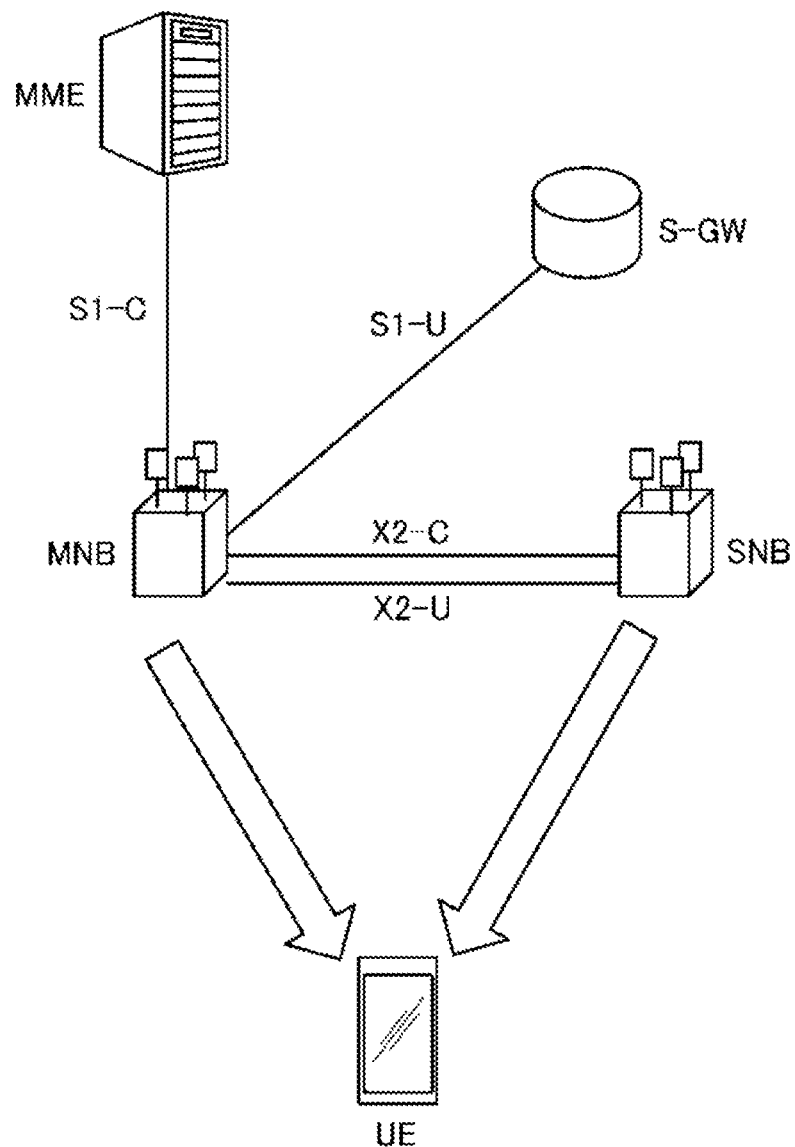
FIG. 21 is a schematic diagram of a related art showing a network configuration relating to DC of non-standalone 5G wireless.
Figure 22:
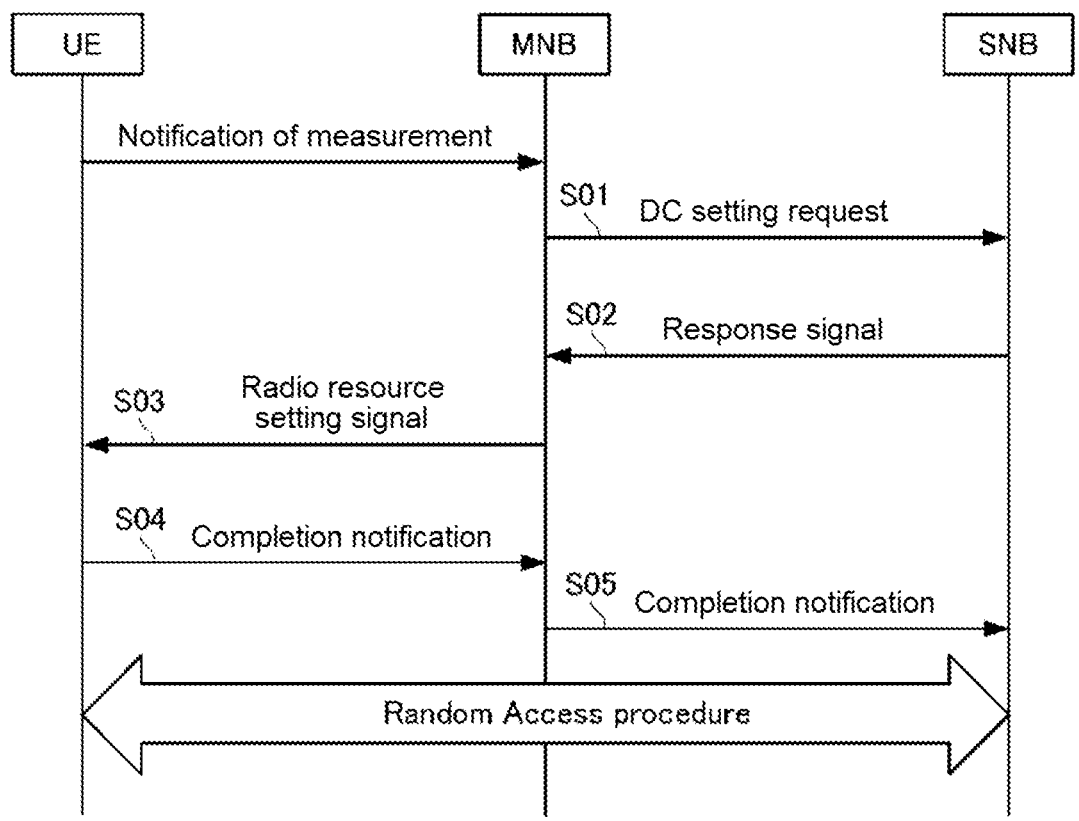
FIG. 22 is a sequence diagram of a related art showing a base transceiver station addition procedure in DC of non-standalone 5G wireless.
Figure 23:
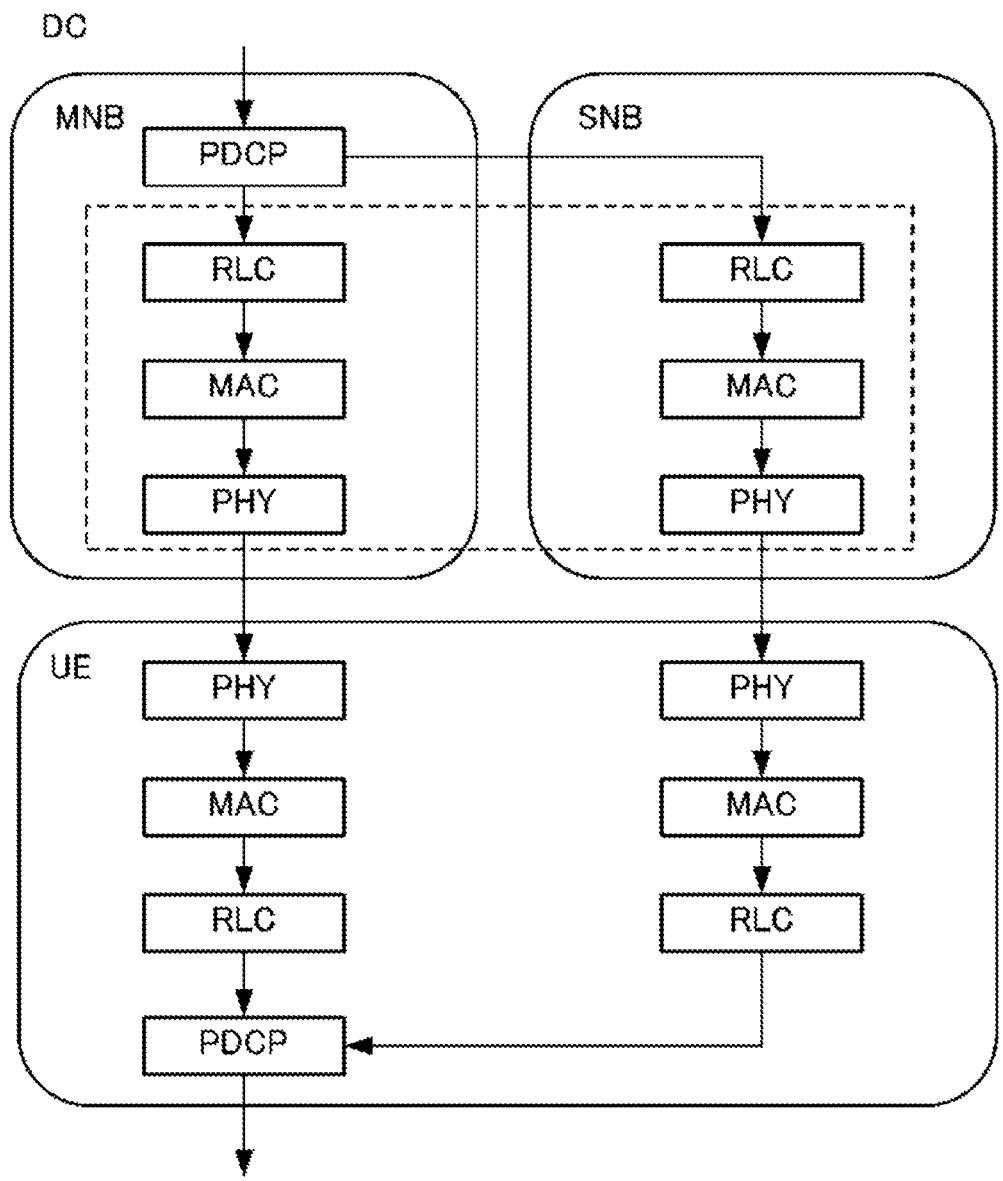
FIG. 23 is a diagram showing a conventional protocol stack in DC of non-standalone 5G wireless.
Figure 24:
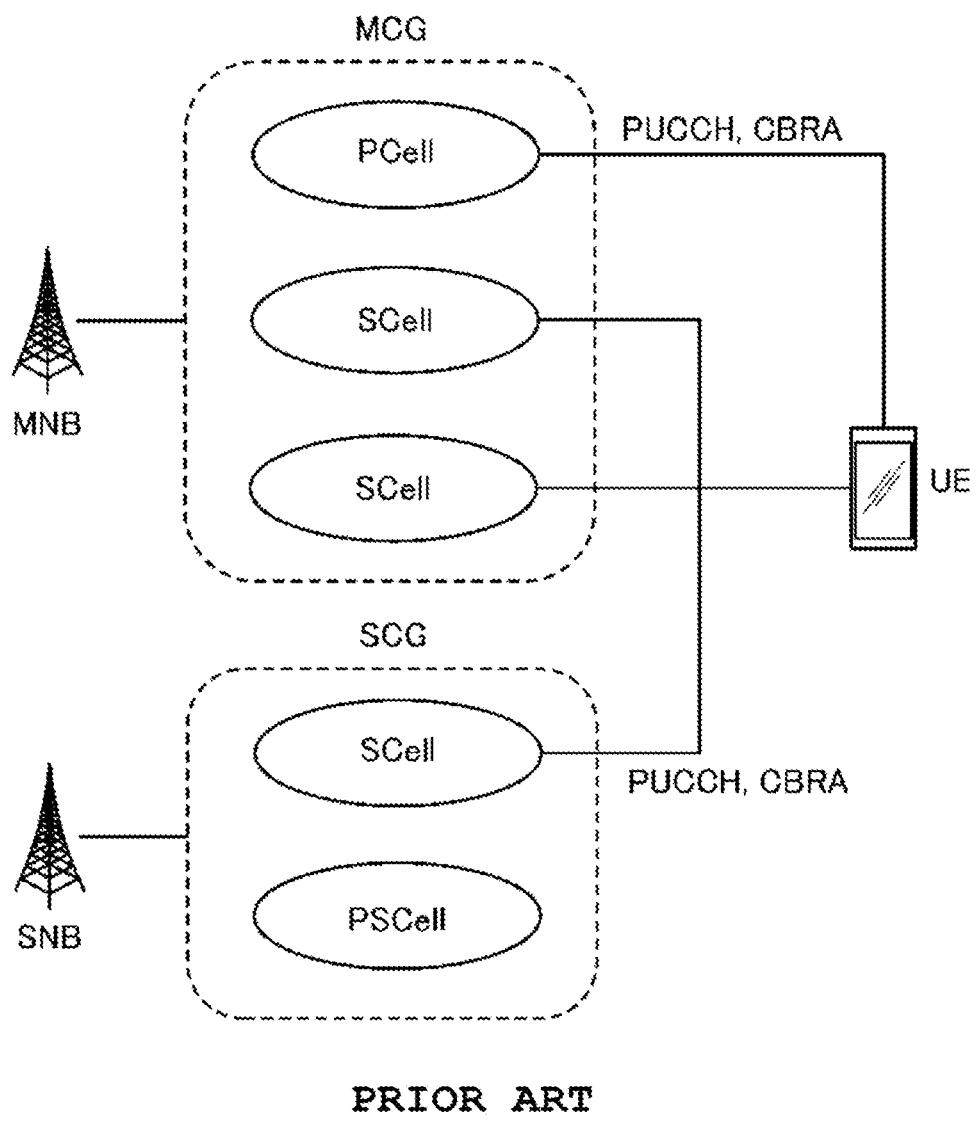
FIG. 24 is a schematic diagram showing a configuration of a conventional cell group in a non-standalone 5G wireless DC.

In addition, for example, in a case where a power characteristic confirmation request is input in step S47, the display control unit 30d displays, for example, in step S48, the power characteristic confirmation screen 33j as shown in FIG. 18 is displayed, and a case where a throughput confirmation request is input in step S47, for example, a throughput confirmation screen 33k as shown in FIG. 19 is displayed in step S48.

With the various operation confirmation screens displayed in step S48, the display control unit 30d determines whether or not an end request for issuing an instruction to end the processing is input (step S49). Here, if it is determined that the end request is not input (NO in step S49), the display control unit 30d returns to step S41 in accordance with the instruction to return the processing, displays the main screen 33a, and then continues the processing in and after step S41.

In contrast, if it is determined that the end request is input (YES in step S49), the display control unit 30d ends the above-described series of display control after the measurement of the terminal 11a is started.

Next, the display forms of the main screen 33a (refer to FIG. 8) relating to a series of display control shown in FIG. 7, the DC operation confirmation screens 33e and 33f (refer to FIG. 13 and FIG. 14), the test case confirmation screen 33g (refer to FIG. 15), the component confirmation screens 33h and 33i (refer to FIGS. 16 and 17), the power characteristic confirmation screen 33j (refer to FIG. 18), and the throughput confirmation screen 33k (refer to FIG. 19) will be described in more detail.

Both the DC operation confirmation screens 33e (refer to FIG. 13) and 33f (refer to FIG. 14) displayed in step S46 can be displayed, for example, by performing a click operation near the display area of the NR cell icon and the LTE cell icon in the connection status display area 33a2 of the main screen 33a (refer to FIG. 8) after the measurement of the terminal 11a is started. The DC operation confirmation screens 33e and 33f respectively have an operation data display area 33e1 and an operation image display area 33e2. The DC operation confirmation screen 33e and the DC operation confirmation screen 33f are display examples in a case where settings for the DC operation are different, and there is no difference in the screen configuration. The DC operation confirmation screen 33e shows a scroll status in which the operation data display area 33e1 is easily viewed, and the DC operation confirmation screen 33f shows a scroll status in which the operation image display area 33e2 is easily viewed.

Figure 14:
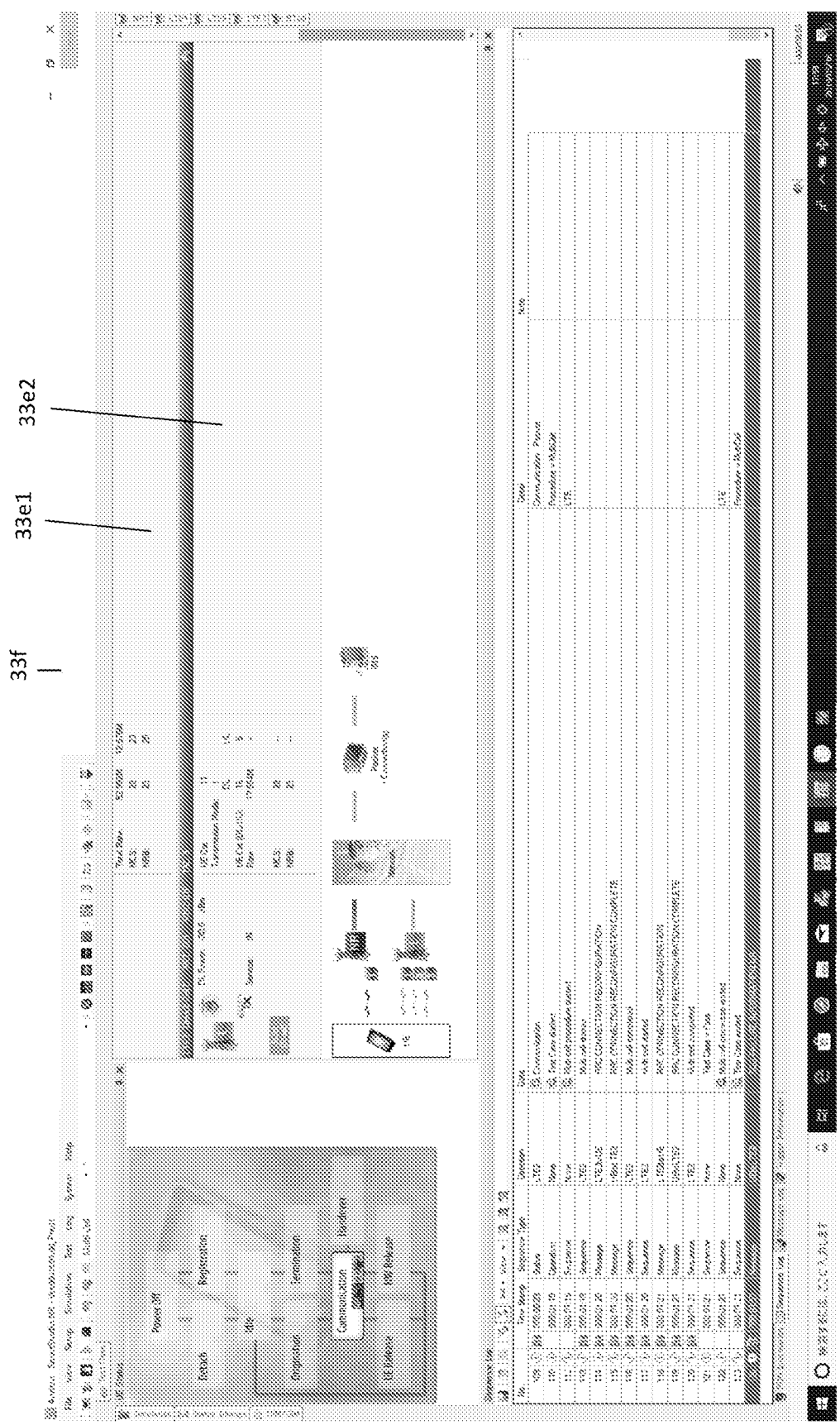
FIG. 14 is a diagram showing a display example of another example of a DC operation confirmation screen used for measurement of a terminal of the measurement device according to an embodiment of the present invention.

As shown in FIGS. 13 and 14, in the DC operation confirmation screens 33e and 33f, the operation data display area 33e1 has an NR operation data display area and an LTE operation data display area. In the NR operation data display area, detailed data according to a operation mode based on the DC system in which CCs of different base transceiver stations in the NR area are bundled is displayed. In the LTE operation data display area, detailed data relating to an operation mode based on the CA system that bundles CCs of the same base transceiver station in the LTE area is displayed.

Further, in the operation image display area 33e2 in the DC operation confirmation screens 33e and 33f, the operation mode based on the DC system in the NR area and the operation mode based on the CA system in the LTE area are displayed using images indicating the respective operation modes. For example, in the operation image display area 33e2 of the DC operation confirmation screen 33f shown in FIG. 14, an image, in which one rectangular frame is attached to the NR cell icon while three rectangular frames are attached to the LTE cell icon, is displayed, and an image, in which a base transceiver station corresponding to the rectangular frame displayed and attached to the NR icon and three base transceiver stations respectively corresponding to the three rectangular frames attached to the LTE cell icon communicate with the user equipment UE indicating the terminal 11a, is displayed. In the operation image display area 33e2 of the DC operation confirmation screen 33e shown in FIG. 13, the same kind of images are displayed although it is difficult to view the images at the scroll position.

As described above, the display control unit 30d has a display function of displaying images indicating an operation mode based on the DC system in the NR area and an operation mode based on the CA system in the LTE area.

In the present embodiment, by adopting the display form shown in the operation image display area 33e2 of FIGS. 13 and 14, the operation status of the DC system and the CD system in the non-standalone NR can be easily detected.

The screens, which can be displayed in step S48 of FIG. 7, include the test case confirmation screen 33g (refer to FIG. 15), component confirmation screens 33h and 33i (refer to FIG. 16 and FIG. 17), the power characteristic confirmation screen 33j (refer to FIG. 18), and the throughput confirmation screen 33k (refer to FIG. 19).

The test case confirmation screen 33g is a screen for setting an arbitrary cell from the NR cell or the LTE cell, tentatively performing a test of the terminal 11a on a trial basis, and confirming the radio condition of the set cell. The test case confirmation screen 33g can be displayed in a predetermined area on the main screen 33a in a manner shown in FIG. 15 in accordance with a tab selection operation on the main screen 33a, for example, during execution of the above-described test measurement.

In the measurement device 1A according to the present embodiment, in a case where the tab selection operation is performed, the display control unit 30d displays an image, which shows the radio condition of the NR cell or LTE cell being set as a test case, in the form shown in FIG. 15, on the basis of the setting contents of the number of RAT cells and the signal which is input from the NR measurement-related information determination unit 13*k* of the pseudo base transceiver station control unit 4.

The test case confirmation screen 33*g* shown in FIG. 15 particularly relates to an LTE cell. At this time, the display control unit 30*d* draws an image, to which a label text (identification information) including the RAT name "LTE" and the base transceiver station number (BTS number) of the LTE cell is attached, on the LTE cell icon represented by the LTE abbreviation "L". In the example of FIG. 15, an image in which a label text "LTE1" is attached to the LTE cell icon is displayed. The image includes a line segment indicating, for example, an elliptical wireless range of a cell being set as a test case.

Similarly, in the test case confirmation screen 33*g* in a case where an NR cell is set as a test case, the display control unit 30*d* draws an image in which a label text including the RAT name "NR" and the BTS numbers "1, 2, 3, . . . " of the NR cells is attached to the NR cell icon represented by the abbreviation symbol "N" for NR.

As described above, in the present embodiment, the display control unit 30*d* has a display function of displaying the test case confirmation screen for confirming the radio condition of the cell which is set as the test case among the NR cells or the LTE cells and drawing an image in which identification information including the RAT name and the base transceiver station number of the cell is attached to the NR cell icon or LTE cell icon corresponding to the RAT type for each cell set as a test case on the test case confirmation screen 33*g*.

In the present embodiment, the test case confirmation screen 33*g* is displayed in a form in which a label text in the format of "RAT name" and "BTS number" is attached to the NR cell icon or LTE cell icon. Therefore, even in a case where the number of BTSs is increased, the display space is sufficient, and the visibility can be ensured.

The component confirmation screens 33*h* and 33*i* are screens for confirming the carrier operation status during measurement of the terminal 11*a* between cells which are set as a combination for executing a scenario, and respectively have, for example, screen configurations as shown in FIGS. 16 and 17. The component confirmation screens 33*h* and 33*i* are common in that the CC is indicated by a carrier icon having a rectangular shape with rounded corners, for example, but differ in a method of bundling carriers for LTE. The component confirmation screen 33*h* shows an example in which carriers are bundled into one frequency band (band) in LTE, and the component confirmation screen 33*i* shows an example in which the carriers are bundled into a plurality of bands (two bands).

As shown in FIG. 16, the component confirmation screen 33*h* has a carrier operation display area 33*h*1 and a CA/DC setting condition display area 33*h*2. In the carrier operation display area 33*h*1, the carrier use status between the RAT cells being set is displayed using a carrier icon. As shown in FIG. 16, the component confirmation screen 33*h* has a screen configuration that represents the bands bundled by arranging the component icons corresponding to several CCs that are the components of the bundled frequency bands.

Specifically, in the component confirmation screen 33*h*, display areas 35*f* and 35*g* corresponding to the master node and the secondary node are ensured in the carrier operation display area 33*h*1. In the upper master node display area 35*f*, an LTE cell icon is displayed next to the notation "Master Node", and below the LTE cell icon, component icons corresponding to the CC bundled as Band 1 are arranged in the horizontal direction, and those are displayed to be divided into DL (downlink) and UL (uplink). In the example of FIG. 16, for the DL, three component icons respectively corresponding to three CCs that are radio resources of LTE1, LTE2, and LTE3 are displayed. For UL, a component icon corresponding to one CC that is a radio resource of LTE1 is displayed.

All component icons have, for example, rectangular shapes with rounded corners and the same size. However, the component icon corresponding to the CC that is the radio resource of the master node and the component icon corresponding to the CC that is the radio resource of the secondary node are displayed in different colors. In FIG. 16, for example, the component icons displayed in blue are hatched. The component icons not hatched are displayed in red, for example.

Further, in each component icon, identification information for identifying a cell as a resource source is described inside the icon. As the identification information, for example, a label text including a RAT name and a base transceiver station number is used. A numerical value (for example, "10", in units of MHz) indicating the band of each corresponding CC is noted above each component icon, and a total value thereof (for example, "30 MHz") is noted next to the numerical value. A symbol indicating that the corresponding CCs are bundled together and a band name (for example, Band1) are noted below the component icons.

In the display area 35*g* of the secondary node below the display area 35*f* of the master node in the carrier operation display area 33*h*1, an NR cell icon is displayed beside the notation of "Secondary Node", and below the notation, for example, the component icons corresponding to the CCs bundled as BTsn77 are displayed. The component icons in the display area of the secondary node are basically displayed in the above-described display form of the component icons in the display area of the master node.

Similarly to the component confirmation screen 33*h*, the component confirmation screen 33*i* shown in FIG. 17 has a screen configuration including a carrier operation display area 33*i*1 and a CA/DC setting condition display area 33*i*2. However, the configuration of the CA/DC setting condition display area 33*i*2 is different from the CA/DC setting condition display area 33*h*2 in the component confirmation screen 33*h*.

In the carrier operation display area 33*i*1 of the component confirmation screen 33*i*, the component icons are displayed in a manner different from that of the carrier operation display area 33*h*1 (refer to FIG. 16) so as to correspond to the CA/DC setting condition display area 33*i*2. In the example of FIG. 17, the display form of the component icons relating to DL in the display area 35*f* of the master node of the carrier operation display area 33*i*1 is different from that of the carrier operation display area 33*h*1. The DL in the display area 35*f* of the master node of the carrier operation display area 33*i*1 is displayed in such a manner that it is possible to know a situation where Band1 corresponding to the radio resource of LTE1 and Band3 that bundles the radio resources of LTE2 and LTE3 are used. The display form of the other part of the carrier operation display area 33*i*1 is the same as that of the carrier operation display area 33*h*1.

As described above, in the measurement device 1A according to the present embodiment, the display control unit 30*d* has a display function of displaying the component confirmation screen and the component icons classified into a master node, a secondary node, an uplink and a downlink. In the component confirmation screen, the component icons having the same shape indicating the CCs to be bundled on the basis of the CA system and the DC system are arranged, the identification information including the RAT name and the base transceiver station number serving as a resource of the CC is noted in each component icon, and a bandwidth of the CC is noted above the component icon.

Conventionally, as a method of confirming the CC, for example, there a method in which the width of the component icon is changed and displayed in accordance with the value of the bandwidth set for each BTS. Further, conventionally, as image drawing for multi-cells, there is image drawing for only LTE.

On the other hand, in the present embodiment, as shown in FIGS. 16 and 17, the component icons are unified into the same shape and are all displayed with the same width, and are displayed in a form in which the identification information including the RAT name and the base transceiver station number is noted in the component icon and the bandwidth is noted above the component icon. For this reason, in the present embodiment, even in a case where the number of BTSs increases, the display area can be spread horizontally, and the RAT type can be easily detected.

The power characteristic confirmation screen 33j has, for example, a power characteristic display area 33j1, a power adjustment display area 33j2, and an operation status display area 33j3, as shown in FIG. 18. The power characteristic display area 33j1 is an area for displaying the power of the component carrier of the set cell using a graph in which the horizontal axis represents time and the vertical axis represents power. The power adjustment display area 33j2 is an area for displaying setting items for power adjustment of component carriers of each cell. The operation status display area 33j3 is an area where an image of the operation status of each cell is drawn using each cell and each image which indicates the terminal 11a as a measurement target.

The power characteristic confirmation screen 33j can be displayed by, for example, a tab operation on the main screen 33a as necessary. In order to display the power characteristic confirmation screen 33j, the control unit 31 (refer to FIG. 5) of the control device 22 includes a power detection function unit, which is not shown, for detecting the power of a component carrier as a resource of each NR cell and LTE cell, for which a combination is set in accordance with a scenario, on the basis of the signal (the signal transmitted from the terminal 11a during the simulative communication) which is output by the NR measurement-related information determination unit 13k of the pseudo base transceiver station control unit 4. The power detection function unit may be provided in another position, for example, in the display control unit 30d.

The display control unit 30d draws, as a graph, the power characteristics (characteristics of change in power value with respect to time) of the component carriers of the NR cells and LTE cells detected by the power detection function unit in the power characteristic display area 33j1 corresponding to the NR cells and the LTE cells.

Conventionally, this type of display of the power characteristic corresponds only to LTE, and the power of each cell is not displayed corresponding to LTE and NR as in the present embodiment. According to the configuration of the present embodiment in which the power characteristics of the NR cell and the LTE cell are displayed on the same graph, the power characteristics of the NR cell and the LTE cell relating to DC in the non-standalone NR can be easily and reliably detected.

The display control unit 30d draws an operation status image of the NR cells and the LTE cells in the operation status display area 33j3 in accordance with the display of the graph showing the power characteristics of the NR cell and the LTE cell in the power characteristic display area 33j1 of the power characteristic confirmation screen 33j.

Here, for example, as shown in FIG. 18, there are a plurality of base transceiver stations which are set as cells to be subjected to the simulative communication operation in the NR area and the LTE area. In this case, the display control unit 30d performs display such that two NR cell icons 51, 55 and two LTE cell icons 52, 56 respectively corresponding to the first and last base transceiver stations are displayed side by side for each of the NR area and the LTE area, and performs display in a form in which the identification information pieces in which the RAT names, the first base transceiver station numbers, and the last base numbers are separately listed are noted in association with the two NR cell icons and the two LTE cell icons. In other words, the display control unit 30d displays NR cell icons 51, a first form in which an additional NR cell icon 55 is arranged next to the first cell icon, and LTE cell icons 52, and a second form in which an additional LTE cell icon 56 is arranged next to the LTE cell icon 52.

Specifically, in the example of FIG. 18, in the NR area, the display control unit 30d performs display in a form in which the two NR cell icons with the symbol "NR" are arranged side by side and the first base transceiver station number "1" subsequent to "NR" and the next base transceiver station number "2" are noted to be separated by, for example, a comma below both NR cell icons. Similarly, in the LTE area, the display is performed in a form in which two LTE cell icons with the LTE abbreviation [L] are arranged side by side and the first base transceiver station number "1" subsequent to "LTE" and the next base transceiver station number "3" are noted to be separated by commas below both LTE cell icons.

As a modification example in this case, in a case where three or more cells are set, the display control unit 30d may change the display form relating to "NR1, 2" and "LTE1, 2, 3" in FIG. 18 to a display form of "NR1-3" and "LTE1-5" or the like by connecting the first base transceiver station number and the last base transceiver station number through, for example, a line segment.

As described above, in the measurement device 1A according to the present embodiment, there are a plurality of base transceiver stations which are set as cells in the NR area and the LTE area. In this case, the display control unit 30d performs display such that two BTS icons (NR cell icon and LTE cell icon) respectively corresponding to the first and last base transceiver stations are displayed side by side for each of the NR area and the LTE area, and performs display in a form in which one identification information piece in which the RAT name, the first base transceiver station number, and the last base number are separately arranged is attached to the two NR cell icons (first cell icons) and the two LTE cell icons (second cell icons). By providing this function, it is possible to deal with the non-standalone NR, and it is possible to easily detect the operation status of the NR cell and the LTE cell.

The throughput confirmation screen 33k has, for example, a throughput display area 33k1 and a carrier operation status display area 33k2 as shown in FIG. 19. The throughput display area 33k1 is an area for displaying the throughputs of the component carriers listed in the carrier operation status display area 33k2 by using a graph in which the horizontal axis represents time and the vertical axis represents the processing amount (unit is, for example, kbps).

The throughput confirmation screen 33k can be displayed by, for example, a predetermined tab operation on the main screen 33a. In order to display the throughput confirmation screen 33k, the control unit 31 (refer to FIG. 5) of the control device 22 includes a throughput measurement function unit for detecting the throughput of a component carrier as a radio resource of each NR cell and LTE cell, for which a combination is set in accordance with a scenario, on the basis of the signal (the signal transmitted from the terminal 11a during the simulative communication) which is output by the NR measurement-related information determination unit 13k of the pseudo base transceiver station control unit 4. The throughput measurement function unit may be provided in another position such as the display control unit 30d.

The display control unit 30d draws, as a graph in the form shown in FIG. 19, the characteristic of the throughput of the component carrier used by each NR cell and LTE cell detected by the throughput detection function unit, in the throughput display area 33k1.

Conventionally, the display of the throughput characteristic of the component carrier generally corresponds to only the LTE. The display is not performed such that the throughput characteristics of the NR cell and the LTE cell corresponding to the LTE and the NR are collectively displayed at one place as in the present embodiment. According to the configuration of the present embodiment in which the throughput characteristics of the carriers that are the radio resources of the NR cell and the LTE cell are collectively displayed at one place as a graph, the throughput characteristics relating to the carriers of the DC NR cell and the LTE c in the non-standalone NR can be detected easily and reliably.

As described above, the measurement device 1A according to the present embodiment simulates three or more base transceiver stations so as to test the terminal 11a. The three or more base transceiver stations include the NR station compliant with the NR communication standard and the LTE base transceiver station compliant with the LTE communication standard. The measurement device 1A includes: the transmitting/receiving unit 3 that transmits and receives a signal of the NR communication standard between the NR base transceiver station and the terminal 11a and that transmits and receives a signal of the LTE communication standard between the LTE base transceiver station and the terminal 11a; a pseudo base transceiver station control unit 4 that controls the transmitting/receiving unit such that the transmitting/receiving unit performs a simulative communication operation for simulating communication between the terminal 11a and the three or more base transceiver stations; the display unit 33 that displays measurement-related information relating to measurement of the terminal 11a; and the display control unit 30d that causes the display unit 33 to display the measurement-related information relating to the measurement of the terminal 11a based on a signal transmitted to and received from the terminal 11a during the simulative communication operation. The display control unit 30c1 displays one NR cell icon indicating that the base transceiver station is compliant with the NR communication standard and one LTE cell icon indicating that the base transceiver station is compliant with the LTE communication standard, performs the display in a form in which the same number of graphic forms as the number of base transceiver stations compliant with the NR communication standard are arranged in association with the NR cell icon, and performs the display in a form in which the same number of graphic forms as the number of LTE base transceiver stations are arranged in association with the LTE cell icon.

With this configuration, the measurement device 1A according to the first aspect of the present embodiment may constantly display one NR cell icon and one LTE cell icon. In addition, even in a case where the number of NR base transceiver stations and the number of LTE base transceiver stations increase, the display area can be saved. In addition, all base transceiver stations can be displayed in a graphic form in association with the NR cell icon and the LTE cell icon, respectively.

Further, the measurement device 1A according to the present embodiment may be configured such that the display control unit 30d displays rectangular frames as the graphic forms, and displays a number for identifying a number for identifying the NR base transceiver station and the LTE base transceiver station for each of the rectangular frames.

With this configuration, the measurement device 1A according to the present embodiment is able to display, as the rectangular frames, the NR base transceiver stations and the LTE base transceiver stations in association with the NR cell icon and the LTE cell icon. Thus, the display area can be saved. Further, it is possible to easily detect the number of all base transceiver stations with reference to the number displayed in the rectangular frame.

Further, the measurement device 1A according to the present embodiment is configured such that each graphic form shows a box shape of which one surface is the rectangular frame, and the graphic forms are displayed in a form in which the graphic forms are vertically stacked. With this configuration, the measurement device 1A according to the present embodiment is able to prevent the entire display area from being expanded as the number of stacking steps of the rectangular frames associated with the NR cell icon and the LTE cell icon changes even in a case where the number of NR base transceiver stations and the number of LTE base transceiver stations increase.

Further, the measurement device 1A according to the present embodiment simulates four or more base transceiver stations so as to test the terminal 11a. The four or more base transceiver stations include the NR base transceiver stations compliant with the NR communication standard and the LTE base transceiver stations compliant with the LTE communication standard. The measurement device 1A includes: the transmitting/receiving unit 3 that transmits and receives a signal of the NR communication standard between the NR base transceiver station and the terminal 11a and that transmits and receives a signal of the LTE communication standard between the LTE base transceiver station and the terminal 11a; a pseudo base transceiver station control unit 4 that controls the transmitting/receiving unit such that the transmitting/receiving unit performs a simulative communication operation for simulating communication between the terminal 11a and the four or more base transceiver stations; and the display unit 33 that displays measurement-related information relating to measurement of the terminal 11a; and the display control unit 30d that causes the display unit 33 to display the measurement-related information relating to the measurement of the terminal 11a based on a signal transmitted to and received from the terminal 11a during the simulative communication operation, where in the display control means further causes the display unit to perform the display such that two NR cell icons each indicating that the base transceiver station is compliant with the NR communication standard are arranged and two LTE cell icons each indicating that the base transceiver station is compliant with the LTE communication standard are arranged.

With this configuration, the measurement device 1A according to the present embodiment may display two NR cell icons and two LTE cell icons. In addition, the display area can be prevented from being extended in accordance with the number of NR base transceiver stations and the number of LTE base transceiver stations.

The measurement device 1A according to the present embodiment is configured as follows. The two NR cell icons are the NR cell icon corresponding to the first numbered base transceiver station of the NR base transceiver station and the NR cell icon corresponding to the last numbered base transceiver station of the NR base transceiver station. The two LTE cell icons are the LTE cell icon corresponding to the first numbered base transceiver station of the LTE base transceiver station and the LTE cell icon corresponding to the last numbered base transceiver station of the LTE base transceiver station. In addition, may be configured such that the display control means causes the display unit to perform the display in a form in which information for identifying the NR communication standard and first and last numbers of the NR base transceiver stations are separated and transcribed in association with the two NR cell icons, and information for identifying the LTE communication standard and first and last numbers of the LTE base transceiver stations are separated and transcribed in association with the two LTE cell icons.

With this configuration, the measurement device 1A according to the present embodiment is able to display all base transceiver stations in limited display area by displaying combination of information for identifying the NR or LTE communication standard respectively associated with the two NR cell icons and the two LTE cell icons and notation of the first and last numbers of the base transceiver stations compliant with the NR or LTE communication standard. The first and last numbers are separated from each other.

In addition, the measurement device 1A according to the present embodiment is configured such that the display control unit 30d displays a form connecting lines indicating that base transceiver station numbers, which are continuous between a first base transceiver station number and a last base number respectively transcribed in each of the two NR cell icons and the two LTE cell icons, are omitted between the first base transceiver station number and the last base number.

With this configuration, the measurement device 1A according to the present embodiment can be configured to display all base transceiver stations in a limited display area through notation of the first and last numbers of the base transceiver stations compliant with the NR or LTE communication standard respectively associated with the two NR cell icons and the two LTE cell icons. The first and last numbers are connected to each other by the lines.

The measurement device 1A according to the present embodiment simulates three or more base transceiver stations so as to test the terminal 11a. The three or more base transceiver stations include the NR base transceiver station compliant with the NR communication standard and the LTE base transceiver station compliant with the LTE communication standard. The measurement device 1A includes: the transmitting/receiving unit 3 that transmits and receives a signal of the NR communication standard between the NR base transceiver station and the terminal 11a and that transmits and receives a signal of the LTE communication standard between the LTE base transceiver station and the terminal 11a; a pseudo base transceiver station control unit 4 that controls the transmitting/receiving unit such that the transmitting/receiving unit performs a simulative communication operation for simulating communication between the terminal 11a and the three or more base transceiver stations; the display unit 33 that displays measurement-related information relating to measurement of the terminal 11a; and the display control unit 30d that causes the display unit 33 to display the measurement-related information relating to the measurement of the terminal 11a based on a signal transmitted to and received from the terminal 11a during the simulative communication operation. The display control unit 30d causes the display unit to display one NR cell icon indicating that the base transceiver station is compliant with the NR communication standard and one LTE cell icon indicating that the base transceiver station is compliant with the LTE communication standard, to further display a simulation model display area 33b2 having display areas 35d and 35e respectively corresponding to the NR base transceiver station and the LTE base transceiver station, and to display, on the display area 35d, a form in which a numerical value corresponding to the number of NR base transceiver stations is attached to the one NR cell icon, and to display, on the display area 35e, a form in which a numerical value corresponding to the number of LTE base transceiver stations is attached to the one LTE cell icon.

With this configuration, in the measurement device 1A according to the seventh aspect of the present embodiment, by performing display such that numerical values are respectively attached to the NR cell icon and the LTE cell icon in both the display area 35d and the display area 35e in the simulation model display area 33b2, the display area can be saved. Further, each number of base transceiver stations can be easily detected from each of the numerical values attached to the NR cell icon and the LTE cell icon.

Further, in the measurement device 1A according to the present embodiment, NR as a first communication standard and LTE as a second communication standard are mixed. With this configuration, the measurement device 1A according of the present embodiment can be applied to the measurement of the terminal 11a in the non-standalone NR operation. Thus, even in a case where the number of NR and LTE base transceiver stations increases, it is possible to display an image of all base transceiver stations within a limited display area by saving the display area.

Further, the communication terminal measurement system 1B according to the present embodiment simulates three or more base transceiver stations so as to test the terminal 11a. The three or more base transceiver stations include the NR base transceiver station compliant with the NR communication standard and the LTE base transceiver station compliant with the LTE communication standard. The communication terminal measurement system 1B includes: the NR measurement device 20 that is compliant with the NR communication standard and includes a first transmitting/receiving unit 3 which transmits and receives a signal of the NB communication standard between the NR base transceiver station and the terminal 11a; the LTE measurement device 21 that is compliant with the LTE communication standard and includes a second transmitting/receiving unit 3 which transmits and receives a signal of the LTE communication standard between the LTE base transceiver station and the terminal 11a; the control device 22 that has a pseudo base transceiver station control unit 4 that controls the first and second transmitting/receiving units 3 such that the transmitting/receiving units each perform a simulative communication operation for simulating communication between the terminal 11a and the three or more base transceiver stations, the display unit 33 that displays measurement-related information relating to measurement of the terminal 11*a*, and the display control unit 30*d* that causes the display unit 33 to display the measurement-related information relating to the measurement of the terminal 11*a* based on a signal transmitted to and received from the terminal 11*a* during the simulative communication operation. The display control unit 30*d* displays one NR cell icon indicating that the base transceiver station is compliant with the NR communication standard and one LTE cell icon indicating that the base transceiver station is compliant with the LTE communication standard, performs the display in a form in which the same number of graphic forms as the number of NR base transceiver stations are arranged in association with the NR cell icon, and performs the display in a form in which the same number of graphic forms as the number of base transceiver stations corresponding to the LTE communication standard are arranged in association with the LTE cell icon.

With this configuration, the communication terminal measurement system 1B according to the present embodiment is able to constantly display one NR cell icon and one LTE cell icon. In addition, even in a case where the number of NR base transceiver stations and the number of LTE base transceiver stations increases, the display area can be saved. In addition, all base transceiver stations can be displayed in a graphic form in association with the NR cell icon and the LTE cell icon, respectively.

The communication terminal measurement system 1B according to the present embodiment is configured such that the display control unit 30*d* displays rectangular frames as the graphic forms, and displays a number for identifying a number for identifying the NR base transceiver station and the LTE base transceiver station for each of the rectangular frames.

With this configuration, the communication terminal measurement system 1B according to the present embodiment is able to display, as the rectangular frames, the NR base transceiver stations and the LTE base transceiver stations in association with the NR cell icon and the LTE cell icon. Thus, the display area can be saved. Further, it is possible to easily detect the number of all base transceiver stations with reference to the number displayed in the rectangular frame.

Further, the communication terminal measurement system 1B according to the present embodiment is configured such that each graphic form shows a box shape of which one surface is the rectangular frame, and the graphic forms are displayed in a form in which the graphic forms are vertically stacked. With this configuration, the communication terminal measurement system 1B according to the present embodiment is able to prevent the entire display area from being expanded as the number of stacking steps of the rectangular frames associated with the NR cell icon and the LTE cell icon changes even in a case where the number of NR base transceiver stations and the number of LTE base transceiver stations increase.

Further, the communication terminal measurement system 1B according to the present embodiment simulates four or more base transceiver stations so as to test the terminal 11*a*. The four or more base transceiver stations include the NR base transceiver station compliant with the NR communication standard and the LTE base transceiver station compliant with the LTE communication standard. The communication terminal measurement system 1B includes: the NR measurement device 20 that is compliant with the NR communication standard and includes a first transmitting/receiving unit 3 which transmits and receives a signal of the NR communication standard between the NR base transceiver station and the terminal 11*a*; the LTE measurement device 21 that is compliant with the LTE communication standard and includes a second transmitting/receiving unit 3 which transmits and receives a signal of the LTE communication standard between the LTE base transceiver station and the terminal 11*a*; the display unit 33 that displays measurement-related information relating to measurement of the terminal 11*a*; and the control device 22 that has a pseudo base transceiver station control unit 4 that controls the first and second transmitting/receiving units 3 such that the transmitting/receiving units 3 each perform a simulative communication operation for simulating communication between the terminal 11*a* and the four or more base transceiver stations, and the display control unit 30*d* that causes the display unit 33 to display the measurement-related information relating to the measurement of the terminal 11*a* based on a signal transmitted to and received from the terminal 11*a* during the simulative communication operation. The number of NR base transceiver stations is two or more, the number of LTE base transceiver stations is two or more, and the respective base transceiver stations are identified by numbers. In addition, the display control unit 30*d* further causes the display unit 33 to display the measurement-related information relating to the measurement of the terminal 11*a* based on a signal transmitted to and received from the terminal 11*a* during the simulative communication operation such that two NR cell icons each indicating that the base transceiver station is compliant with the NR communication standard are arranged and two LTE cell icons each indicating that the base transceiver station is compliant with the LTE communication standard are arranged.

With this configuration, the communication terminal measurement system 1B according to the present embodiment is able to display two NR cell icons and two LTE cell icons. In addition, the display area can be prevented from being extended in accordance with the number of NR base transceiver stations and the number of LTE base transceiver stations.

In addition, the communication terminal measurement system 1B according to the present embodiment is configured as follows. The two NR cell icons are the NR cell icon corresponding to the first numbered base transceiver station of the NR base transceiver station and the NR cell icon corresponding to the last numbered base transceiver station of the NR base transceiver station. The two LTE cell icons are the LTE cell icon corresponding to the first numbered base transceiver station of the LTE base transceiver station and the LTE cell icon corresponding to the last numbered base transceiver station of the LTE base transceiver station. The display control unit 30*d* causes the display unit to perform the display in a form in which information for identifying the NR communication standard and first and last numbers of the NR base transceiver stations are separated and transcribed in association with the two NR cell icons and in which information for identifying the LTE communication standard and first and last numbers of the LTE base transceiver stations are separated and transcribed in association with the two LTE cell icons.

With this configuration, the communication terminal measurement system 1B according to the present embodiment is able to display all base transceiver stations in a limited display area by displaying combination of information for identifying the NR or LTE communication standard respectively associated with the two NR cell icons and the two LTE cell icons and notation of the first and last numbers of the base transceiver stations compliant with the NR or LTE communication standard. The first and last numbers are separated from each other.

Further, the communication terminal measurement system 1B according to the present embodiment is configured such that the display control unit 30d causes the display unit to display a form connecting lines indicating that base transceiver station numbers, which are continuous between a first base transceiver station number and a last base number respectively transcribed in each of the two NR icons and the two LTE cell icons, are omitted between the first base transceiver station number and the last base number.

With this configuration, the communication terminal measurement system 1B according to the present embodiment is able to display all base transceiver stations in a limited display area through notation of the first and last numbers of the base transceiver stations compliant with the NR or LTE communication standard respectively associated with the two NR cell icons and the two LTE cell icons. The first and last numbers are connected to each other by the lines.

Further, the communication terminal measurement system 1B according to the present embodiment simulates three or more base transceiver stations so as to test the terminal 11a. The three or more base transceiver stations include the NR base transceiver station compliant with the NR communication standard and the LTE base transceiver station compliant with the LTE communication standard. The communication terminal measurement system 1B includes: the NR measurement device 20 that is compliant with the NR communication standard and includes first transmitting/receiving unit 3 which transmits and receives a signal of the NR communication standard between the NR base transceiver station and the terminal 11a; the LTE measurement device 21 that is compliant with the LTE communication standard and includes a second transmitting/receiving unit 3 which transmits and receives a signal of the LTE communication standard between the LTE base transceiver station and the terminal 11a; the display unit 33 that displays measurement-related information relating to measurement of the terminal 11a; and the control device 22 that has a pseudo base transceiver station control unit 4 that controls the first and second transmitting/receiving units 3 such that the transmitting/receiving units each perform a simulative communication operation for simulating communication between the terminal 11a and the three or more base transceiver stations, and the display control unit 30d that causes the display unit 33 to display measurement-related information relating to measurement of the terminal 11a based on a signal transmitted to and received from the terminal 11a during the simulative communication operation. In addition, the display control unit 30d further causes the display unit to display the simulation model display area 33b2 having display areas 35d and 35e respectively corresponding to the NR base transceiver station and the LTE base transceiver station, display a NR cell icon, to which the number of NR base transceiver stations attached and which corresponds to the NR base transceiver stations, on the display area 35d, and display a LTE cell icon, to which the number of LTE base transceiver stations is attached and which corresponds to the LTE base transceiver stations, on the display area 35e.

With this configuration, in the communication terminal measurement system 1B according to the present embodiment, by performing display such that numerical values are respectively attached to the NR cell icon and the LTE cell icon in both the display area 35d and the display area 35e in the simulation model display area 33b2, the display area can be saved. Further, each number of base transceiver stations can be easily detected from each of the numerical values attached to the NR cell icon and the LTE cell icon.

Further, in the communication terminal measurement system 1B according to the present embodiment, NR as a first communication standard and LTE as a second communication standard are mixed. With this configuration, the communication terminal measurement system 1B according of the present embodiment can be applied to the measurement of the terminal 11a in the non-standalone NR operation. Thus, even in a case where the number of NR and LTE base transceiver stations increases, it is possible to display an image of all base transceiver stations within a limited display area by saving the display area.

In addition, the measurement-related information display method according to the present embodiment is a measurement-related information display method of simulating three or more base transceiver stations each including NR base transceiver stations and the LTE communication standard and displaying measurement-related information relating to measurement of the terminal 11a. The method includes: a receiving step S34 of receiving a setting of a combination of the NR base transceiver station and the LTE base transceiver station; and a display control step S44 of displaying, on the basis of the combination of the NR base transceiver station and the LTE base transceiver station received in the receiving step S43, a form which includes one NR cell icon indicating that the base transceiver station is compliant with the NR communication standard and one LTE cell icon indicating that the base transceiver station is compliant with the LTE communication standard within a connection status display area 33a2 with a predetermined size, and in which graphic forms having the number of base transceiver stations compliant with each of the NR communication standard and the number of LTE base transceiver stations are arranged in association with each of the NR cell icon and the LTE cell icon.

With this configuration, in the measurement-related information display method according to the present embodiment, in the display control step s44, one NR cell icon and one LTE cell icon may be constantly displayed. In addition, even in a case where the number of NR base transceiver stations and the number of LTE base transceiver stations increases, the display area can be saved. In addition, all base transceiver stations can be displayed in a graphic form in association with the NR cell icon and the LTE cell icon, respectively.

Although the present embodiment has exemplified the operation mode in which 5GNR and LTE are mixed, the present embodiment may be applied to even an operation mode in which LTE and pre-LTE, or future 5GNR and the next communication standard are used.

INDUSTRIAL APPLICABILITY

As described above, the measurement device, the communication terminal measurement system, and the measurement-related information display method according to the present invention is available for all of a measurement device that tests the communication terminal by simulating the base transceiver stations, a communication terminal measurement system, and a measurement-related information display method having an effect capable of displaying images of all base transceiver stations in a designated display area by saving an area of a screen even in a case where the number of base transceiver stations compliant with the old communication standard or the number of base transceiver stations compliant with the new communication standard increases, when performing communication in an operation mode in which old and new communication standards are mixed.

DESCRIPTION OF REFERENCE NUMERALS AND SIGNS 1A measurement device
1B communication terminal measurement system
4 pseudo base transceiver station control unit
6e NR measurement-related display unit (display unit)
11a terminal (communication terminal)
20 NR measurement device
21 LTE measurement device
22 control device (pseudo base transceiver station control unit)
30d display control unit (display control means)
33 display unit
33a2 connection status display area
33b simulation model setting screen
35d display area corresponding to NR area
35e display area corresponding to LTE area

What is claimed is:

1. A measurement device that simulates three or more base transceiver stations so as to test a communication terminal, wherein the three or more base transceiver stations include two base transceiver stations compliant with a first communication standard and at least one base transceiver station compliant with a second communication standard, wherein the measurement device comprises:
   a transmitting/receiving unit that transmits and receives a signal of the first communication standard between the base transceiver station compliant with the first communication standard and the communication terminal and that transmits and receives a signal of the second communication standard between the base transceiver station compliant with the second communication standard and the communication terminal;
   a pseudo base transceiver station control unit that controls the transmitting/receiving unit such that the transmitting/receiving unit performs a simulative communication operation for simulating communication between the communication terminal and the plurality of base transceiver stations;
   a display unit that displays measurement-related information relating to measurement of the communication terminal; and
   display control means for causing the display unit to display the measurement-related information relating to the measurement of the communication terminal based on a signal transmitted to and received from the communication terminal during the simulative communication operation,
   wherein the display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations compliant with the second communication standard in association with the second cell icon,
   wherein the first form is a set of the same number of graphic forms as the number of base transceiver stations compliant with the first communication standard arranged in association with the first cell icon, and
   wherein the second form is a set of the same number of graphic forms as the number of base transceiver stations compliant with the second communication standard arranged in association with the second cell icon.

2. The measurement device according to claim 1, wherein the display control means displays a number for identifying the base transceiver station compliant with the first communication standard and a number for identifying the base transceiver station compliant with the second communication standard for each of the graphic forms.

3. The measurement device according to claim 2, wherein each graphic form shows a box shape and the graphic forms are displayed in a form in which the graphic forms are vertically stacked.

4. The measurement device according to claim 1, wherein the first communication standard is any one of NR or LTE, and the second communication standard is the other one of NR or LTE.

5. A measurement device that simulates four or more base transceiver stations so as to test a communication terminal, wherein the four or more base transceiver stations include two or more base transceiver stations compliant with a first communication standard and two or more base transceiver stations compliant with a second communication standard, and each of the base transceiver station is identified by a number, wherein the measurement device comprises:
   a transmitting/receiving unit that transmits and receives a signal of the first communication standard between the base transceiver station compliant with the first communication standard and the communication terminal and that transmits and receives a signal of the second communication standard between the base transceiver station compliant with the second communication standard and the communication terminal;
   a pseudo base transceiver station control unit that controls the transmitting/receiving unit such that the transmitting/receiving unit performs a simulative communication operation for simulating communication between the communication terminal and the plurality of base transceiver stations;
   a display unit that displays measurement-related information relating to measurement of the communication terminal; and
   display control means for causing the display unit to display the measurement-related information relating to the measurement of the communication terminal based on a signal transmitted to and received from the communication terminal during the simulative communication operation,
   wherein the display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations compliant with the second communication standard in association with the second cell icon,
   wherein the first form is a form in which an additional first cell icon is arranged next to the first cell icon, and
   wherein the second form is a form in which an additional second cell icon is arranged next to the second cell icon.

6. The measurement device according to claim 5,
wherein the first cell icon is the first cell icon corresponding to the first numbered base transceiver station of the base transceiver station compliant with the first communication standard and the additional first cell icon is the first cell icon corresponding to the last numbered base transceiver station of the base transceiver station compliant with the first communication standard,
wherein the second cell icon is the second cell icon corresponding to the first numbered base transceiver station of the base transceiver station compliant with the second communication standard and the additional second cell icon is the second cell icon corresponding to the last numbered base transceiver station of the base transceiver station compliant with the second communication standard,
wherein the first form further includes information for identifying the first communication standard and first and last numbers of the base transceiver stations compliant with the first communication standard are separated and transcribed in association with each of the first cell icons, and
wherein the second form further includes information for identifying the second communication standard and first and last numbers of the base transceiver stations compliant with the second communication standard are separated and transcribed in association with each of the second cell icons.

7. The measurement device according to claim 6,
wherein the first form further includes a form between the first and last numbers of the base transceiver stations, indicating that numbers, which are continuous between the first and the last numbers of the base transceiver stations, are omitted, and
wherein the second form further includes a form between the first and last numbers of the base transceiver stations, indicating that numbers, which are continuous between the first and the last numbers of the base transceiver stations, are omitted.

8. A measurement device that simulates three or more base transceiver stations so as to test a communication terminal, wherein the three or more base transceiver stations include two base transceiver stations compliant with a first communication standard and at least one base transceiver station compliant with a second communication standard, wherein the measurement device comprises:
a transmitting/receiving unit that transmits and receives a signal of the first communication standard between the base transceiver station compliant with the first communication standard and the communication terminal and that transmits and receives a signal of the second communication standard between the base transceiver station compliant with the second communication standard and the communication terminal;
a pseudo base transceiver station control unit that controls the transmitting/receiving unit such that the transmitting/receiving unit performs a simulative communication operation for simulating communication between the communication terminal and the plurality of base transceiver stations;
a display unit that displays measurement-related information relating to measurement of the communication terminal; and
display control means for causing the display unit to display the measurement-related information relating to the measurement of the communication terminal based on a signal transmitted to and received from the communication terminal during the simulative communication operation,
wherein the display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations compliant with the second communication standard in association with the second cell icon, and
wherein the display control means causes the display unit to further display a simulation model display area having display areas respectively corresponding to a base transceiver station compliant with the first communication standard and a base transceiver station compliant with the second communication standard, and to display, on the display area for displaying the base transceiver station compliant with the first communication standard, the first form in which a numerical value corresponding to the number of base transceiver stations compliant with the first communication standard is attached to the first cell icon, and to display, on the display area for displaying the base transceiver station compliant with the second communication standard, the second form in which a numerical value corresponding to the number of base transceiver stations compliant with the second communication standard is attached to the second cell icon.

9. A communication terminal measurement system that simulates three or more base transceiver stations so as to test a communication terminal, wherein the three or more base transceiver stations include a base transceiver station compliant with a first communication standard and a base transceiver station compliant with a second communication standard, wherein the communication terminal measurement system comprises:
a measurement device that is compliant with the first communication standard and includes a first transmitting/receiving unit which transmits and receives a signal of the first communication standard between the base transceiver station compliant with the first communication standard and the communication terminal;
a measurement device that is compliant with the second communication standard and includes a second transmitting/receiving unit which transmits and receives a signal of the second communication standard between the base transceiver station compliant with the second communication standard and the communication terminal; and
a control device that has:
a pseudo base transceiver station control unit that controls the first and second transmitting/receiving units such that the transmitting/receiving units each perform a simulative communication operation for simulating communication between the communication terminal and the three or more base transceiver stations,
a display unit that displays measurement-related information relating to measurement of the communication terminal, and
display control means for causing the display unit to display the measurement-related information relating to the measurement of the communication terminal based on a signal transmitted to and received from the communication terminal during the simulative communication operation, wherein the display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations corresponding to the second communication standard in association with the second cell icon, wherein the first form is a set of the same number of graphic forms as the number of base transceiver stations compliant with the first communication standard arranged in association with the first cell icon, wherein the second form is a set of the same number of graphic forms as the number of base transceiver stations compliant with the second communication standard arranged in association with the second cell icon, and wherein the display control means displays a number for identifying the base transceiver station compliant with the first communication standard and a number for identifying the base transceiver station compliant with the second communication standard for each of the graphic forms.

10. The communication terminal measurement system according to claim 9, wherein the first communication standard is any one of NR or LTE, and the second communication standard is the other one of NR or LTE.

11. A communication terminal measurement system that simulates four or more base transceiver stations so as to test a communication terminal, wherein the four or more base transceiver stations include two or more base transceiver stations compliant with a first communication standard and two or more base transceiver stations compliant with a second communication standard, wherein the communication terminal measurement system comprises:

a measurement device that is compliant with the first communication standard and includes a first transmitting/receiving unit which transmits and receives a signal of the first communication standard between the base transceiver station compliant with the first communication standard and the communication terminal;

a measurement device that is compliant with the second communication standard and includes a second transmitting/receiving unit which transmits and receives a signal of the second communication standard between the base transceiver station compliant with the second communication standard and the communication terminal; and a control device that has:
a pseudo base transceiver station control unit that controls the first and second transmitting/receiving units such that the transmitting/receiving units each perform a simulative communication operation for simulating communication between the communication terminal and the four or more base transceiver stations,
a display unit that displays measurement-related information relating to measurement of the communication terminal, and
display control means for causing the display unit to display the measurement-related information relating to the measurement of the communication terminal based on a signal transmitted to and received from the communication terminal during the simulative communication operation, wherein the display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations corresponding to the second communication standard in association with the second cell icon, wherein the first form is a form in which an additional first cell icon is arranged next to the first cell icon, and wherein the second form is a form in which an additional second cell icon is arranged next to the second cell icon.

12. The communication terminal measurement system according to claim 11, wherein the first cell icon is the first cell icon corresponding to the first numbered base transceiver station of the base transceiver station compliant with the first communication standard and the additional first cell icon is the first cell icon corresponding to the last numbered base transceiver station of the base transceiver station compliant with the first communication standard, wherein the two second cell icons is the second cell icon corresponding to the first numbered base transceiver station of the base transceiver station compliant with the second communication standard and the additional second cell icon is the second cell icon corresponding to the last numbered base transceiver station of the base transceiver station compliant with the second communication standard, wherein the first form further includes information for identifying the first communication standard and first and last numbers of the base transceiver stations compliant with the first communication standard are separated and transcribed in association with each of the first cell icons, and wherein the second form further includes information for identifying the second communication standard and first and last numbers of the base transceiver stations compliant with the second communication standard are separated and transcribed in association with each of second cell icons.

13. The communication terminal measurement system according to claim 11, wherein the first form further includes a form between the first and last numbers of the base transceiver stations, indicating that numbers, which are continuous between the first and the last numbers of the base transceiver stations, are omitted and wherein the first form further includes a form between the first and last numbers of the base transceiver stations, indicating that numbers, which are continuous between the first and the last numbers of the base transceiver stations, are omitted.

14. A communication terminal measurement system that simulates three or more base transceiver stations so as to test a communication terminal, wherein the three or more base transceiver stations include a base transceiver station compliant with a first communication standard and a base transceiver station compliant with a second communication standard, wherein the communication terminal measurement system comprises:

a measurement device that is compliant with the first communication standard and includes a first transmitting/receiving unit which transmits and receives a signal of the first communication standard between the base transceiver station compliant with the first communication standard and the communication terminal;

a measurement device that is compliant with the second communication standard and includes a second transmitting/receiving unit which transmits and receives a signal of the second communication standard between the base transceiver station compliant with the second communication standard and the communication terminal; and a control device that has:
 a pseudo base transceiver station control unit that controls the first and second transmitting/receiving units such that the transmitting/receiving units each perform a simulative communication operation for simulating communication between the communication terminal and the three or more base transceiver stations,
 a display unit that displays measurement-related information relating to measurement of the communication terminal, and
 display control means for causing the display unit to display the measurement-related information relating to the measurement of the communication terminal based on a signal transmitted to and received from the communication terminal during the simulative communication operation, wherein the display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations corresponding to the second communication standard in association with the second cell icon, and wherein the display control means causes the display unit to further display simulation model display area having display areas respectively corresponding to the base transceiver station compliant with the first communication standard and the base transceiver station compliant with the second communication standard, and to display on the display area for displaying the base transceiver station compliant with the first communication standard the first form in which a numerical value corresponding to the number of base transceiver stations compliant with the first communication standard is attached to the one first cell icon, and to display on the display area for displaying the base transceiver station compliant with the second communication standard, the second form in which a numerical value corresponding to the number of base transceiver stations compliant with the second communication standard is attached to the one second cell icon.

15. A measurement device used in a communication terminal measurement system that simulates three or more base transceiver stations so as to test a communication terminal, wherein the three or more base transceiver stations include a base transceiver station compliant with a first communication standard and a base transceiver station compliant with a second communication standard, wherein the communication terminal measurement system comprises:

a measurement device that is compliant with the first communication standard and includes a first transmitting/receiving unit which transmits and receives a signal of the first communication standard between the base transceiver station compliant with the first communication standard and the communication terminal;

a measurement device that is compliant with the second communication standard and includes a second transmitting/receiving unit which transmits and receives a signal of the second communication standard between the base transceiver station compliant with the second communication standard and the communication terminal; and a control device that has:
 a pseudo base transceiver station control unit that controls the first and second transmitting/receiving units such that the transmitting/receiving units each perform a simulative communication operation for simulating communication between the communication terminal and the plurality of base transceiver stations,
 a display unit that displays measurement-related information relating to measurement of the communication terminal, and
 display control means for causing the display unit to display the measurement-related information relating to the measurement of the communication terminal based on a signal transmitted to and received from the communication terminal during the simulative communication operation; and wherein the display control means displays a first cell icon indicating being compliant with the first communication standard, a second cell icon indicating being compliant with the second communication standard, a first form indicating an information of base transceiver stations compliant with the first communication standard in association with the first cell icon, and a second form indicating an information of base transceiver stations corresponding to the second communication standard in association with the second cell icon, wherein the measurement device is compliant with the first communication standard or the second communication standard, wherein the first form is a set of the same number of graphic forms as the number of base transceiver stations compliant with the first communication standard arranged in association with the first cell icon, and wherein the second form is a set of the same number of graphic forms as the number of base transceiver stations compliant with the second communication standard arranged in association with the second cell icon.

16. A measurement device that simulates three or more base transceiver stations so as to test a communication terminal, wherein the three or more base transceiver stations include a base transceiver station compliant with a first communication standard and a base transceiver station compliant with a second communication standard, wherein the measurement device includes a transmitting/receiving unit that transmits and receives a signal of the first communication standard between the base transceiver station compliant with the first communication standard and the communication terminal and that transmits and receives a signal of the second communication standard between the base transceiver station compliant with the second communication standard and the communication terminal, wherein the measurement device is controlled by a control device including a pseudo base transceiver station control unit, a display unit, and a display control means, wherein the pseudo base transceiver station control unit controls the transmitting/receiving unit such that the transmitting/receiving unit performs a simulative communication operation for simulating communication between the communication terminal and the plurality of base transceiver stations, wherein the display unit displays measurement-related information relating to measurement of the communication terminal, and wherein the display control means causes a display unit to display measurement-related information on measurement of the communication terminal based on a signal transmitted to and received from the communication terminals during the simulative communication operation and to further display a first cell icon indicating being compliant with the first communication standard and a second cell icon indicating being compliant with the second communication standard, a first form indicating an information of base transceiver stations compliant with the first communication standard in association with the first cell icon, and a second form indicating an information of base transceiver stations compliant with the second communication standard are arranged in association with the second cell icon, wherein the first form is a set of the same number of graphic forms as the number of base transceiver stations compliant with the first communication standard arranged in association with the first cell icon, and wherein the second form is a set of the same number of graphic forms as the number of base transceiver stations compliant with the second communication standard arranged in association with the second cell icon.

17. A measurement-related information display method of simulating three or more base transceiver stations each including base transceiver stations compliant with a first communication standard and a second communication standard and displaying measurement-related information relating to measurement of a communication terminal, the method comprising:

a receiving step of receiving a setting of a combination of the base transceiver station compliant with the first communication standard and the base transceiver station compliant with the second communication standard; and a display control step of displaying, on the basis of the combination of the base transceiver station compliant with the first communication standard and the base transceiver station compliant with the second communication standard received in the receiving step, a form which includes a first cell icon indicating being compliant with the first communication standard and a second cell icon indicating being compliant with the second communication standard within a connection status display area with a predetermined size, a first form indicating an information of base transceiver stations compliant with each of the first communication standard in association with the first cell icon and a second form indicating an information of base transceiver stations compliant with the second communication standard in association with the second cell icon, wherein the first form is a set of the same number of graphic forms as the number of base transceiver stations compliant with the first communication standard arranged in association with the first cell icon, and wherein the second form is a set of the same number of graphic forms as the number of base transceiver stations compliant with the second communication standard arranged in association with the second cell icon.

* * * * *